(12) United States Patent

Nakajima

(10) Patent No.: US 12,575,508 B2

(45) Date of Patent: Mar. 17, 2026

(54) SAFFRON CULTIVATION SYSTEMS AND METHODS

(71) Applicant: Masaru Nakajima, Tokyo (JP)

(72) Inventor: Masaru Nakajima, Tokyo (JP)

( * ) Notice: Subject to any disclaimer, the term of this patent is extended or adjusted under 35 U.S.C. 154(b) by 0 days.

(21) Appl. No.: 18/822,356

(22) Filed: Sep. 2, 2024

(65) Prior Publication Data

US 2026/0060184 A1 Mar. 5, 2026

(51) Int. Cl.
*A01G 9/24* (2006.01)
*A01G 9/18* (2006.01)
*A01G 22/60* (2018.01)

(52) U.S. Cl.
CPC .............. *A01G 9/249* (2019.05); *A01G 9/18* (2013.01); *A01G 9/246* (2013.01); *A01G 9/247* (2013.01); *A01G 22/60* (2018.02)

(58) Field of Classification Search
CPC ........ A01G 9/249; A01G 9/247; A01G 9/246; A01G 9/18; A01G 22/60
See application file for complete search history.

(56) References Cited

U.S. PATENT DOCUMENTS

| | | | | |
|---|---|---|---|---|
| 4,028,847 A | * | 6/1977 | Davis | A01G 31/042 |
| | | | | 165/59 |
| 4,352,256 A | * | 10/1982 | Kranz | A01G 9/14 |
| | | | | 47/17 |
| 5,001,859 A | * | 3/1991 | Sprung | A01G 9/24 |
| | | | | 47/48.5 |
| 10,021,838 B1 | * | 7/2018 | Gustafik | G05B 15/02 |
| 2020/0205354 A1 | * | 7/2020 | Hefer | A01G 7/06 |
| 2022/0142059 A1 | * | 5/2022 | Maman | A01G 9/246 |
| 2022/0338420 A1 | * | 10/2022 | Jönsson | A01G 9/24 |

FOREIGN PATENT DOCUMENTS

| | | | | | |
|---|---|---|---|---|---|
| CN | 116830976 A | * | 10/2023 | ............. | A01G 22/00 |
| WO | WO-2016147195 A1 | * | 9/2016 | ............. | A01G 9/246 |

* cited by examiner

*Primary Examiner* — Ebony E Evans
(74) *Attorney, Agent, or Firm* — Tue Nguyen

(57) ABSTRACT

A cultivation system for indoor farming of saffron plants (*Crocus sativus*) and other plants can include one or more compartments coupled with one or more climate modules which are controlled by one or more control systems. The control system can be configured to control the climate modules to provide different climate conditions to different compartments for different stages of the plants growth. Further, the temperature, humidity, and lighting in the compartments can include cyclic sequences configured to accelerate the life cycle of the plants. In addition, the plants can be trimmed, genome-specific fertilizer can be added to growth medium, absorbance pads can be used under the plant corms.

20 Claims, 30 Drawing Sheets

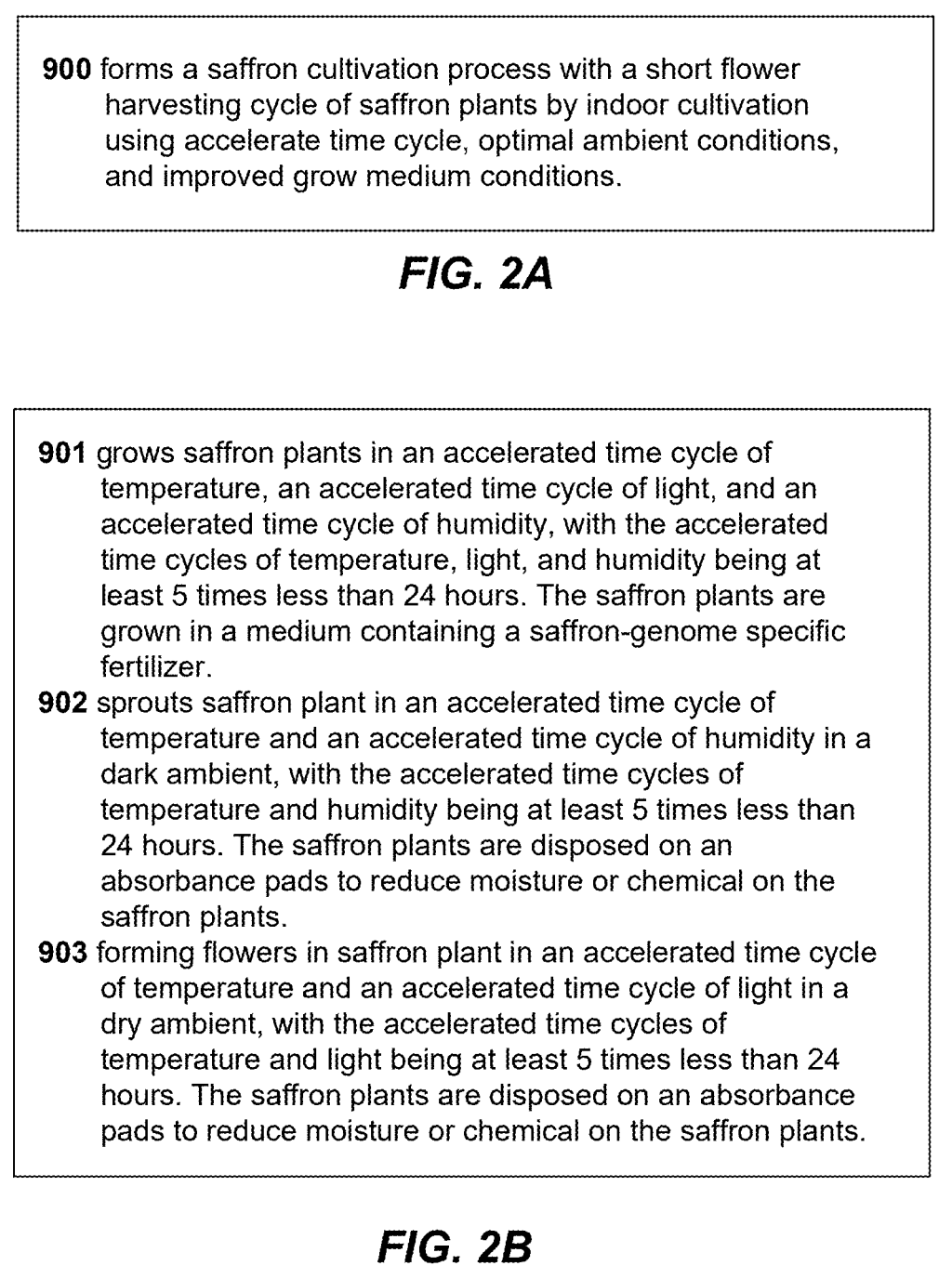

900 forms a saffron cultivation process with a short flower harvesting cycle of saffron plants by indoor cultivation using accelerate time cycle, optimal ambient conditions, and improved grow medium conditions.

FIG. 2A

901 grows saffron plants in an accelerated time cycle of temperature, an accelerated time cycle of light, and an accelerated time cycle of humidity, with the accelerated time cycles of temperature, light, and humidity being at least 5 times less than 24 hours. The saffron plants are grown in a medium containing a saffron-genome specific fertilizer.

902 sprouts saffron plant in an accelerated time cycle of temperature and an accelerated time cycle of humidity in a dark ambient, with the accelerated time cycles of temperature and humidity being at least 5 times less than 24 hours. The saffron plants are disposed on an absorbance pads to reduce moisture or chemical on the saffron plants.

903 forming flowers in saffron plant in an accelerated time cycle of temperature and an accelerated time cycle of light in a dry ambient, with the accelerated time cycles of temperature and light being at least 5 times less than 24 hours. The saffron plants are disposed on an absorbance pads to reduce moisture or chemical on the saffron plants.

FIG. 2B

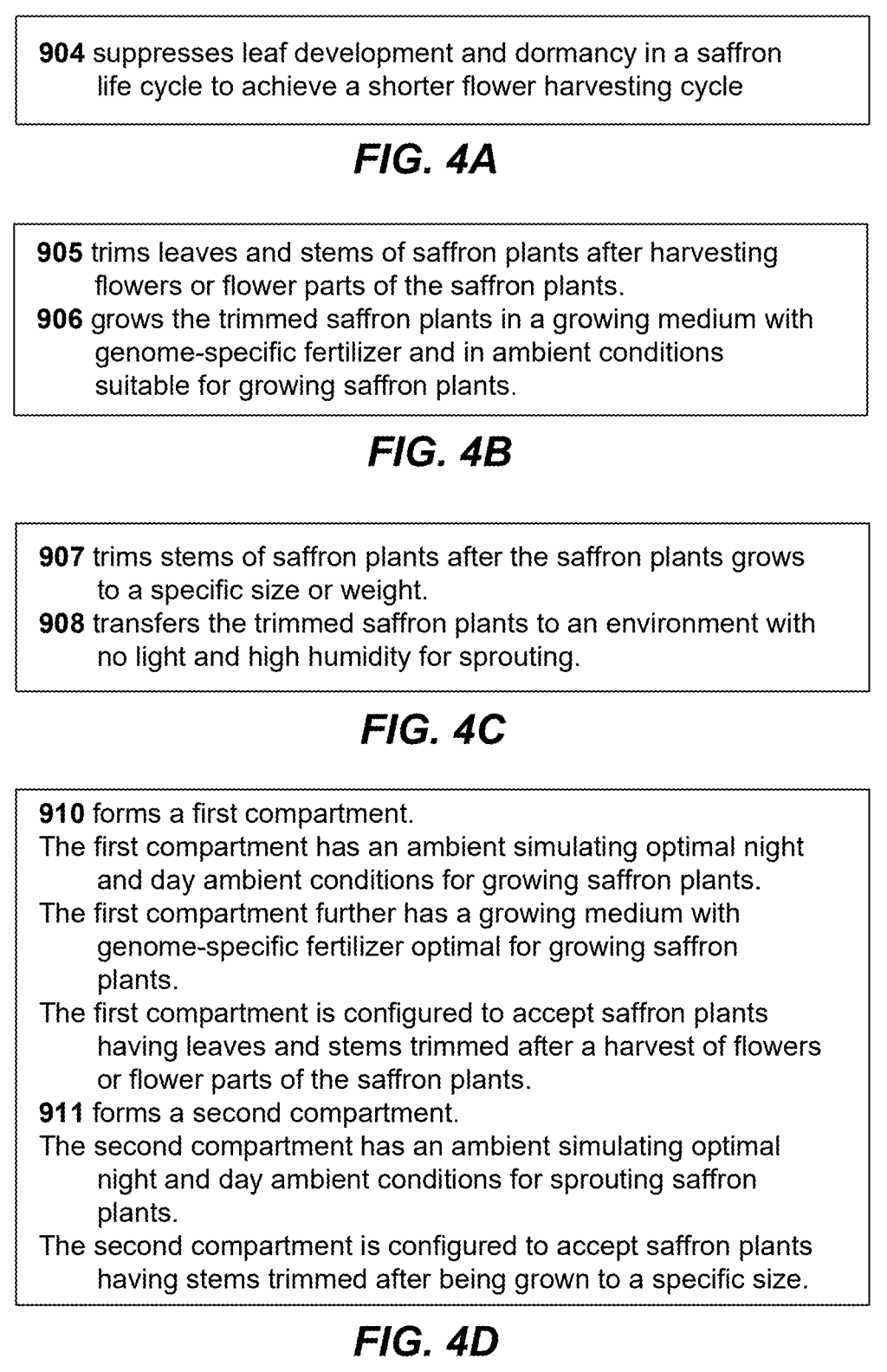

904 suppresses leaf development and dormancy in a saffron life cycle to achieve a shorter flower harvesting cycle

FIG. 4A

905 trims leaves and stems of saffron plants after harvesting flowers or flower parts of the saffron plants.

906 grows the trimmed saffron plants in a growing medium with genome-specific fertilizer and in ambient conditions suitable for growing saffron plants.

FIG. 4B

907 trims stems of saffron plants after the saffron plants grows to a specific size or weight.

908 transfers the trimmed saffron plants to an environment with no light and high humidity for sprouting.

FIG. 4C

910 forms a first compartment.

The first compartment has an ambient simulating optimal night and day ambient conditions for growing saffron plants.

The first compartment further has a growing medium with genome-specific fertilizer optimal for growing saffron plants.

The first compartment is configured to accept saffron plants having leaves and stems trimmed after a harvest of flowers or flower parts of the saffron plants.

911 forms a second compartment.

The second compartment has an ambient simulating optimal night and day ambient conditions for sprouting saffron plants.

The second compartment is configured to accept saffron plants having stems trimmed after being grown to a specific size.

FIG. 4D

Cultivation system
430*

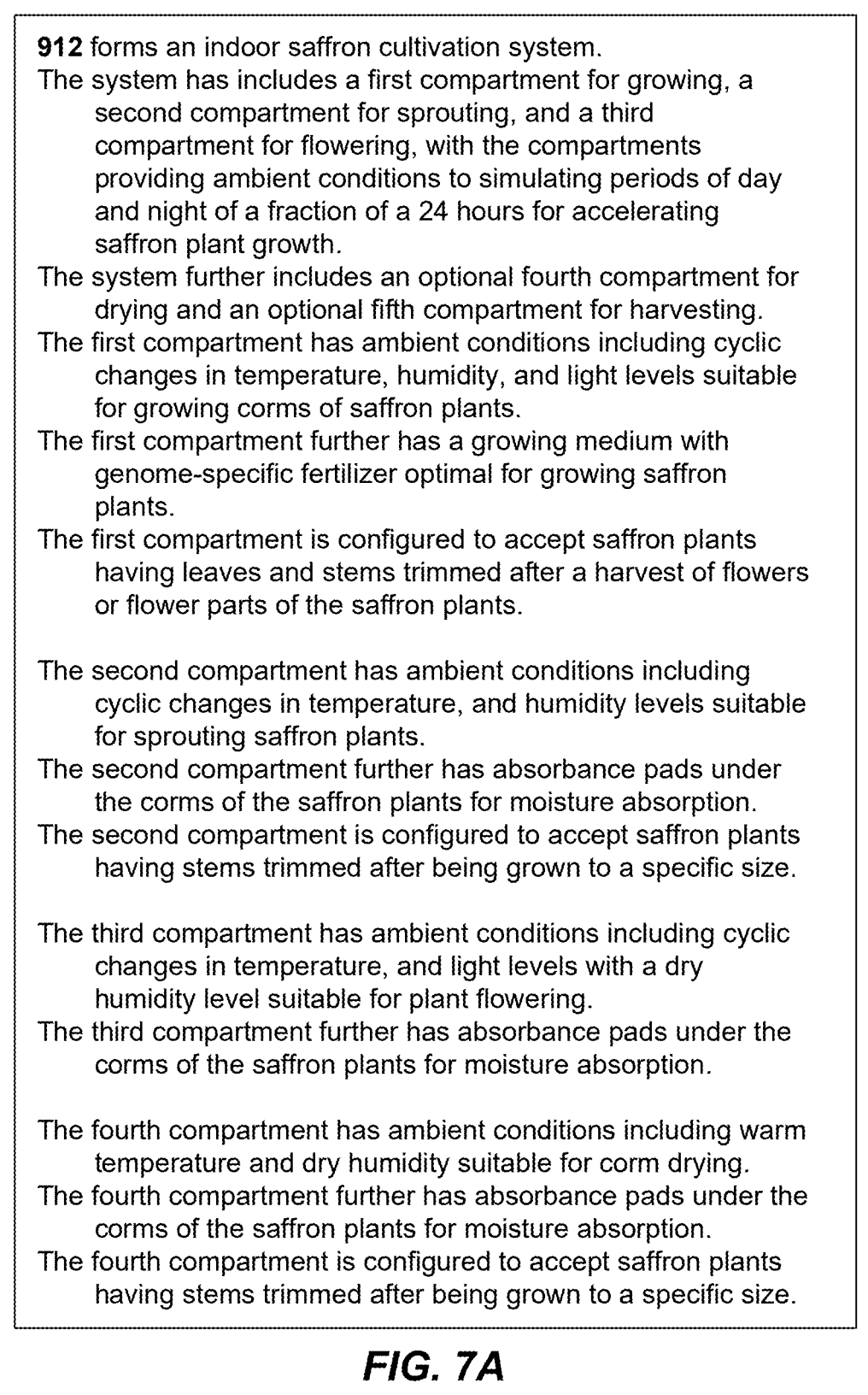

912 forms an indoor saffron cultivation system.

The system has includes a first compartment for growing, a second compartment for sprouting, and a third compartment for flowering, with the compartments providing ambient conditions to simulating periods of day and night of a fraction of a 24 hours for accelerating saffron plant growth.

The system further includes an optional fourth compartment for drying and an optional fifth compartment for harvesting.

The first compartment has ambient conditions including cyclic changes in temperature, humidity, and light levels suitable for growing corms of saffron plants.

The first compartment further has a growing medium with genome-specific fertilizer optimal for growing saffron plants.

The first compartment is configured to accept saffron plants having leaves and stems trimmed after a harvest of flowers or flower parts of the saffron plants.

The second compartment has ambient conditions including cyclic changes in temperature, and humidity levels suitable for sprouting saffron plants.

The second compartment further has absorbance pads under the corms of the saffron plants for moisture absorption.

The second compartment is configured to accept saffron plants having stems trimmed after being grown to a specific size.

The third compartment has ambient conditions including cyclic changes in temperature, and light levels with a dry humidity level suitable for plant flowering.

The third compartment further has absorbance pads under the corms of the saffron plants for moisture absorption.

The fourth compartment has ambient conditions including warm temperature and dry humidity suitable for corm drying.

The fourth compartment further has absorbance pads under the corms of the saffron plants for moisture absorption.

The fourth compartment is configured to accept saffron plants having stems trimmed after being grown to a specific size.

*FIG. 7A*

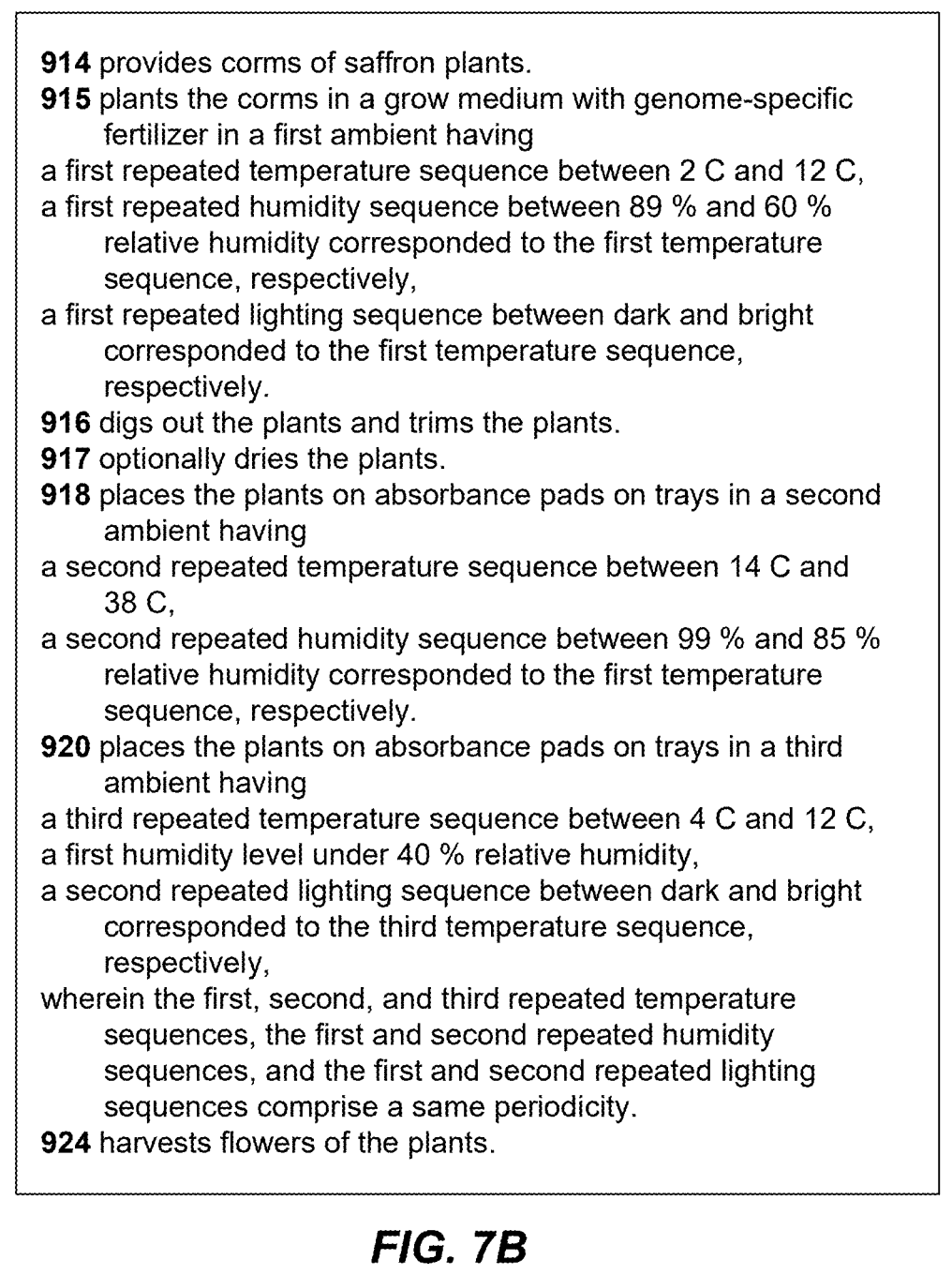

914 provides corms of saffron plants.

915 plants the corms in a grow medium with genome-specific fertilizer in a first ambient having a first repeated temperature sequence between 2 C and 12 C, a first repeated humidity sequence between 89 % and 60 % relative humidity corresponded to the first temperature sequence, respectively, a first repeated lighting sequence between dark and bright corresponded to the first temperature sequence, respectively.

916 digs out the plants and trims the plants.

917 optionally dries the plants.

918 places the plants on absorbance pads on trays in a second ambient having a second repeated temperature sequence between 14 C and 38 C, a second repeated humidity sequence between 99 % and 85 % relative humidity corresponded to the first temperature sequence, respectively.

920 places the plants on absorbance pads on trays in a third ambient having a third repeated temperature sequence between 4 C and 12 C, a first humidity level under 40 % relative humidity, a second repeated lighting sequence between dark and bright corresponded to the third temperature sequence, respectively, wherein the first, second, and third repeated temperature sequences, the first and second repeated humidity sequences, and the first and second repeated lighting sequences comprise a same periodicity.

924 harvests flowers of the plants.

FIG. 7B

Day 1 in real time (24 hours)
201

Temperature profile
220A

Day temp 221

Night temp 222

4 hrs
215A 4 hr cycle - 6X
216A 3.5 hr cycle – 6.86X
216C

Temperature profile
220B 2 hrs
215B 2 hr cycle - 12X
216B

Day temp 221

Night temp 222

2.5 hr cycle – 9.6X
216D 3.5 hrs
215C 2.5 hrs
215D

Day temp 221

Night temp 222

Temperature profile
220C

Temperature profile
220D

Day temp 221

Night temp 222

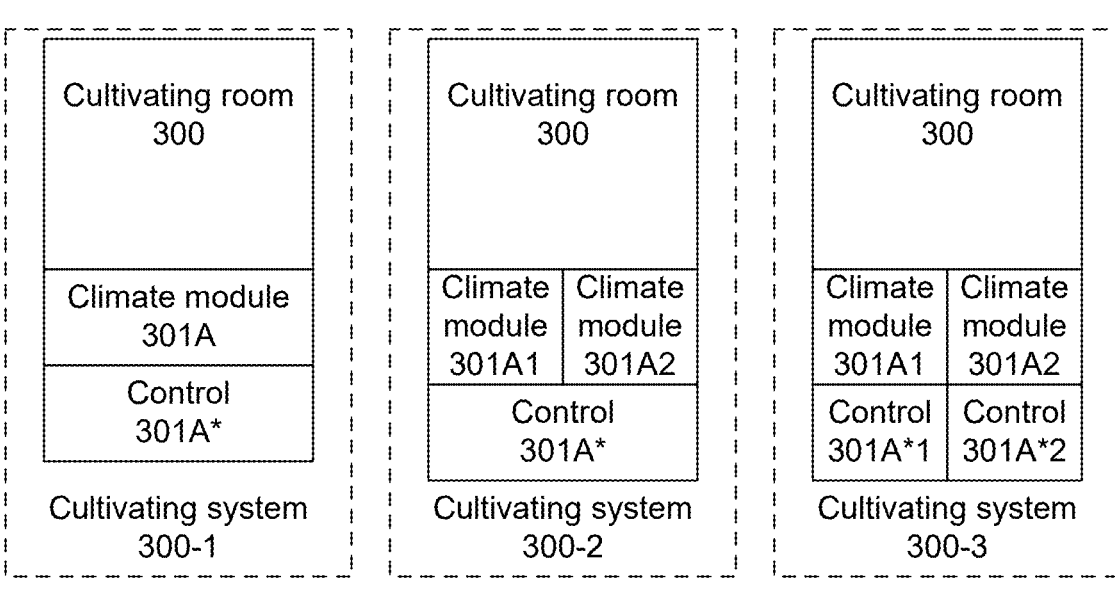
FIG. 20A
FIG. 20B
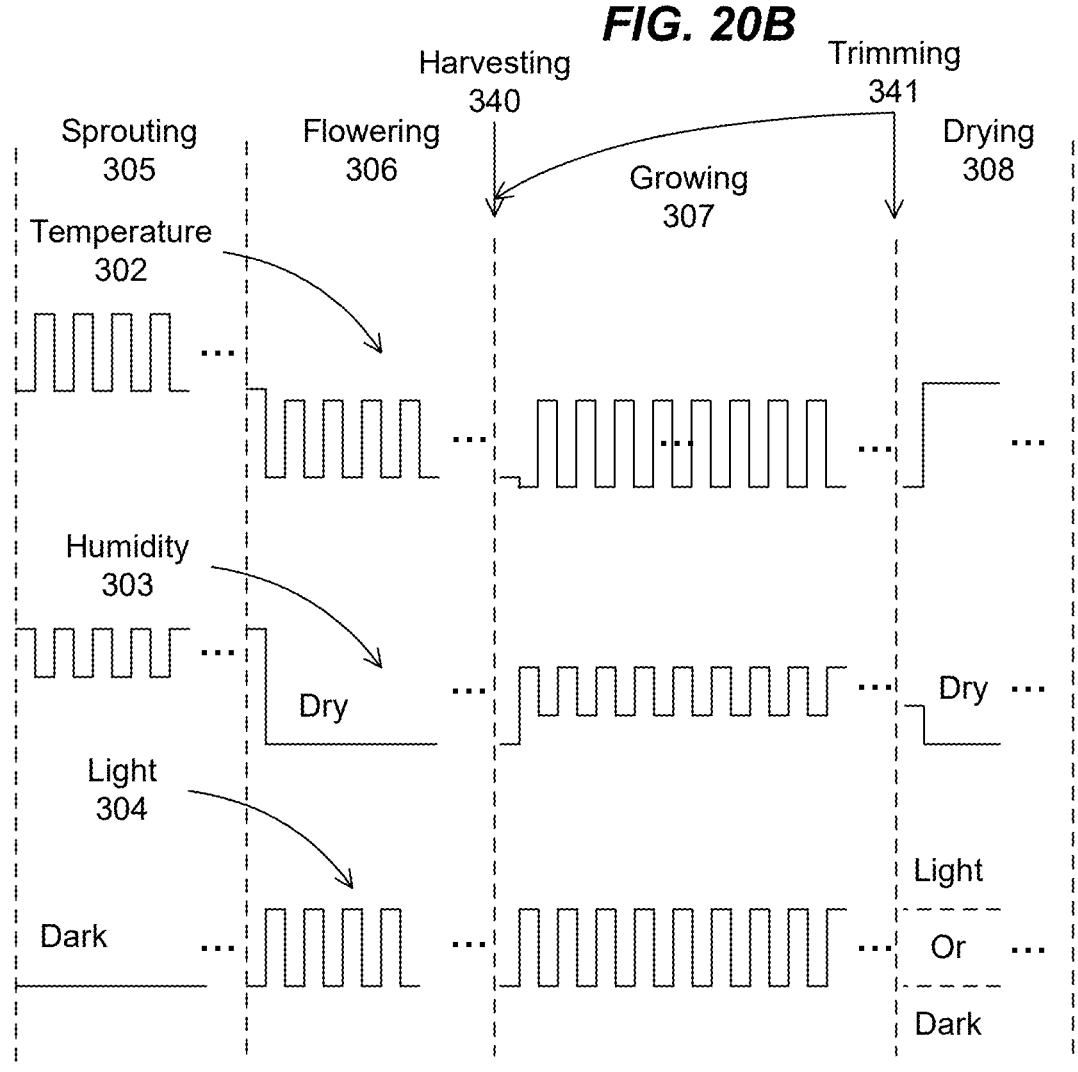

| Cultivating room 1 (Sprouting) 330A | Cultivating room 2 (Flowering) 330B | Cultivating room 3 (Growing) 330C | Cultivating room 4 (Drying) 330D |
|---|---|---|---|
| Climate module 331B | Climate module 331B | Climate module 331C | Climate module 331D |
| Control 331B* | Control 331B* | Control 331C* | Control 331D* |

Harvesting 340

Trimming 341

Sprouting 305     Flowering 306     Growing 307     Drying 308

Temperature 332

Humidity 333

Dry

Dry

Light 334

Dark

Light

Or

Dark

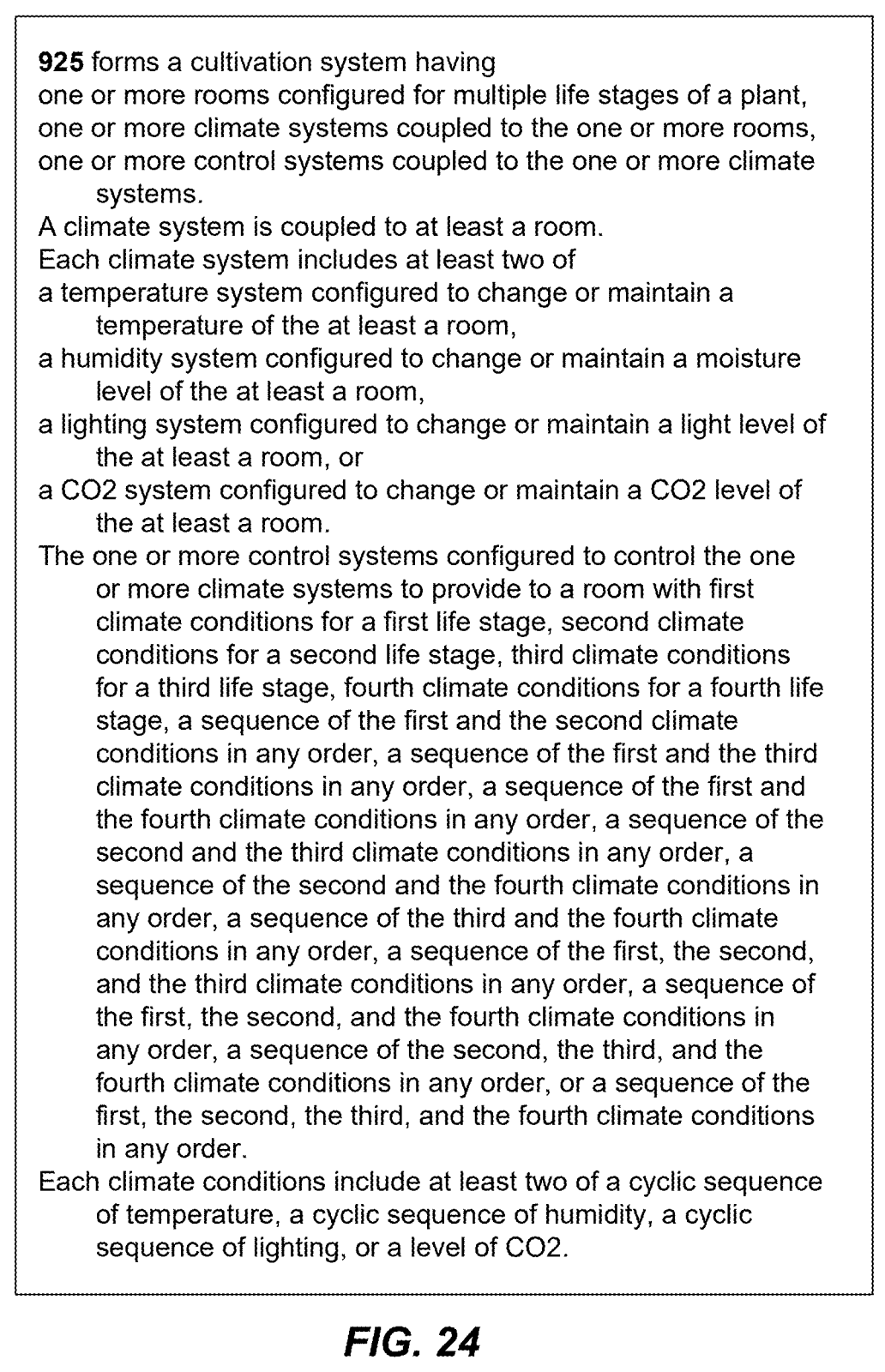

925 forms a cultivation system having
one or more rooms configured for multiple life stages of a plant,
one or more climate systems coupled to the one or more rooms,
one or more control systems coupled to the one or more climate
    systems.
A climate system is coupled to at least a room.
Each climate system includes at least two of
a temperature system configured to change or maintain a
    temperature of the at least a room,
a humidity system configured to change or maintain a moisture
    level of the at least a room,
a lighting system configured to change or maintain a light level of
    the at least a room, or
a CO2 system configured to change or maintain a CO2 level of
    the at least a room.
The one or more control systems configured to control the one
    or more climate systems to provide to a room with first
    climate conditions for a first life stage, second climate
    conditions for a second life stage, third climate conditions
    for a third life stage, fourth climate conditions for a fourth life
    stage, a sequence of the first and the second climate
    conditions in any order, a sequence of the first and the third
    climate conditions in any order, a sequence of the first and
    the fourth climate conditions in any order, a sequence of the
    second and the third climate conditions in any order, a
    sequence of the second and the fourth climate conditions in
    any order, a sequence of the third and the fourth climate
    conditions in any order, a sequence of the first, the second,
    and the third climate conditions in any order, a sequence of
    the first, the second, and the fourth climate conditions in
    any order, a sequence of the second, the third, and the
    fourth climate conditions in any order, or a sequence of the
    first, the second, the third, and the fourth climate conditions
    in any order.
Each climate conditions include at least two of a cyclic sequence
    of temperature, a cyclic sequence of humidity, a cyclic
    sequence of lighting, or a level of CO2.

*FIG. 24*

SAFFRON CULTIVATION SYSTEMS AND METHODS

BACKGROUND

Saffron is a spice derived from the flower of *Crocus sativus*, and is commonly known as the "saffron crocus". The stigma and styles are collected from the plant flowers and dried for use mainly as a seasoning and coloring agent in food.

The general life cycle of saffron involves five major stages, which include sprouting, flowering, leaf development, development of daughter corms and dormancy. For example, saffron plants sprout and bloom in fall season (sprouting and flowering stages), grow greenery (leaf development and daughter corm development stages), start to die back through winter and Spring, and go dormant through Summer (dormancy stage). The exact timing and duration of each stage depends on the climatic conditions.

For example, saffron corms can be planted in mid-late August or early September, in soil with frequent watering. The plant sprouts cataphylls, which cover and protect true leaves as they bud and develop on the *crocus* flower.

Flowering began after 30-40 days, and can continue for 5-6 weeks. The flowers can appear before the leaves, or both the flowers and the leaves can appear at approximately a same time. In October, the flowers develop, with each plant having about four flowers. After flowering is finished, the leaves can remain green for 6-8 months. During this time, the daughter or secondary corms develop and grow on top of the mother corm, which are clusters of corms, underground, bulb-like, starch-storing organs. A mother corm survives for one season, producing via vegetative division up to ten "cormlets", e.g., daughter corms or secondary corms that can grow into new plants in the next season.

The leaf color changes from green to yellow when the secondary corms are fully developed. The leaves then turn brown and dry out, and the daughter corms reach dormancy. The dormancy corms do not need to be watered during the dormancy summer. In August, the corms are watered and the saffron cycle repeats.

Corms and bulbs are parts of the plant that store food to help it grow and bloom. A bulb is a plant stem and leaf that grows under ground in layers, with tulips, lilies, iris, daffodils and onions being examples of bulbs. A corm is an underground stem that serves as the base for the flower stem and is solid, not layered, such as corms of saffron plants.

Outdoor cultivation of saffron plants is time-consuming and labor intensive. Thus, there is a need for effective indoor saffron cultivation systems.

SUMMARY

In some embodiments, the present invention discloses a cultivation system and method for indoor farming of saffron plants (*Crocus sativus*) and other plants. The cultivation system can include one or more compartments coupled with one or more climate modules which are controlled by one or more control systems.

The control system can be configured to control the climate modules to provide different climate conditions to different compartments for different stages of the plants growth. For example, a first compartment can be configured for plant sprouting with cycles of hot and warm temperature together with cycles of humid humidity in a dark ambient. A second compartment can be configured for plant flowering with cycles of cool and cold temperature together with a dry humidity and cycles of dark and bright light to simulate day night and day periods. A third compartment can be configured for plant growing with cycles of cool and cold temperature together with cycles of wet and dry humidity and cycles of dark and bright light to simulate day night and day periods. Optional compartments include a fourth compartment configured for drying with warm temperature and dry humidity, and a fifth compartment configured for flower harvesting and plant trimming with climate conditions suitable for workers.

The cycles of temperature, humidity, and lighting in the compartments can be configured to accelerate the life cycle of the plants, such as having a cycle period of about 2 hours instead of a real day of 24 hours. With the accelerated life cycle, the saffron can be harvested in 2 months, resulting in 6 harvests a year as compared to one harvest per year for an outdoor cycle.

Further, the plants can be trimmed, such as cutting off leaves for encouraging sprouting or cutting excess leaves leaving one or two main leaves for encourage growing while suppressing leaf development.

Further, genome-specific fertilizer can be used for plant growth, together with absorbance pads under the plant corms to keep the corms dried. The cultivation system can thus increase the efficiency of the flowering cycle of saffron plants.

Further, the compartments in the cultivation system can be configured for the management of multiple saffron lots. For example, by shifting the introduction of different lots in the cultivation rooms, the cultivation system can allow flower harvesting daily, with reduced loss of pistil harvest, for example, due to missing the timing of flowering.

BRIEF DESCRIPTION OF THE DRAWINGS

FIGS. 2A-2B illustrate flow charts for an accelerated cultivation process according to some embodiments.

FIGS. 4A-4D illustrate flow charts for using plant trimming and controlled ambient for accelerating a saffron cultivation process according to some embodiments.

FIGS. 7A-7B illustrate flow charts for a saffron cultivation process according to some embodiments.

FIGS. 20A-20B illustrate a saffron cultivation system with one compartment according to some embodiments.

FIG. 24 illustrates a flow chart for a cultivation system for cultivating saffron in different cultivation systems according to some embodiments.

DETAILED DESCRIPTION OF THE EMBODIMENTS

Indoor agriculture is popular since it is independent to the climate fluctuation of the outdoor, e.g. avoiding interference of undesirable and random external climatic factors. An indoor plant growing for saffron can take advantages of a controlled artificial environment to realize an effective environment for efficient cultivating of saffron or other plants. Well designed indoor cultivation system can provide the best control conditions to provide the most successful production of high quality saffron or other plants with good yield.

In some embodiments, the present invention discloses a cultivation system capable of providing optimal environment conditions and plant conditioning for plant growth and development. The cultivation system includes optimal temperature, humidity, and lighting conditions, together with genome-specific nutrient for plant growth, environment regulation in plant vicinity to control plant moisture, and plant trimming to suppress or eliminate unwanted life stages of the plants. The cultivation system can provide faster growth with lot management to provide improved efficiency, economics and quality for the plants.

In some embodiments, the present invention discloses a cultivation system and method for indoor farming, such as for saffron plants (*Crocus sativus*) for the harvesting of flowers (stigmas, stamens, and/or petals) and/or corms. The cultivation system can include one or more compartments with one or more control modules. The compartments can be configured to cultivate saffron plants, which can include saffron planting, flower harvesting, and stigma separating. The control modules can include climate control systems, such as a temperature module configured to regulate temperature in the compartments, a light module configured to regulate light intensity in the compartments, a humidity module configured to regulate humidity levels in the compartments, and a $CO_2$ module configured to regulate $CO_2$ levels in the compartments. The control modules can include automation and inspection components, such as temperature sensors, light sensors, humidity sensors, $CO_2$ sensors, cameras including visible cameras, infrared or ultraviolet cameras, acoustic or ultrasonic cameras.

Saffron (*Crocus sativus*) is a geophyte perennial plant from the family Iridaceae with underground soft corms. The stigmas constitute the commercial product saffron that has coloring, flavoring, and therapeutic properties.

Figure 1:
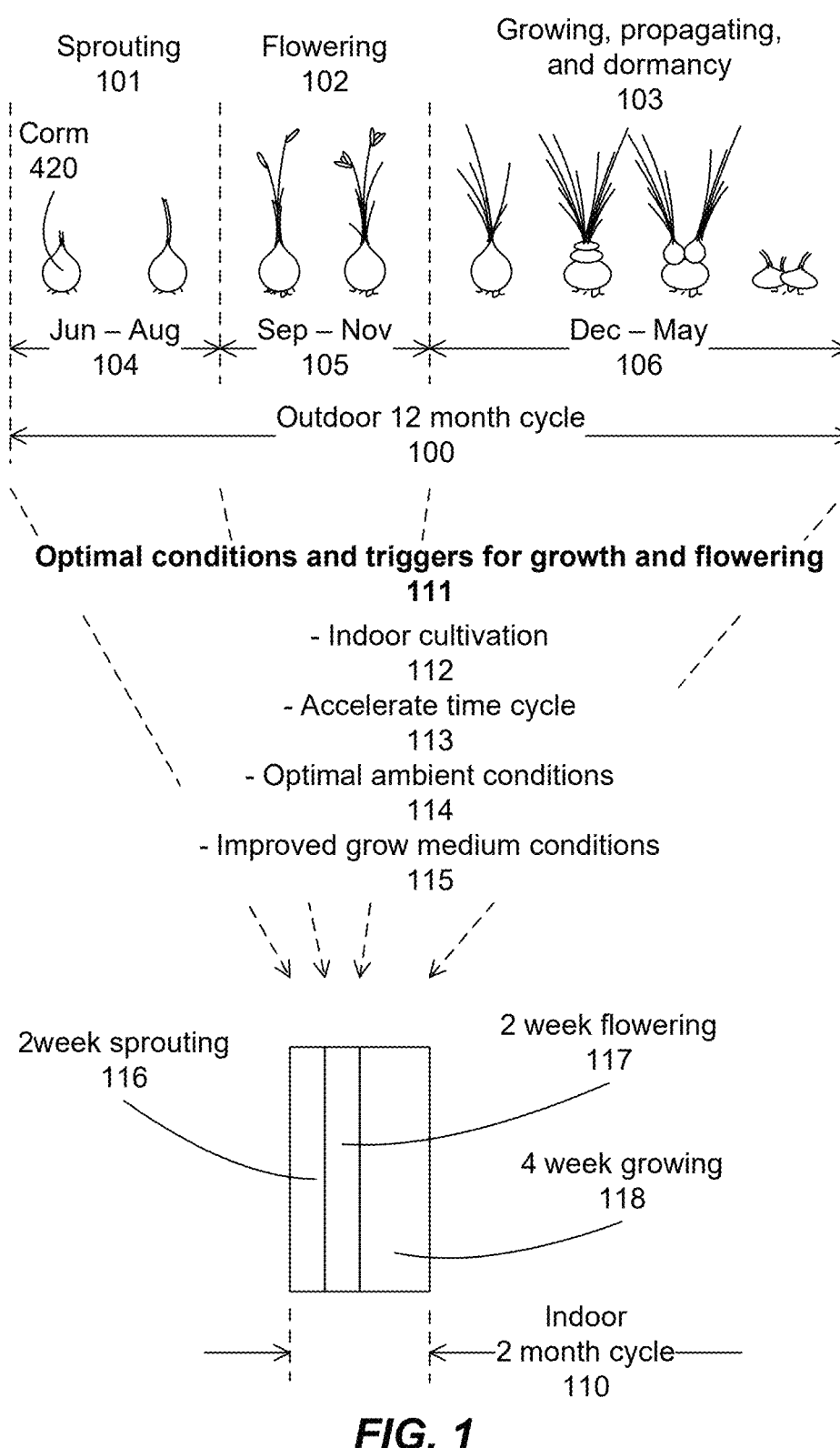
FIG. 1 illustrates an accelerated cultivation for saffron plants according to some embodiments.

FIG. 1 illustrates an accelerated cultivation for saffron plants according to some embodiments. Saffron has an annual life cycle, which usually starts with a mother corm 420. The annual life cycle includes a sprouting stage 101, a flowering stage 102, and a vegetative stage 103 for foliage growth, production of daughter corms, and dormancy.

In an outdoor setting, the saffron plants have a 12 month cycle 100, with the sprouting stage 101 around June-August 104, the flowering stage 102 around September-November 105, and the vegetative stage 103 stage around December-May 106. The timing and duration of each stage depends on environmental conditions, which include temperature, illumination, humidity, and chemical conditions, with the environmental conditions triggering the end or the beginning of a stage.

For the saffron plants, growth begins with bud swelling and sprouting. In the sprouting stage, roots form at the base of the plants. Plant shoots subsequently emerge with the leaves and flowers wrapped by the cataphylls. The sprouting of the plants is due to available reserves in the corm. The sprouting stage can be within 5-6 weeks, and up to 2-3 months.

In the flowering stage, saffron flowers grow before the leaves grow. The flowering stage can be within 2-6 weeks, and up to 2-3 months. A dominant trigger of the flowering stage is an environment temperature of about 17 C.

In the vegetative stage, the foliage of saffron plants grows with a generation of daughter corms and a creating of buds. A trigger for the plants to start the vegetative stage is a drop in environmental temperature to about 5 C for about 2 weeks. A trigger for the end of the plant growth is a rise in environment temperature. In the outdoor setting, the plants will go into dormancy in which the plants show no morphological change, nor external growth.

After the flowering stage is finished, the plants enter the vegetative stage in which the leaves grow and remain green for 6-8 months. During this time the daughter corms develop and grow on top of the mother corm while the mother corm depletes its reserves. When the development of the daughter corms is complete, indicated by a rise in environmental temperature and a drop in soil moisture, the leaves dry out, and the plants senesce.

Disadvantages of outdoor cultivation include a long cycle time (12 months), climate change dependency, and harvesting hardship.

The present cultivation system can address these disadvantages with an indoor cultivation configuration 112 providing optimal environmental conditions and triggers 111, with focus on increasing flower yield, and ease of flower harvesting. Further, the indoor environmental conditions and triggers can reduce or eliminate non desired stages in the plant cycle to reduce the plant cycle, such as reducing the leaf growing time and eliminating the dormancy time.

For example, before entering the leaf development period (of the vegetative stage), the plants can be trimmed to reduce the growth of leaves. Further, the environmental conditions can change, such as to a warmer and wetter ambient conditions 114 to bring the plants to the sprouting stage after the corms are fully developed in the vegetative stage, which can skip the dormancy period.

The indoor cultivation system can offer different paths of plant growing, such as a flower path to maximize flower production while sacrificing the development of daughter corms. For example, after the mother corm reaches a certain size, the environmental conditions can change to bring the mother corm to the sprouting stage, skipping both the daughter corm development and the dormancy times.

The indoor cultivation system can offer a different path, which can be a daughter corm path to generate daughter corms while lengthening the plant cycle. For example, after the mother corm reaches a certain size, the environmental conditions can be maintained to encourage the mother corm into developing daughter corms. The daughter corms can be harvested for selling or for using as mother corms in a next cycle in the indoor cultivation system.

The present cultivation system can further provide improved grow medium conditions 115. For example, during the growing period, the corms, e.g., the corms trimmed after a flower harvesting to reduce leaf development, can be buried in a grow medium such as soil or other media such as coconut fiber, peat moss, or a mixture of soil with coconut fiber or peat moss. The grow medium, such as soil, can assist in the growth of the corms, such as to provide consistent temperature and moisture levels suitable for corm growing. Fertilizer specific for the growing of the corms can be added to the grow medium. During the sprouting stage, the corms, e.g., the corms trimmed after the growing time to encourage new shoots, can be placed in a hot dark ambient with high humidity with no condensation, such as placing on an absorbance pad. During the flowering stage, the corms, after budding from the sprouting stage, can be placed on an absorbance pad in a cool dry ambient to eliminate moisture condensation on the corms.

The present cultivation system can further provide an accelerate time cycle 113 configured to reduce a 24 hour day into an accelerate shorter day, such as into a day with 1, 2, 3, 4, 5, 6, 7, 8, 9, 10, or any number of hours in the accelerate day. The accelerate day can simulate the changes in temperature, light, and humidity of a normal 24 hour day. For example, the accelerate day can have a steady cold temperature period, such as about 30 minutes, to simulate a night time. The accelerate day can then have a cold-to-hot temperature transition period, such as about 30 minutes, to simulate a transition from night to day. The accelerate day can have a steady hot temperature period, such as about 30 minutes, to simulate a day time. The accelerate day can then have a hot-to-cold temperature transition period, such as about 30 minutes, to simulate a transition from day to night. With the 30 minute periods, the accelerate day can be 2 hours, instead of 24 hours, which represent a 12 times time acceleration. Other time periods can be used, such as 1 hour for day and night time and 30 minutes for the transition time.

In general, shorter time periods are better since the shorter time periods represent higher time acceleration. However, a minimum time period can be required, for example, to ensure that the plants can experience the temperature changes. For example, for saffron plants, depending on the species, the steady time period for day or night time or the transition period from day to night or from night to day can be at least 20 minutes, 30 minutes, 40 minutes, 50 minutes, or 60 minutes for the plants to respond.

Thus, an indoor cultivation system 112 can reduce plant cycle time together with having optimal conditions for growth and flowering 111. For example, the indoor cultivation system can operate on accelerate time 113, e.g., forming an accelerated cultivation, in addition to optimal ambient conditions 114, e.g., having climate conditions tailored to the saffron plants, such as different climate controls for different stages of the saffron growth, and improved growth media conditions 115, such as genome-specific fertilizer and moisture absorbance pads for dry plants. The indoor cultivation system for flower harvesting can then have a life cycle 110 of about 2 months, including 2 weeks for a sprouting stage, another 2 weeks for a flowering stage, and 4 weeks for a growing stage. For daughter corm production, the indoor cultivation system can add an extra 2 weeks for daughter corm production.

In addition to temperature cycling, light and humidity can also cycle to simulate the changes in day-night day. For example, light and humidity can follow the daytime and nighttime patterns of temperature. At nighttime, the temperature drops, together with a reduction in light, e.g., dark time, and a higher humidity level. At daytime, the temperature rises, together with an increase in light, e.g., light time, and a lower humidity level, resulted from a higher temperature and higher light lux.

In some cycle stages of the saffron plants, the cycling of light or humidity can be omitted to present optimal environmental conditions. For example, in the flowering stage, the humidity level can remain at a constant low value, signifying a dry ambient for optimal plant flowering. In the sprouting stage, the light condition can be constantly dark, e.g., there is no light for daytime and night time, signifying a dark ambient for optimal plant sprouting.

FIGS. 2A-2B illustrate flow charts for an accelerated cultivation process according to some embodiments. FIG. 2A shows a basic scheme for indoor cultivation of saffron plants. Operation 900 forms a saffron cultivation process with a short flower harvesting cycle of saffron plants by indoor cultivation using accelerate time cycle, optimal ambient conditions, and improved grow medium conditions.

FIG. 2B shows a detail operation for indoor cultivation of saffron plant in different stages. The goals of the sprouting stage and the flowering stage are similar to those of an outdoor cycle, e.g., bud and flower formation. The vegetative stage of the outdoor cycle is shortened to a growing stage, with the leaf development and the dormancy periods reduced or eliminated.

Operation 901 grows saffron plants in an accelerated time cycle of temperature, an accelerated time cycle of light, and an accelerated time cycle of humidity, with the accelerated time cycles of temperature, light, and humidity being at least 5 times less than 24 hours. The saffron plants are grown in a medium containing a saffron-genome specific fertilizer.

Operation 902 sprouts saffron plant in an accelerated time cycle of temperature and an accelerated time cycle of humidity in a dark ambient, with the accelerated time cycles of temperature and humidity being at least 5 times less than 24 hours. The saffron plants are disposed on an absorbance pads to reduce moisture or chemical on the saffron plants.

Operation 903 forming flowers in saffron plant in an accelerated time cycle of temperature and an accelerated time cycle of light in a dry ambient, with the accelerated time cycles of temperature and light being at least 5 times less than 24 hours. The saffron plants are disposed on an absorbance pads to reduce moisture or chemical on the saffron plants.

Trimming to suppress leaf development and avoid dormancy

Figure 3A:
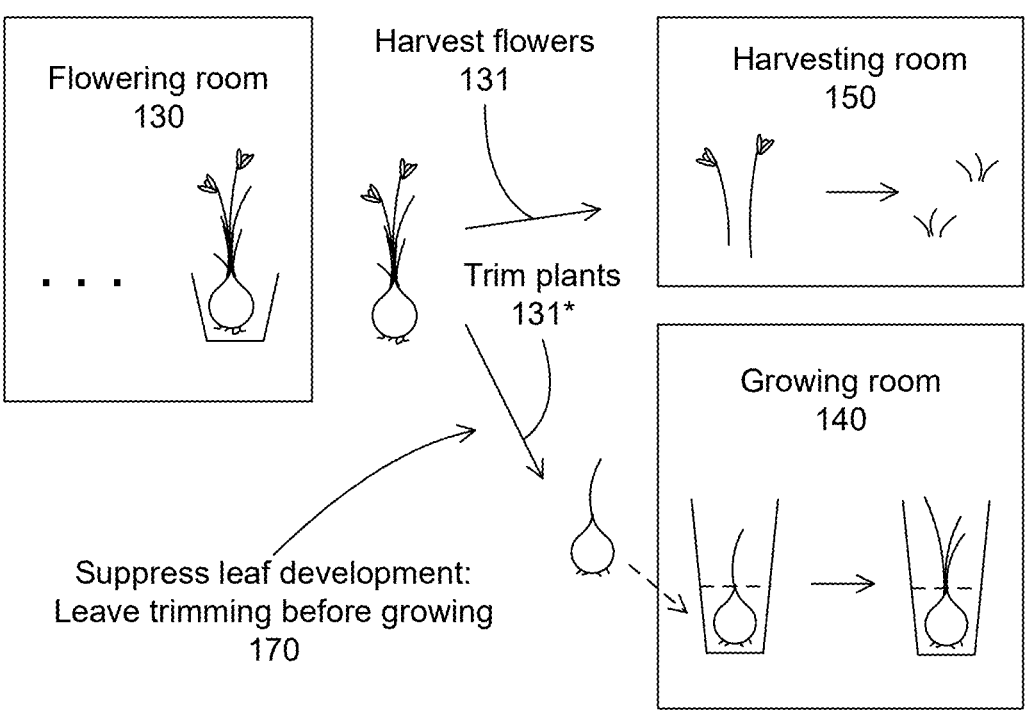
FIGS. 3A-3B illustrate elements of trimming plants together with suitable ambient for accelerating a saffron cultivation process according to some embodiments.
Figure 3B:
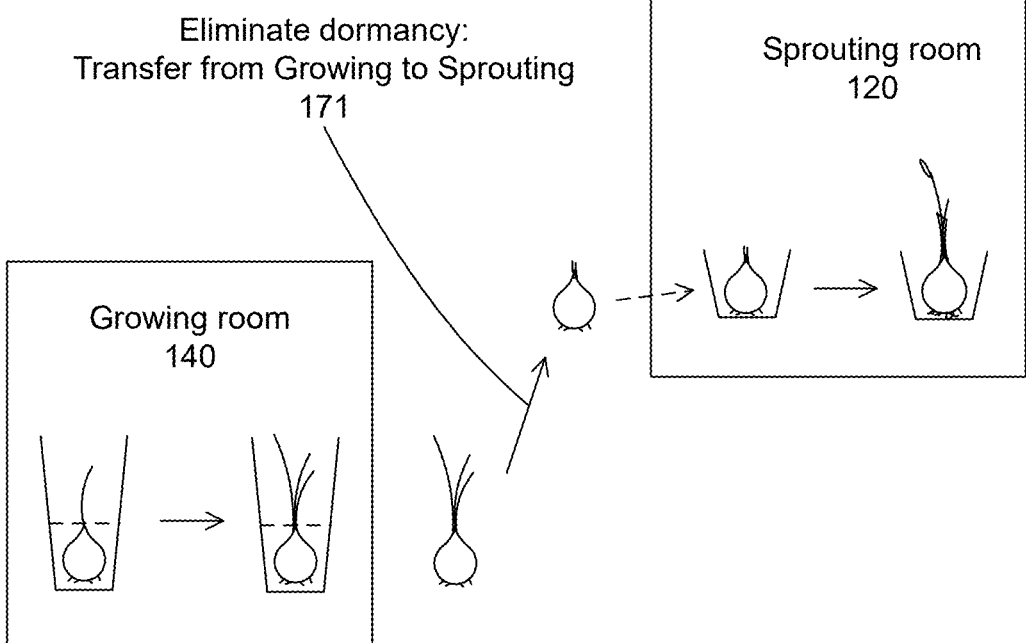

FIGS. 3A-3B illustrate elements of trimming plants together with suitable ambient for accelerating a saffron cultivation process according to some embodiments. The plants can be trimmed after harvesting the flowers, such as cutting all but one or two main stems. The removal of the stems can reduce the leaf development process, so that the corms can grow without spending energy for the leaves. In addition, buds and nodes at sides of the corms can be removed to reduce or eliminate the development of daughter corms. With the removal of stems and side buds, the corms can grow into larger sizes without spending energy for generating leaves or daughter corms.

FIG. 3A shows a schematic for suppressing leaf development 170, for example, by trimming the stems before planting into a growing medium. After the flowers appear and mature in a flowering ambient, such as a flowering room 130, the plants can be removed from the flowering room to harvest 131 the flowers and to trim 131* the plants for corm growing. The flowers can be removed from the plants in a harvest room 150, and the stigmas with optional the stamens and the petals can be harvested from the flowers.

The plants, after the flowers are removed, are trimmed before bring to a growing ambient, such as a growing room 140. The trimming process can include removing some stems from corms. For large corms, two stems can remain but other stems cut. For small corms, only one stem remains. The removal of other stems and leaves can reduce or eliminate the leaf development from the corms, leaving the corms to spend all energy to grow.

The trimming process can also include removing side buds or nodes to maximize a flower harvest. Without the side buds, the daughter corms cannot grow, leaving the corms to spend all energy to grow. The corms can be reused for a certain time, such as for 5-10 years, with a small percentage, such as less than '0% or less than 5% of the corms removed from the replanting process due to being damaged in order to optimize or maximize the flower harvesting.

Thus, a certain percentage of the corms can be allowed to develop daughter corms, such as to replace the damaged mother corms. The daughter-corm-development corms do not have the side buds removed, and can stay longer in the growing room for the daughter corms to reach a mature size, e.g., a size suitable to function as a mother corm for generating flowers.

FIG. 3B shows a schematic for eliminating dormancy 171, for example, by provide a sprouting ambient to corms when the corms reach an acceptable size in the growing room 140, such as bring the corms from the growing room 140 to a sprouting room 120. The sprouting room conditions are suitable for triggering the sprouting stage, and thus the corms can go directly from the growing stage to the sprouting stage.

In addition, the corms can be trimmed to remove all stems and leaves before placing in the sprouting room. Before the dormancy period, the leaves are all dried out, and thus the corms can simulate this condition by being trimmed from all the stems and leaves.

FIGS. 4A-4B illustrate flow charts for using plant trimming and controlled ambient for accelerating a saffron cultivation process according to some embodiments. FIG. 4A shows a process to achieve a shorter flower harvesting cycle by suppressing a deaf development dormancy period.

Operation 904 suppresses leaf development and dormancy in a saffron life cycle to achieve a shorter flower harvesting cycle FIG. 4B shows another process to achieve a shorter flower harvesting cycle by trimming leaves and stems before growing the corms of the plants. Operation 905 trims leaves and stems of saffron plants after harvesting flowers or flower parts of the saffron plants. Operation 906 grows the trimmed saffron plants in a growing medium with genome-specific fertilizer and in ambient conditions suitable for growing saffron plants.

FIG. 4C shows another process to achieve a shorter flower harvesting cycle by trimming leaves and stems before sprouting the plants. Operation 907 trims stems of saffron plants after the saffron plants grow to a specific size or weight. Operation 908 transfers the trimmed saffron plants to an environment with no light and high humidity for sprouting.

FIG. 4D shows another process to achieve a shorter flower harvesting cycle by forming a compartment having accelerated days for growing the plants, and by forming another compartment having climate conditions suitable for sprouting the plants.

Operation 910 forms a first compartment. The first compartment has ambient simulating optimal night and day ambient conditions for growing saffron plants. The first compartment further has a growing medium with genome-specific fertilizer optimal for growing saffron plants. The first compartment is configured to accept saffron plants having leaves and stems trimmed after a harvest of flowers or flower parts of the saffron plants.

Operation 911 forms a second compartment. The second compartment has an ambient configured for simulating optimal night and day ambient conditions for sprouting saffron plants. The second compartment is configured to accept saffron plants having stems trimmed after being grown to a specific size.

Cultivation Process and System

Climate conditions, including air temperature, air humidity, and light levels, play important roles in the life cycle of saffron plants, controlling the entry and exit of various stages such as shoot emergence, flower initiation, leaf development, and dormancy. Thus, the present indoor cultivation system can include multiple compartments with a central or separate multiple control modules. Each compartment can be equipped with a climate control system, which can include a temperature regulator system, a humidity regulator system, a lighting system, or a $CO_2$ system. Other systems can also be included, such as a monitor system. The present cultivation system can provide high quality saffron, e.g., the stigmas of a saffron flower harvested from a saffton plant, e.g., Crocus sativus, which is also known as saffron crocus or autumn crocus, is a species of flowering plant in the iris family Iridaceae.

A temperature regulator system can include an air conditioner for active cooling the compartment, a heater for active heating the compartment, or a combination of air conditioner and heater for quickly regulating the temperature in the compartment, e.g., keeping the temperature at a constant value or varying the temperature to provide optimal temperature for the plant stages. A humidity regulator system can include a humidifier, e.g., a water spray, for rapidly increasing the humidity level, a dehumidifier for rapidly decreasing the humidity level, or a combination of a humidifier and a dehumidifier for quickly regulating the humidity level in the compartment, e.g., keeping the humidity level at a constant value or varying the humidity level to provide optimal humidity for the plant stages. A lighting system can include LED light, fluorescence light, or incandescence light, for providing light, e.g., at a constant or time-changing lux amount to the compartment. A $CO_2$ system can include a cylinder of $CO_2$ with a flow regulator for providing $CO_2$ at constant or time-changing levels to the compartment.

The climate control system can be controlled be a central or separate individual control modules. The control modules can include a temperature control module, a humidity control module, a light control module, or a $CO_2$ control module. For example, a central processor or multiple individual processors, such as a microprocessor in a data processing system, can couple to, for turning on or off, the air conditioner, the heater, the humidifier, the dehumidifier, the lighting system, or the $CO_2$ cylinder. The processor can also couple sensors in the compartments, such as temperature sensor, humidity sensor, light sensor, or $CO_2$ sensor.

As such, a temperature control module for a compartment can include a dedicated processor to control the temperature in the compartment, such as controlling an air conditioner or a heater based on a set temperature and a feedback temperature from a temperature sensor in the compartment. Alternatively, a central temperature control module for multiple compartments can include a central processor to control individual air conditioner or heater in each compartment based on a set temperature and a feedback temperature from a temperature sensor in the compartment.

The indoor cultivation system can be configured to cultivate plants, such as saffron plants, which can include corm growing, bud sprouting, and flowering, together with flower harvesting, including stigma separating. The compartments with the control modules can provide optimal climate conditions, such as temperature, humidity, light, or $CO_2$, together with environmental conditions, such as soil, fertilizer, or absorbance pads for the corms.

The compartments, the plant conditioning, and the movements of the plants through the compartments can serve to increase flower yield, with reused corms without generating daughter corms or with daughter corms without reusing mother corms. For example, experiment data shows that specific air climate and corm environment settings for saffron plants include a sequence of high temperature during corm sprouting, e.g., growing shoot or germinating, to a lower temperature during flower initiation.

Multiple Compartments in the Cultivation System

Thus, the compartments are configured to offer suitable climate and medium conditions for different stages of flower generation, including growing the corms of the plants to specific sizes to maximize flower formation, sprouting the large size corms to initiate flower emergence, and maturing the flowers to be harvested. For example, a growing compartment having a cold and humid air ambient with a humid medium for the corms such as burying the corms in soil mixed with plant-specific fertilizer can provide an optimal corm growth environment.

The fertilizer can include a mineral to improve corm growth. Manure can be added to the growth medium, e.g., soil, to improve both soil organic matter and nutrient content. Chemical fertilizers, such as those providing nitrogen, can be also added. Genome-specific additives, such as sweet components including sugar, syrup, or honey, can be provided to the fertilizer.

A sprouting compartment having a dark warm and wet air ambient with a moisture absorbed medium for the corms such as placing the corms on an absorbance pad can provide an optimal shoot sprouting environment. In addition, before entering the sprouting compartment, the corms are trimmed to remove leaves and stems from the growing stage to encourage new shoots. Since the curing and flower initiation with no light or irrigation, the sprouting compartment can be kept in the dark, with the corms exposed to a humid ambient without being submerged in a wet soil.

A flowering compartment having a cold and dry air ambient with a moisture absorbed medium for the corms such as placing the corms on an absorbance pad can provide an optimal flower growth environment, especially after the shoots have sprouted in the warm temperature in the sprouting compartment. It was found that in high humidity ambient, shoot and leaf growth is significantly enhanced. In contrast, in non-water corms, leaf growth is retarded, leading to leaves emerge after the flowers have opened. Further, watering does not play any significant role on flower development.

Thus, a high humidity level is maintained in the sprouting compartment to encourage shoot growth. And a dry ambient is kept in the flowering compartment to suppress the growth of leaves until after the flowers are opened and harvested. After the harvest, any existing leaves are trimmed to further suppress leaf growth.

Plant Flow Between Compartments

Further, the plants can be moved to appropriate compartments at suitable time, such as moving the corms from the growing compartment to the sprouting compartment when the corms reach at least a minimum size. Since small size corms, e.g., less than 6-8 g or less than 22-30 mm diameter, are likely not producing flowers, longer growing time with additional fertilizer can be provided to the corms in the growing compartment. When the flowers start to emerge in the sprouting compartment, the plants can be moved to the flowering room, which has suitable climate for maturing the flowers.

Further, the plants can be conditioned and then moved to a suitable climate to trigger a next desired development stage while skipping an undesirable stage such as the leaf growing time or the dormancy time. For example, to suppress or to discourage the leaf growing process, the plants can be trimmed, such as cutting all but one or two main stems, after the flowers are harvest, and before the plants are moved to the growing compartment for corm growing. With the growing compartment having a climate best suited for corm growing and not for leaf developing, and with the plants being trimmed of leaves, the plants can enter the corm development stage with a much reduced amount of leaves.

In addition, to suppress or discourage the daughter corm generation process, the buds and nodes at sides of the corms can be removed before the plants are planted in a growing medium such as soil. The mother corms then grow without generating daughter corms. After reaching a size large enough for flower generation in the growing compartment, the mother corms can be reused in a next cycle of flower generation, without the mother corms depleted due to the generation of daughter corms.

A small portion, such as 5-10%, of the mother corms can be allowed to develop daughter corms, in order to replenish damaged mother corms. For this portion, the mother corms do not have the side buds removed, and can stay longer in the growing room for the daughter corms to reach a mature size, e.g., a size suitable to function as a mother corm for generating flowers.

Further, to suppress dormancy, the corms can be grown at a cool temperature in the growing compartment, and germinated in a high humidity climate in the sprouting room. Since dormancy is triggered by a warm and dry weather, the usage of a cool growing compartment and a wet sprouting compartment can bring the corms directly into the bud shooting stage, skipping the dormancy period.

Accelerate Day

The indoor cultivation system can further configure the climate conditions, e.g., the temperature, the humidity, the light, and the $CO_2$ levels, to accelerate the life cycle of the plants. Since it was found that the plant response more to sequences of warm and cool periods with regard to flower induction. Thus, the life cycle of the plants can be shortened by providing short sequences of warm and cool periods, instead of the traditional 24 hours per sequence of warm day and cool night.

The compartments in the indoor cultivation system can have a sequence of warm and cool in less than 24 hours, such as in 2 hours or in any time period. In general, the shorter the sequence time, the better since the plants can be more responsive. However, there is a minimum time for the warm and cool periods, at least to let the plants, such as the corms or the stems, adequately experience the warm or the cool temperature in each period. It was found that the temperature response time for the plants can be less than 4 or 3 or 2 hours, such as about 30 minutes.

Thus, the compartments can have sequences of high and low periods for temperature, for humidity, and for light. The sequences can be synchronized, e.g., a high temperature period corresponds to a low humidity period and a high level of light to represent day time, and a low temperature period corresponds to a high humidity period and a low level of light to represent night time.

In a way, a sequence of high and low periods for temperature, humidity, and light can be considered as a days (with day time and night time), or an accelerate day or a shorter time, with the length of day determined by the period of the sequence. The effect of a high low sequence (or a shorter day or an accelerate day) is not the same as a real-time day, e.g., a 24 hour day. It was found that a high low sequence can be as effective as more than 0.2, 0.3, 0.4, 0.5, 0.6, 0.7, 0.8, or more than 0.9 day.

Some sequence of light or humidity can be omitted. For example, the corms can prefer a dark ambient for sprouting, so the sprouting compartment can be kept in the dark, regardless of day or night. In other words, there is no need for sequences of light and dark in the sprouting compartment. Similarly, the flower conditions can prefer a dry ambient, so the flowering compartment can be kept at a constant low level of humidity, regardless of day or night. In other words, there is no need for sequences of low and high humidity levels in the sprouting compartment.

Figure 5:
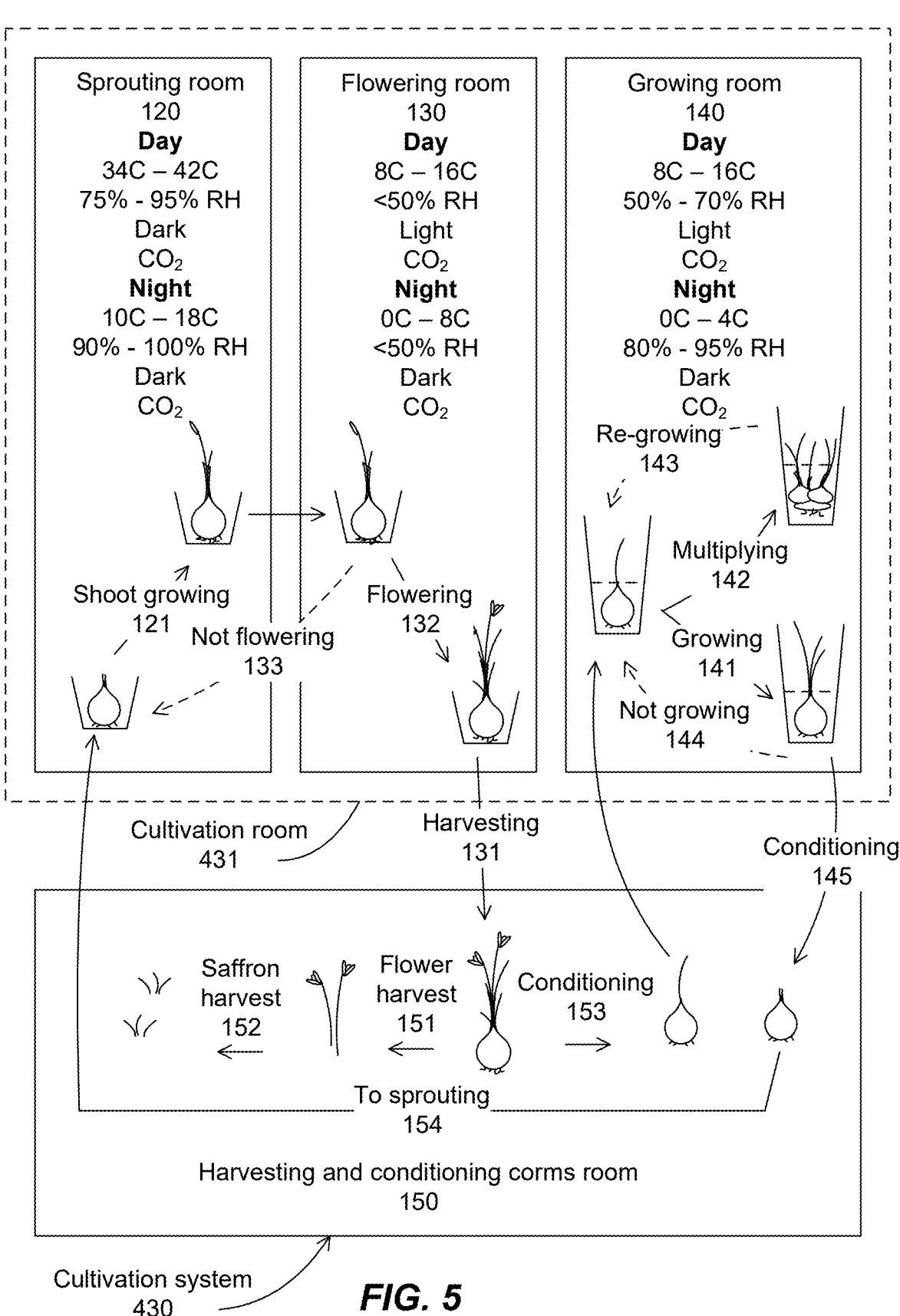
FIG. 5 illustrates a basic saffron cultivation process according to some embodiments.

FIG. 5 illustrates a basic saffron cultivation process according to some embodiments. A cultivation system 430 can have multiple rooms, which include a sprouting room 120, a flowering room 130, a flowering room 140, and an optional harvesting and corm conditioning room 150. A room can have a temperature system, a humidity system, and an optional lighting system. Other systems can be included, such as a $CO_2$ system or a monitor system.

Temperature System

The temperature system can include an equipment configured to change or maintain a temperature of a room, such as to cool or heat the room, such as an air conditioner for cooling the room air, a heater for heating the room air, a combination of air conditioner and heater for adjusting a rate of cooling or heating, a heat pump for cooling or heating, or any air changing system, such as an evaporated fan. The temperature system can include a control system, such as a controller to turn on or off the temperature equipment to achieve a set temperature or a set rate of temperature. The temperature equipment can be an on-off equipment, such as an air conditioner with an on-off button to turn on or turn off. To regulate the temperature, the air conditioner can be turned on when the temperature increases above a setpoint, and can be turned off when the temperature reaches the setpoint or below the setpoint. The temperature equipment can be a variable control equipment, such as an air conditioner with a variable cooling rate. To regulate the temperature, the air conditioner can be running with a cooling rate adequate to maintain the temperature of the room at the setpoint temperature. To start, the air conditioner can be turned on with a high cooling rate until the temperature is lowered to the setpoint. Then the cooling rate is reduced to a level adequate to maintain the setpoint temperature. Alternatively, the air conditioner can be running with a cooling rate proportional to a difference in room temperature and setpoint temperature. Thus, when the room is hot, the cooling rate is high to quickly reduce the temperature. When the temperature is close to the setpoint temperature, the cooling rate is reduced to zero or to a minimum cooling rate adequate to maintain the setpoint temperature.

For example, the flowering room can be set to maintain at 4 C for 30 minutes to simulate a night time of a relatively cooler period in a sequence of temperature swing between cooler and warmer. To achieve this temperature setting, the temperature equipment, such as an air conditioner, can be turned on until a temperature sensor in the room provides a read temperature of 4 C, e.g., the set cooler temperature.

The flowering room can be set to gradually increase from 4 C to 12 C in 30 minutes to simulate a night to day transition time, with 12 C being the day temperature of a relatively warmer period in the sequence of temperature swing between cooler and warmer. To achieve this temperature increase, the temperature equipment, such as an air conditioner, can be turned off until a temperature sensor in the room provides a read temperature of 12 C, e.g., the set warmer temperature. If the rate of rise is too fast, e.g., higher than a rising rate of (12–4) C/30 minutes, e.g., the set temperature rate of rise, the air conditioner can be turned on to slow down the rate of rise. The air conditioner can be turned on and off to reach the set rate of rise. If the rate of rise is too slow, e.g., lower than the set rising rate of (12–4) C/30 minutes, a heater can be turned on to increase the rate of rise. The heater can be turned on and off to reach the set rate of rise.

Humidity System

The humidity system can include an equipment such as a humidifier, e.g., a mist spray, configured to supply moisture to the room, or a dehumidifier configured to remove moisture from the room, or a combination of a humidifier and a dehumidifier for adjusting a rate of supplying or removing the moisture. The humidity system can include a controller to turn on or off the humidity equipment to achieve a set humidity level or a set rate of humidity. The humidity system can be an on-off system or can be a variable flow system.

For example, the sprouting room can be set to maintain at 99% relative humidity (RH) for 30 minutes to simulate a night time of a relatively wetter period in a sequence of humidity swing between wetter and dryer. To achieve this humidity setting, the humidity equipment, such as a humidifier or a mist spray, can be turned on until a humidity sensor in the room provides a read humidity level of 99% RH, e.g., the set wetter humidity.

The sprouting room can be set to gradually decrease from 99% RH to 85% RH in 30 minutes to simulate a night to day transition time, with 85% RH being the day humidity level of a relatively dryer period in the sequence of humidity swing between wetter and dryer. To achieve this humidity decrease, the humidity equipment, such as the humidifier, can be turned off until a humidity sensor in the room provides a read humidity of 85% RH, e.g., the set dryer humidity. If the rate of decreasing is too fast, e.g., higher than a decreasing rate of (99–85)% RH/30 minutes, e.g., the set humidity rate of decreasing, the humidifier can be turned on to slow down the rate of decreasing. The humidifier can be turned on and off to reach the set rate of decreasing. If the rate of decreasing is too slow, e.g., lower than the set decreasing rate of (99–85)% RH/30 minutes, a dehumidifier can be turned on to increase the rate of decreasing. The dehumidifier can be turned on and off to reach the set rate of decreasing.

Lighting System

The lighting system can include a lighting equipment, such as a light source, configured to provide light to the room, The lighting system can include a controller to turn on, to turn off, or to gradually increase or decrease the light source to achieve a set lux rate or a set lux level, such as between 3500 and 5500 lux, or between 4000 and 5000 lux, or about 4500 lux. The light source can include LEDs, such as normal white LEDs, or other color LEDs. There can be no particular wavelengths. The lighting system can be an on-off system, or a variable lighting system.

For example, the growing room can be set to maintain a set lux level when the temperature is above 8 C to simulate a day time of a relatively brighter period in a sequence of lighting swing between darker and brighter. To achieve this lighting setting, the lighting equipment, such as a light source, can be turned on to provide a set lux level when a temperature sensor in the room provides a read temperature above 8 C, e.g., the set brighter temperature. For example, at the simulated night when the temperature is at 2 C, the light source is turned off. At the transition from the simulated night to the simulated day, when the temperature reaches 8 C, the light source is turned on. The light source remains turning on during the simulated day when the temperature is at 12 C. At the transition from the simulated day to the simulated night, when the temperature reaches 8 C, the light source is turned off. The light source remains turning off during the simulated night when the temperature is at 2 C.

Alternatively, the light source can be gradually turning on, e.g., gradually increasing the lux level from 0 lux level at the beginning of the transition time from the simulated night to day to the set lux level at the end of the transition time. Similarly, the light source can be gradually turning off, e.g., gradually decreasing the lux level from the set lux level at the beginning of the transition time from the simulated day to night to the 0 lux value at the end of the transition time.

The sprouting room 120 can have at least a temperature system and a humidity system. Other systems can be optionally included, such as a lighting system, a $CO_2$ system, or a monitor system. The temperature system can include a temperature equipment such as an air conditioner, a heater, a combination of air conditioner and heater, or any air temperature changing system. The temperature system can include a controller to regulate the temperature equipment. The humidity system can include a humidity equipment such as a humidifier, a dehumidifier, or a combination of a humidifier and a dehumidifier. The humidity system can include a controller to regulate the humidity equipment.

The temperature setting of the sprouting room can oscillate between a day temperature and a night temperature. The day temperature can be between 34 C and 42 C, such as between 36 C and 40 C, or at about 38 C. The night temperature can be between 10 C and 18 C, such as between 12 C and 16 C, or at about 14 C. The day or night temperature can be set for more than 20 minutes, more than 30 minutes, more than 1 hour, or more than 2 hours. The transition time from day to night or from night to day can be set for more than 20 minutes, more than 30 minutes, more than 1 hour, or more than 2 hours.

The humidity setting of the sprouting room can oscillate between a day humidity and a night humidity. The day humidity can be between 75% RH and 95% RH, such as between 80% RH and 90% RH, or at about 85% RH. The night humidity can be between 90% RH and 100% RH, such as greater than 95% RH, or at about 99% RH. The day or night humidity can be set for more than 20 minutes, more than 30 minutes, more than 1 hour, or more than 2 hours. The transition time from day to night or from night to day can be set for more than 20 minutes, more than 30 minutes, more than 1 hour, or more than 2 hours.

There can be no lighting system in the sprouting room for the life cycle of the plants. The sprouting room can have optional lighting system, for emergency purpose, or when or if the plants require.

There can be a $CO_2$ system configured to provide a level of $CO_2$ to the sprouting room. The $CO_2$ system can be a compressed cylinder of $CO_2$, with a flow controller configured to provide a set level of $CO_2$ to the sprouting room, such as between 725 ppm and 925 ppm, 775 ppm and 875 ppm, or about 825 ppm.

The harvesting and corm conditioning room 150 is used for harvesting the flowers and for conditioning the corms, e.g., the room is used for workers to collect flowers, stigmas, stamens, or petals, and also to trim the plants. The harvesting room can be at room temperature and lighting.

The cultivation system can include optional monitoring system, which includes air temperature sensor, soil temperature sensor, air humidity sensor, soil humidity sensor, fertilizer condition in soil, light sensor, $CO_2$ concentration sensor, cameras, or other components configured to provide indications of the various rooms. For example, the cameras can allow a work to monitor or view the status of the plants, such as the corm germination status, the shoot growing status, the flower initiation status, and the flower blooming status. Pattern recognition can also be included to generate status of the plants based on the images captured by the cameras. In addition, the monitoring system can include a controller having setpoints. The controller can provide alerts if a sensor value exceeds a tolerance value from the setpoint.

With the indoor cultivation system having multiple compartments, a life cycle for flower harvest can be 56-60 days.

The Sprouting Room

In operation, mother corms above a minimum size, such as above 7 or 8 g, are inspected and conditioned before placing in the sprouting room 120 for germination or shoot sprouting 121. The inspection includes discard any corms that are contaminated, such as with a black mold. The mother corms can be placed on absorbance pads, such as kitchen towels, in trays. The corms prefer not to have contact with a liquid such as water or chemical. As such, the absorbance pads can absorb any liquid on the trays. The presence of the absorbance pads can significantly enhance in growing rates of the shoots, up to 30-35% enhanced.

The mother corms are also conditioned, such as trimming the stems by cutting off the stems, leaving about 5-7 mm at the top. Further, the corm conditioning also includes cutting off any buds or shoots coming out from sides of the corms.

The corms are sorted according to their sizes, and then placed on different trays with same or similar size corms on same trays. The trays can be stacked in a cart and wheeled to the sprouting room. The sprouting room has a high humidity level, even at simulated day time. The humidity level is constantly monitored. Since the corms are exposed without soil, the humidity level is that of the air humidity.

The climate conditions in the sprouting room 120 are best suited for shoot sprouting. For example, the temperature for sprouting can be warm. The temperature can cyclically vary, for example, between a night temperature between 11 C and 17 C, such as between 13 C and 15 C, or at about 14 C and a day temperature between 35 C and 41 C, such as between 37 C and 39 C, or at about 38 C. The day temperature and the night temperature can be maintained for less than 2 hours, less than 1 hour, less than 40 minutes, less than 20 minutes, or about 30 minutes. The transition temperature from day to night or from night to day can provide a linear or non-linear transition time of less than 2 hours, less than 1 hour, less than 40 minutes, less than 20 minutes, or about 30 minutes.

The humidity for sprouting can be very humid, almost at the saturation limit. The humidity also cyclically varies, in opposite direction of the temperature, e.g., the humidity level is higher at night when the temperature is low, and the humidity level is lower when the temperature is high, to simulate outdoor conditions. The humidity level can vary between a day humidity between 79% RH and 91% RH, such as between 82% RH and 88% RH, or at about 85% RH, and a night humidity between 90% RH and 100% RH, such as greater than 95% RH, or at about 99% RH. The duration and the transition times of day and night humidity can be similar to those of the temperature. The humidity level can be achieved with a humidifier, such as a water spray or a mist spray. For example, the humidifier can be turned on, for example, when the temperature in the sprouting room is below 24 C, indicating a night time when the humidity level is high, e.g., at or near saturation. An optional dehumidifier can be used to remove excess humidity. For example, an air conditioner or a heater can also function as a dehumidifier.

The sprouting conditions do not require light, so the sprouting room can be dark, e.g., there can be no light, or the light can be turned off.

The $CO_2$ system can be configured to provide a level of $CO_2$ between 775 ppm and 875 ppm, 800 ppm and 850 ppm, or about 825 ppm.

The temperature and humidity levels cyclically vary with a period of 2 hours, which provides a time acceleration of 12. The time acceleration can greatly speed up the maturity of the plants, which can be up to 12 times, such as greater than 5, 6, 7, 8, 9, 10, or 11 times. For example, the sprouting time can be 2 weeks, instead of an outdoor sprouting time of 12 weeks, for an acceleration of 6 times.

After 2 weeks, the corms can be moved to the flowering room, for example, by moving the cart containing stacks of corm trays. A condition for the transfer to the flowering room can be a healthy growth of shoots, or an onset of flowering, e.g., the emergence of flower buds. If any corm does not meet the requirement, e.g., small shoot growth, or no indication of slower emergence, the corm can stay in the sprouting room for some more time, such as for another period of 2 weeks.

The Flowering Room

The climate conditions in the flowering room 130 are best suited for flower blooming. For example, the temperature in the flowering room is much lower than the temperature in the sprouting room. The temperature can cyclically vary, for example, between a night temperature between 0 C and 8 C, such as between 2 C and 6 C, or at about 4 C and a day temperature between 8 C and 16 C, such as between 10 C and 14 C, or at about 12 C. The day temperature and the night temperature can be maintained for less than 2 hours, less than 1 hour, less than 40 minutes, less than 20 minutes, or about 30 minutes. The transition temperature from day to night or from night to day can provide a linear or non-linear transition time of less than 2 hours, less than 1 hour, less than 40 minutes, less than 20 minutes, or about 30 minutes.

The humidity level for flowering can be very low, e.g., the flowering room is dry at all time. Thus the humidity can be kept at a low humidity level of less than 60% RH, less than 50% RH, or less than 40% RH. The dry condition, e.g., low humidity level, can be achieved with a dehumidifier, which can be constantly on to reduce the humidity level.

The lighting condition for flowering can be similar to an outdoor configuration, e.g., light on in the day time and light off in the night time, except the lighting in the flowering room follows an accelerated day scheme, similar to the accelerated day scheme used with temperature. Thus, the light cyclically varies in synchronization of the day or night cycle of the temperature. The lighting level can vary between a day light between 4000 and 5000 lux, or 4250 and 4750 lux, or about 4500 lux. The light source can include LEDs, such as normal white LEDs, or other color LEDs. There can be no particular wavelengths.

The duration and the transition times of day and night lighting can be based on the temperature with a fast transition for light to dark by turning off the light, and a fast transition for dark to light by turning on the light. For example, the light can be turned on when the temperature is above a set temperature, such as between 6 and 10 C, or between 7 and 9 C, or at about 8 C, signifying the coming of the day when the temperature is warmer. The light can be turned off when the temperature is below a set temperature, such as the set temperature to turn on the light. Other set temperatures can be used for turning off the light. With similar temperature setting for light on and light off, the light can be on when the temperature is above the set temperature, and can be off when the temperature is below the set temperature.

Alternatively, the duration and the transition times of day and night lighting can be similar to those of the temperature.

The $CO_2$ system can be configured to provide a level of $CO_2$ between 775 ppm and 875 ppm, 800 ppm and 850 ppm, or about 825 ppm.

The temperature and lighting levels cyclically vary with a period of 2 hours, which provides a time acceleration of 12. The time acceleration can greatly speed up the maturity of the plants, which can be up to 12 times, such as greater than 5, 6, 7, 8, 9, 10, or 11 times. For example, the flowering time can be 2 weeks, instead of an outdoor flowering time of 12 weeks, for an acceleration of 6 times.

The plant can stay in the flowering room for 2 weeks in which the flowers can bloom 132. After 2 weeks, the flowers can be harvested, for example, by transferring the plants to a harvesting room. Alternatively, the flowers can be harvested as soon as they mature.

A condition for the transfer out of the flowering room can be the blooming of flowers. So if the plants do not bloom after the set time, e.g., 2 weeks, the plants can be returned 133 to the sprouting room for additional shoot growing, such as for another period of 2 weeks.

Three flowers typically bloom from one plant. Usually, it takes about a week for the first to third flowers to bloom. Almost all plants have the first flower blooming at a same time, and the second and third flowers bloom separately.

The Harvest Room

After flowering, the plants can be transferred out 131 of the flowering room 130 to the harvesting room 150, or, if the plants do not flower, the plants can be return 133 to the sprouting for further shoot sprouting, for example, for 2 more weeks, together with a next batch.

The flowers can be harvested 151 in the harvesting room 150. The petals, stamens, and the stigmas can be collected 152 separately from the flowers. After harvesting the flowers, the plants can be conditioned 153, e.g., trimmed, before being moved to the growing room 140. For example, excess stems can be cut off, leaving one or two large stems, depending on the size of the corms.

Depending on whether the plants will be reused for another batch of flowers or the plants will be used for growing daughter corms with the mother corms depleted, the side buds or shoots on the corms of the plants will be removed or not. By removing the side buds, the mother corms will likely grow without generating daughter corms, for example, in the growing room. After growing 141 to a certain size, such as larger than 7-9 g each, the mother corms can be reused for sprouting and flowering, such as by conditioning 145 the corms. If the corm size is not larger than the size limit, the plants can be returned 144 to the growing room for addition time.

By leaving the side buds on the mother corms, and by leaving the mother corms in the growing room for a longer period of time, daughter corms can be developed 142 with energy from the mother corms. The mother corms will be depleted and discarded. The daughter corms can be used as mother corms for a next flowering cycle.

After being trimmed, e.g., the excess stems cut off with the side buds removal or not, the plants having the corms coupled to one or two large remaining stems are planted in containers having a grow medium such as soil mixed with fertilizer. The corms are buried in the grow medium, leaving the stems protruded out of the grow medium.

The containers are transferred to the growing room, for example, by placing the containers in shelf carts, and the shelf carts moved or rolled into the growing room.

The Growing Room

The climate conditions in the growing room 140 are best suited for growing the corms, e.g., for the corms to grow in size or to multiply, with the grown corms acquiring needed energy and mass for shoot sprouting and for flower formation in later time. The climate conditions in the growing room is also configured to discourage undesirable plant stages such as dormancy, for example, by providing a cold and wet climate, which is contrast to a warm dry climate needed to trigger and maintain dormancy.

For example, the temperature for corm growing can be cool, with a temperature between day and night between 6 and 14 C, or between 8 and 12 C, or about 10 C. There can be a difference between the air temperature and the soil temperature in which the corms are buried. The temperature difference can be less than 6 C, less than 4 C, or about than 2 C. For example, when the air temperature, conditioned by the air conditioner, is at 2 C, the measured soil temperature can be about 4 C, with a 2 C different soil medium.

It was found that saffron plants can grow well with soil temperature varying between 0 and 8 C for night time and between 10 and 18 C for day time. Thus, the air temperature can cyclically vary, for example, between a night temperature of less than 6 C, such as between 0 C and 4 C, or at about 2 C and a day temperature between 8 C and 16 C, such as between 10 C and 14 C, or at about 12 C. The day temperature and the night temperature can be maintained for less than 2 hours, less than 1 hour, less than 40 minutes, less than 20 minutes, or about 30 minutes. The transition temperature from day to night or from night to day can provide a linear or non-linear transition time of less than 2 hours, less than 1 hour, less than 40 minutes, less than 20 minutes, or about 30 minutes.

The humidity for growing can be humid, e.g., at a high humidity level without damaging the corms. The corms can grow best when being in sequences of completely wet and completely dry. Further, the corms can suffer damage, such as turning to mush, for excessive wetness such as being in close proximity with a medium, e.g., soil, having a humidity limit above 60% RH for a some time.

Thus, the humidity cyclically varies in opposite direction of the temperature, e.g., the corms are thoroughly wet, but without being exposed to the high humidity limit, by the end of the night, and the corms are thoroughly dry by the end of the day. The soil humidity level can vary between a day humidity between 38% RH and 46% RH, such as between 40% RH and 44% RH, or at about 42% RH, and a night humidity between 55% RH and 65% RH, such as less than 60%, or at about 59% RH.

There can be a relationship between the air humidity and the soil humidity. For example, for a suitable soil medium for saffron plants, the air humidity level can vary between a day humidity between 50% RH and 70% RH, such as between 55% RH and 65% RH, or at about 60% RH, and a night humidity between 79% RH and 99% RH, such as between 84% RH and 94% RH, or at about 89% RH. The changing in humidity level can be accomplished by turning on a humidifier, such as a mist spray. For example, the mist spray can be turned on when the air temperature drops to below 8 C, to increase the air humidity level at night time.

The duration and the transition times of day and night humidity can be similar to those of the temperature. The humidity level can be achieved with a humidifier, such as a water spray or a mist spray. For example, the humidifier can be turned on, for example, when the temperature in the sprouting room is below 24 C, indicating a night time when the humidity level is high, e.g., at or near saturation. An optional dehumidifier can be used to remove excess humidity. For example, an air conditioner or a heater can also function as a dehumidifier.

The lighting condition for flowering can be similar to an outdoor configuration, e.g., light on in the day time and light off in the night time, except the lighting in the flowering room follows an accelerated day scheme, similar to the accelerated day scheme used with temperature. Thus, the light cyclically varies in synchronization of the day or night cycle of the temperature. The lighting level can vary between a day light between 4000 and 5000 lux, or 4250 and 4750 lux, or about 4500 lux. The light source can include LEDs, such as normal white LEDs, or other color LEDs. There can be no particular wavelengths. For optimum conditions, the light sources can be installed in proximity of the plants, such as on bottoms of each shelf of the shelf cart, to provide direct light to the plants in the container.

The duration and the transition times of day and night lighting can be based on the temperature with a fast transition for light to dark by turning off the light, and a fast transition for dark to light by turning on the light. For example, the light can be turned on when the temperature is above a set temperature, such as between 6 and 10 C, or between 7 and 9 C, or at about 8 C, signifying the coming of the day when the temperature is warmer. The light can be turned off when the temperature is below a set temperature, such as the set temperature to turn on the light. Other set temperatures can be used for turning off the light. With similar temperature setting for light on and light off, the light can be on when the temperature is above the set temperature, and can be off when the temperature is below the set temperature.

Alternatively, the duration and the transition times of day and night lighting can be similar to those of the temperature.

The $CO_2$ system can be configured to provide a level of $CO_2$ between 775 ppm and 875 ppm, 800 ppm and 850 ppm, or about 825 ppm.

The temperature and humidity levels cyclically vary with a period of 2 hours, which provides a time acceleration of 12. The time acceleration can greatly speed up the maturity of the plants, which can be up to 12 times, such as greater than 5, 6, 7, 8, 9, 10, or 11 times. For example, the sprouting time can be 2 weeks, instead of an outdoor sprouting time of 12 weeks, for an acceleration of 6 times.

After 4 weeks, the plants can move out 145 of the growing room, for example, by moving the cart containing stacks of plant containers. A condition for the transfer out of the growing room can be a healthy growth of corms, e.g., corms growing to at least a minimum size of about 9 g. If any plant does not meet the requirement, e.g., the plant having less than 9 g corms, the plant can stay 144 in the growing room for some more time, such as for another period of 4 weeks. Additional fertilizer can be added to the soil in the container.

The plants are digged up from the soil medium, and the corm sizes evaluated. If the corms are smaller than the size limit, e.g., less than about 9 g, the plants are replanted in the container, to be returned to the growing room. For the plants undergo daughter corm development, the size limit applies to the individual daughter corms.

If the corms are larger than the size limit, the corms are trimmed, for example, by trimming the root and cutting of the stems, including top and side stems. The corms can be subjected to a drying ambient to dry the corms, such as by exposing the corms to a dry warm ambient for a time period, e.g., humidity level less than 50% RH and air temperature between 16 and 20 C, such as at about 18 C for two weeks.

The corms are sorted according to their sizes, and placed on absorbance pads on trays, to be stacked on a shelf cart, and wheeled 154 to the sprouting room.

Figure 6A:
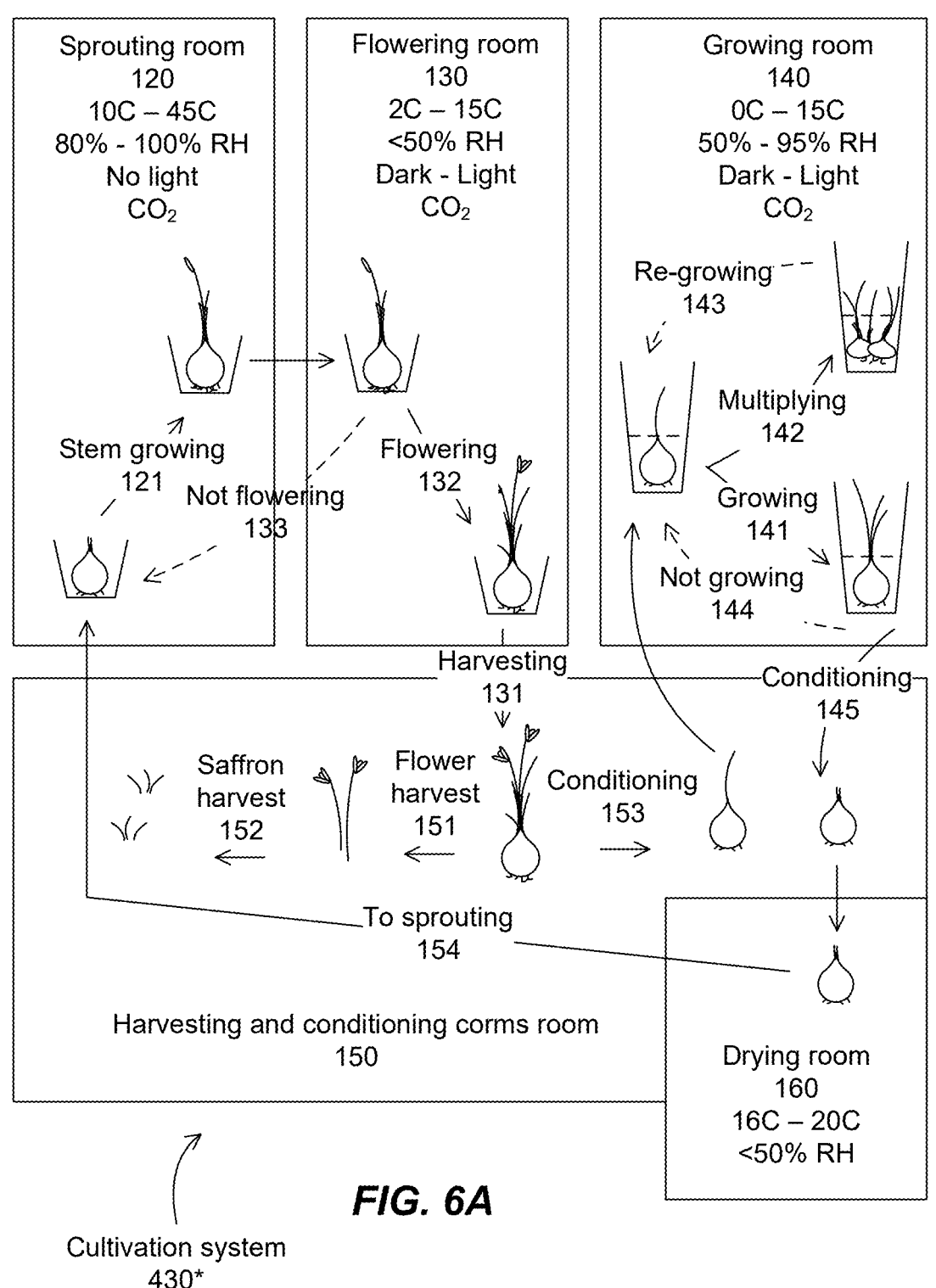
FIGS. 6A-6B illustrate an alternate saffron cultivation process according to some embodiments.
Figure 6B:
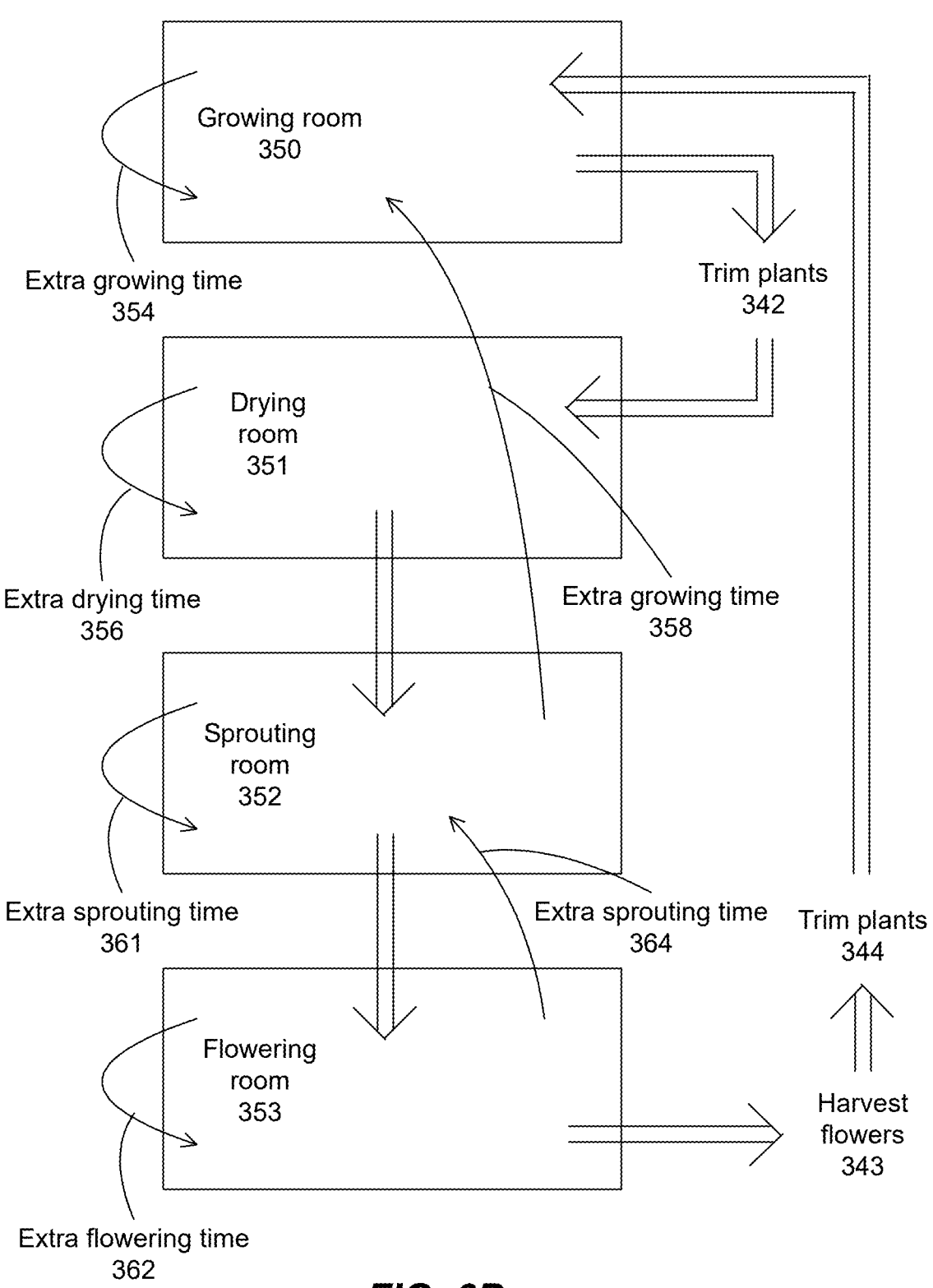

FIGS. 6A-6B illustrate an alternate saffron cultivation process according to some embodiments. In FIG. 6A, the cultivation system 430* can have an additional drying room 160, which is dedicated for drying the corms. The drying room can have a warm dry climate, such as having a temperature between 16 and 20 C, or between 17 and 19 C, or about 18 C, and a humidity level of less than 60% RH, less than 50% RH, or less than 40% RH. The corms can be dried in the drying room for about 2 weeks, or until the corms are dried and ready to be sprouted in the sprouting room.

Alternatively, the corms can be dried in the sprouting room, in the flowering room, or in the growing room, with the temperature and humidity level adjusted to those of the drying room.

FIG. 6B shows a cultivation system with a possible operating flow. The cultivation system can include a growing room 350, a drying room 351, a sprouting room 352, and a flowering room 353.

In operation, a cultivation process can start with depleted corms of plants, such as saffron plants. The corms can be brought to the growing room 350 to grow the corms. After a fixed time, such as 4 weeks, the corms can be sorted. The corms having sizes greater than a minimum limit can be trimmed 342, and then brought to the drying room 351 for drying. The corms that do not meet the size limitation can be brought back 354 to the growing room 350 for extra time for growing. To not disrupt the process flow, the under-sized corms can stay in the growing room for an extra time of 4 weeks to exit together with a new batch.

After a fixed time such as 2 weeks in the drying room, the dried corms can be brought to the sprouting room 352. The corms that do not meet the dried requirement, e.g., still not adequately dried, can stay 356 in the drying room for an extra 2 weeks with the new batch.

After a fixed time such as 2 weeks in the sprouting room, the sprouted corms can be brought to the flowering room 353. The corms that do not sprout, for example, being too small or slow to sprout, can be brought back 358 to the growing room for an extra 4 weeks with the new batch, or can stay 361 in the sprouting room for an extra 2 weeks with the new batch.

After a fixed time such as 2 weeks in the flowering room, the flowered corms can be brought to the harvest room 343 for harvesting the flowers. After being trimmed 344, the trimmed corms can be brought back to the growing for a new cycle of plant growth. The corms that do not flower can be brought back 364 to the sprouting room for an extra 2 weeks with the new batch, or can stay 362 in the flowering room for an extra 2 weeks with the new batch.

Alternatively, a cultivation process can start with ready-to-sprout corms of plants, such as corms meeting the size requirement. The ready-to-sprout corms can be brought to the sprouting room 352 for sprouting. After the sprouting room, the corms can be brought to the flowering room, and then to the harvesting room for harvesting the flowers, as discussed above. The cycle then continues similar to the depleted corms.

FIGS. 7A-7B illustrate flow charts for a saffron cultivation process according to some embodiments. FIG. 7A shows a cultivation system, which can be used for cultivating saffron plants for harvesting flowers, such as harvesting stigmas, stamens, and/or petals of the saffron flowers.

Operation 912 forms an indoor saffron cultivation system. The system has includes a first compartment or room for growing, a second compartment or room for sprouting, and a third compartment or room for flowering, with the compartments providing ambient conditions to simulating periods of day and night of a fraction of a 24 hours for accelerating saffron plant growth. The system further includes an optional fourth compartment or room for drying and an optional fifth compartment or room for harvesting.

The first compartment has ambient conditions including cyclic changes in temperature, humidity, and light levels suitable for growing corms of saffron plants. The first compartment further has a growing medium with genome-specific fertilizer optimal for growing saffron plants. The first compartment is configured to accept saffron plants having leaves and stems trimmed after a harvest of flowers or flower parts of the saffron plants.

The second compartment has ambient conditions including cyclic changes in temperature, and humidity levels suitable for sprouting saffron plants. The second compartment further has absorbance pads under the corms of the saffron plants for moisture absorption. The second compartment is configured to accept saffron plants having stems trimmed after being grown to a specific size.

The third compartment has ambient conditions including cyclic changes in temperature, and light levels with a dry humidity level suitable for plant flowering. The third compartment further has absorbance pads under the corms of the saffron plants for moisture absorption.

The fourth compartment has ambient conditions including warm temperature and dry humidity suitable for corm drying. The fourth compartment further has absorbance pads under the corms of the saffron plants for moisture absorption. The fourth compartment is configured to accept saffron plants having stems trimmed after being grown to a specific size. Accelerating cycles The compartments of the cultivation system include ambient conditions to simulating periods of day and night for accelerating saffron plant growth, together with ambient conditions in each compartment designed for optimal stages of the saffron plants. Thus, the ambient conditions include cyclic changes, or repeated sequences, in temperature, humidity and light levels, with the cyclic changes all having a same periodicity that represents a cycle of day and night.

A cycle of day and night can be represented by simultaneous sequences of temperature, humidity, and light with a period of 24 hours. A day time period can be represented by high temperature, low humidity, and bright light, while a night time period can be represented by lower temperature, higher humidity, and less light or no light, e.g., dark.

The cultivation system can provide simulated cycles of day and night, with the simulated cycles including any combination of the repeated sequences of temperature, humidity, or light. For example, a simulated cycle can be represented by all three cyclic changes in temperature, humidity, and light. In this case, a simulated day time period can be represented by high temperature, low humidity, and bright light, while a simulated night time period can be represented by lower temperature, higher humidity, and no light.

Alternatively, a simulated cycle can be represented by cyclic changes in temperature and humidity, with no change in light, e.g., the light can remain dark (or bright) in both day and night time. For example, a simulated day time period can be represented by high temperature and low humidity, with an absence of light, while a simulated night time period can be represented by lower temperature and higher humidity, and with also an absence of light.

Alternatively, a simulated cycle can be represented by cyclic changes in temperature and light, with no change in humidity, e.g., the humidity level can remain dry (or wet) in both day and night time. For example, a simulated day time period can be represented by high temperature and dark, with a dry humidity, while a simulated night time period can be represented by lower temperature and bright light, and with also a dry humidity.

The simulated cycle can be configured to provide accelerate time, which is a time period of the cyclic temperature change (or a time period of a temperature sequence) less than 24 hours, such as only a fraction of 24 hours, such as less than or equal to 12 hours, 8 hours, 6 hours, 4 hours, 3 hours, 2 hours, or 1 hour.

The repeated sequences of temperature, humidity, and light can include a transition period from day to night, and a transition period from night to day. For example, a repeated temperature sequence can include a night temperature time interval in which the temperature is set to be constant at the low temperature, followed by a night-to-day transition time interval in which the temperature is set to increase from the low temperature to the higher temperature, followed by a day temperature time interval in which the temperature is set to be constant at the higher temperature, followed by a day-to-night transition time interval in which the temperature is set to decrease from the higher temperature to the low temperature.

The transitions between day and night can be abrupt, for example, a transition from bright to dark can be performed by turning off a light source, or a transition from dark to bright can be performed by turning on the light source. For example, the simulated cycle of light can follow the simulated cycle of temperature by a light source turning on when a temperature is above a set temperature, signifying day time, e.g., the light is on when the temperature is above the set temperature, and the light is off when the temperature is below the set temperature.

The transitions can be gradually, such as a transition of temperature from a day time of high temperature to a night time of lower temperature with a linear relationship, e.g., a transition with a constant rate of change of temperature versus time. Non-linear transitions can also be used. For example, the simulated cycle of light can follow the simulated cycle of temperature by a light source gradually increasing from a totally dark level to a totally bright level, in synchronization with a temperature starts to increase from the low night temperature to the high day temperature. Similarly, the light source is gradually decreased from the totally bright level to the totally dark level, in synchronization with the temperature starts to decrease from the high day temperature to the low night temperature.

First Compartment for Growing

In the growing room, the ambient conditions include cyclic changes in temperature, humidity, and light. A high temperature, low humidity, and bright light are characteristics of a simulated day time ambient conditions in the growing room. A lower temperature, higher humidity, and dark ambient are characteristics of a simulated night time ambient conditions in the growing room.

The high temperature can be greater than 9 C, 11 C, 12 C, 13 C, 15 C, or between 9 and 15 C, between 10 and 14 C, or between 11 and 13 C, or about 12 C. The low temperature can be less than 6 C, less than 5 C, less than 4 C, less than 3 C, less than 2 C, less than 1 C, or between 0 and 4 C, or between 1 and 3 C, or about 2 C.

The high humidity level can be less than 100% relative humidity (RH), such as between 80 and 100% RH, or between 85 and 95% RH, or about 89% RH. The low humidity level can be between 45 and 75% RH, such as between 50 and 70% RH, or between 55 and 65% RH, or about 60% RH.

The bright light can have a luminance between 3000 and 6000 lux, such as between 3500 and 5500 lux, or between 4000 and 5000 lux, or about 4500 lux. The dark ambient can be less than 1000 lux, such as less than 500 lux, or less than 100 lux, or there is no light, except for stray light.

The plants can be trimmed before entering the first growing compartment. The plants can stay in the first compartment for a predetermined time period, such as between 2 and 6 weeks, between 3 and 5 weeks, or about 4 weeks. The plants can continue to stay in the first compartment if the size is less than a limit.

The first compartment can include containers filled with growing medium such as soil mixed with fertilizer. The containers can be placed on shelves of rollable carts for ease of transport between the compartments.

Second Compartment for Sprouting

In the sprouting room, the ambient conditions include cyclic changes in temperature and humidity, with an absence of light, e.g., the light room is turned off with all doors and windows shielded with curtains. A high temperature and low humidity are characteristics of a simulated day time ambient conditions in the growing room. A lower temperature and higher humidity are characteristics of a simulated night time ambient conditions in the growing room. During the simulated day and night, there is no light.

The high temperature can be between 33 and 43 C, between 34 and 42 C, or between 36 and 40 C, or about 38 C. The low temperature can be between 10 and 18 C, or between 12 and 16 C, or about 14 C.

The high humidity level can be less than 100% relative humidity (RH), such as higher than 96% RH, higher than 98% RH, or about 99% RH. The low humidity level can be between 75 and 95% RH, or between 80 and 90% RH, or about 85% RH.

The room can be dark, e.g., there is no light. For example, the light can be turned off, with doors and windows close.

The second compartment can include trays having absorbance pads for placing the plants. There is no growing medium. The trays can be placed on shelves of rollable carts for ease of transport between the compartments.

Third Compartment for Flowering

In the flowering room, the ambient conditions include cyclic changes in temperature and light, with the humidity level remaining low. A high temperature, low humidity, and bright light are characteristics of a simulated day time ambient conditions in the growing room. A lower temperature, higher humidity, and dark ambient are characteristics of a simulated night time ambient conditions in the growing room.

The high temperature can be greater than 9 C, 11 C, 12 C, 13 C, 15 C, or between 9 and 15 C, between 10 and 14 C, or between 11 and 13 C, or about 12 C. The low temperature can be less than 6 C, less than 5 C, greater than 0 C, greater than 1 C, greater than 2 C, or between 2 and 6 C, or between 3 and 5 C, or about 4 C.

The bright light can have a luminance between 3000 and 6000 lux, such as between 3500 and 5500 lux, or between 4000 and 5000 lux, or about 4500 lux. The dark ambient can be less than 1000 lux, such as less than 500 lux, or less than 100 lux, or there is no light, except for stray light. For example, the cyclic light sequence can include one or more light sources providing the bright light when turning on, and providing the dark ambient when the light sources are turned off.

The humidity level can be constant at all time, e.g., during the simulated day and night time. The constant humidity level can be less than 60% relative humidity (RH), less than 55% RH, less than 50% RH, less than 45% RH, such as between 30 and 50% RH, or between 35 and 45% RH, or about 40% RH.

The third compartment can include trays having absorbance pads for placing the plants. There is no growing medium. The trays can be placed on shelves of rollable carts for ease of transport between the compartments.

The cyclic changes in temperature, humidity, and/or light can be the same, with the difference being the high and low values. For example, the temperature, humidity, and light cycles can all have a same periodicity, which can be less than or equal to 24 hours, 12, 8, 6, or 4 hours. The day or night temperature or humidity interval is configured to at least allow the saffron plants to experience the low or higher temperature or humidity of the night or day time. For example, the time interval at the high temperature, low temperature, high humidity, and low humidity can be the same, which can be less than or equal to 6 hours, 4, 3, 2, 1 hour, or 30 minutes. The time interval of the light can be similar to that of the temperature. Alternatively, the day light time interval is equal to a time when the temperature is greater or equal to a set temperature, which can be greater or equal to 6 C, 7 C, 8 C, 9 C, 10 C, or between 6 and 10 C, 7 and 9 C, or about 8 C.

The transition time between high and low temperatures, and between high and low humidities can be the same, which can be less than or equal to 6 hours, 4, 3, 2, 1 hour, or 30 minutes. The night-to-day or day-to-night transition time interval for the light is less than or equal to the day or night temperature time interval or is abrupt characterized by turning on or turning off a light source.

Fourth Compartment for Drying

In the drying room, the ambient conditions include a constant warm temperature and a constant dry humidity, with or without light. The constant temperature can be between 15 and 21 C, such as between 16 and 20 C, between 17 and 19 C, or at about 18 C. The dry humidity can be less than or equal to 60% RH, such as less than or equal to 55% RH, or less than or equal to 50% RH.

A separate fourth drying room can be optional, since the first, second, or third rooms can be configured for drying the plants, e.g., having the same ambient conditions as the drying room. For example, the first room can be configured to have the growing ambient conditions followed by the drying ambient conditions. Thus, the plants, after being grown in the first room with the growing ambient conditions, can be digged out and dry in the same first room, with the new drying ambient conditions. Alternatively, the second room can be configured to have the drying ambient conditions followed by the sprouting ambient conditions. Thus, the plants can be dried in the second room with the new drying ambient conditions. Then the ambient conditions in the second room change to the ambient conditions for sprouting, and the plants can sprout in the second room with the sprouting ambient conditions.

Fifth Compartment for Harvesting.

The cultivation system can optionally include a room for harvesting the flowers and for other work on the plants, such as for trimming the stems and the corms.

FIG. 7B shows a process flow for a cultivation system, which can be used for cultivating saffron plants for harvesting flowers, such as harvesting stigmas, stamens, and/or petals of the saffron flowers.

Operation 914 provides corms of saffron plants. The plant cultivation process can start with corms of the saffron plants. Depending on the conditions of the corms, e.g., if the corms are ready for sprouting, the cultivation process can include a corm sprouting stage in a second sprouting room. Alternatively, if the corms are not ready for sprouting, the cultivation process can include a corm growing stage in a first growing room.

The first compartment can be used for growing the corms of the plants if the corms are not ready for sprouting. For example, after the plants flower and after the flowers are harvested, the plants can be depleted of reserve, since the stem sprouting and the flower blooming processes takes energy from the plants, such as from the corms of the plants. Thus, the plants can be subjected to the ambient conditions, together with other preparations, including growing medium and corm trimming, in the first growing compartment to optimize the corm growth, especially for skipping the leaf development and the dormancy stages.

For corm preparation, the plants can be trimmed to leave one or two stems, which can suppress the leaf development. The corms then can be buried in a growing medium with suitable fertilizer, such as a genome-specific fertilizer. Together with the ambient conditions of cycles of cold/cool temperature and wet/dry humidity, the corms can bypass the dormancy to directly entering the growing stage.

The corms can be specifically prepared for growing for the next cycle of flower harvesting, e.g., bypassing the stage of daughter corm generation. For example, the side buds on the corms can be removed to ensure that all energy is used for corm growing.

Alternatively, the corms can be prepared for daughter corm generation, by keeping the side buds to encourage the emergence of daughter corms.

Operation 915 plants the corms in a grow medium with genome-specific fertilizer in a first ambient of the first growing room. After the corms are prepared, e.g., trimmed, the corms can be planted in containers with a grow medium such as soil. Other grow medium can be used, such as a liquid in a hydroponic operation. Fertilizer developed for saffron plants, e.g., based on saffron genome, can be used for optimizing the growth of the plants. The ambient conditions in the first growing room can be configured to optimize the plant grow, which include cycles of cold temperature (about 2 C) and cool temperature (about 12 C), in addition to cycles of dry (about 60% RH) and wet (89% RH), and cycles of bright light and dark. The cycles have periodicity much less than 24 hours, such as about 2 hours, to provide an accelerate life cycle for the plant growth.

With the accelerated time and the suitable temperature, humidity, and light, the plants can grow at a faster speed, such as greater than or equal to 2 times, 3 times, 4 times, 5 times, 6 times, or up to 12 times the normal outdoor life cycle of saffron plants.

Operation 916 digs out the plants and trims the plants. After a certain growing time, such as 3-5 weeks, or 4 weeks, in the first compartment, the corms can be digged up from the growing medium. The corm sizes can be evaluated, and corms having a size less than a limit can be re-grown, e.g., returned to the grow medium to the first room to continue to grow. Additional fertilizer can be added to speed up the growing time.

Alternatively, ultrasonic cameras can be used to monitor the growing sizes of the corms. Thus, the corms can be digged up when the sizes are above a size limit. Alternatively, after a predetermined growing time, such as 3-5 weeks or about 4 weeks, the corms that are smaller than the size limit are not digged up, to allow the corms to continue grow.

Operation 917 optionally dries the plants. After being digged from the containers from the growing room, the plants can be trimmed and dried. For example, the roots and stems can be cut, and side buds removed, leaving a main short stem at a top of the corms. Since the plants sprout well when dry, e.g., corm wetness can severely damage the plants, the trimmed corms are then dried, for example, by placing in a warm and dry ambient, such as placing in a drying room with the warm and dry ambient conditions. For example, the warm ambient can include a temperature between 16 and 20 C, such as about 18 C. The dry ambient can include a humidity level less than less than 60% RH, such as less than 50% RH. Alternatively, the climate conditions in the first growing room can be changed to the warm dry ambient for drying the corms in the growing room.

Operation 918 places the plants on absorbance pads on trays in a second ambient of the second sprouting room. After the corms are digged up from the soil, trimmed, and dried, the corms can be placed on absorbance pads on trays in the sprouting room. The absorbance pads are configured to keep the corms dried in the cycles of wet and wetter humidity. For example, in the night time, the humidity level is high, e.g., up to 100% RH, and the corms can be moist. In the day time, the humidity level is lower, such as at 85% RH, and the moist corms can be dried, or most of the moisture is evaporated from the corms. The absorbance pads can assist in drying the corms in the day time low humidity cycles. With the absorbance pads, the efficiency of the cultivation system can be significantly improved, such as by up to 35%.

The ambient conditions in the second sprouting room can be configured to optimize the sprouting of the stems, which include cycles of warm temperature (about 14 C) and hot temperature (about 38 C), in addition to cycles of wet (about 89% RH) and wetter (99% RH). The sprouting conditions do not include lighting requirement, and thus the sprouting room can be kept in the dark, e.g., the light is turned off. The cycles of temperature and humidity have periodicity much less than 24 hours, such as about 2 hours, to provide an accelerate life cycle for the plant growth. The plants can be in the sprouting room for about 2 weeks.

Operation 920 places the plants on absorbance pads on trays in a third ambient of the second sprouting room. After the plants sprout, the plants can be moved to the flowering room for flowers to emerge and bloom. For example, the trays containing the plants can be placed on shelves of a shelf carts. Thus, the shelf cart can be rolled from the sprouting room to the flowering room.

The ambient conditions in the third flowering room can include cycles of cold temperature (about 4 C) and cool temperature (about 12 C), in addition to cycles of bright light and dark (no light at all). The humidity can be constantly dried, e.g., less than or equal to 60% RH, less than or equal to 50% RH, or less than or equal to about 40% RH. Similar to the first and second rooms, the cycles have periodicity much less than 24 hours, such as about 2 hours, to provide an accelerate life cycle for cultivating the plants.

The plants can be in the flowering room for 2 weeks for flowering. If after 2 weeks, the flowers do not bloom, or there are no flowers, the plants can be returned to the sprouting room for another period of time, such as another 2 weeks.

Operation 924 harvests flowers of the plants.

Figures 8A, 8B:
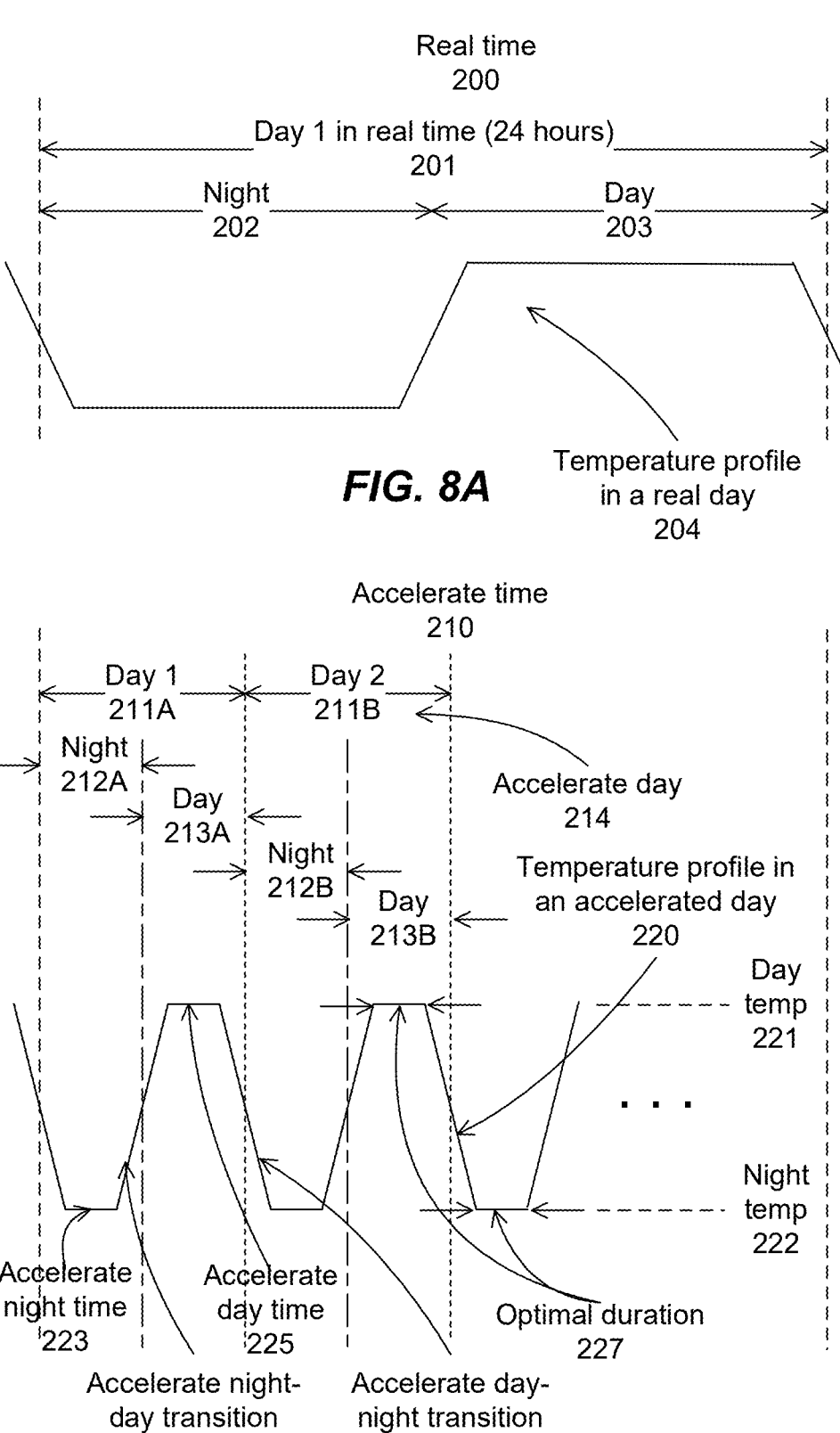
FIGS. 8A-8B illustrate concepts of time acceleration in saffron cultivating according to some embodiments.

FIGS. 8A-8B illustrate concepts of time acceleration in saffron cultivating according to some embodiments. A day in real time 200 includes a night time 202 and a day time 203 in a day 201. The time acceleration process 210 can include accelerated days 214, which include cycles of simulated day 213A, 213B and night 212A, 212B in time periods representing a day 211A, 211B shorter than 24 hours, such as only a fraction of 24 hours.

FIG. 8A shows a temperature profile 204 as a function of time in a real day. In day 1 in real time, e.g., 24 hours, the temperature profile can include a time period of low temperature (during night time 202) and a time period of higher temperature (during day time 203). The temperature profile further includes transition times from low temperature to high temperature and from high temperature to low temperature.

FIG. 8B shows an accelerated temperature profile 220 in accelerated days. An accelerated day can be a fraction of a real time, e.g., the time for a simulated cycle of temperature is much shorter than the cycle time in real time. For example, as shown, the time period of an accelerated day, such as day 1 211A or day 2 211B can be about a quarter of the 24 hour day, which is about 6 hours per accelerated day.

Similar to the temperature profile 204 of a real day, the temperature profile 214 of an accelerated day includes a night time period 223 with a night temperature 222, a day time period 225 with a day temperature 221, a night-day transition time 224, and a day-night transition time 226. The time interval or the duration 227 of an accelerated day or an accelerated night can be chosen to optimize the plant growth. For example, the duration 227 can be selected as short as possible to provide as many accelerated day in a period of 24 hours. On the other hand, the duration 227 should be long enough for the plants or the corms to feel the temperature, e.g., for the plants to experience the changes of day and night. The optimal duration 227 can be less than or equal to 6 hours, less than or equal to 4 hours, 3 hours, 2 hours, 1 hour, or 30 minutes. The transition time is also chosen to prevent thermal shock to the plants, e.g., slow enough for the plants to feel the changes between day and night. The optimal transition time can be less than or equal to 6 hours, less than or equal to 4 hours, 3 hours, 2 hours, 1 hour, or 30 minutes. For example, an accelerated day period can be 2 hours, with 30 minutes each for two transitions times between day and night, and 30 minutes each for the day and night temperatures.

Figures 9A, 9B, 9C, 9D:
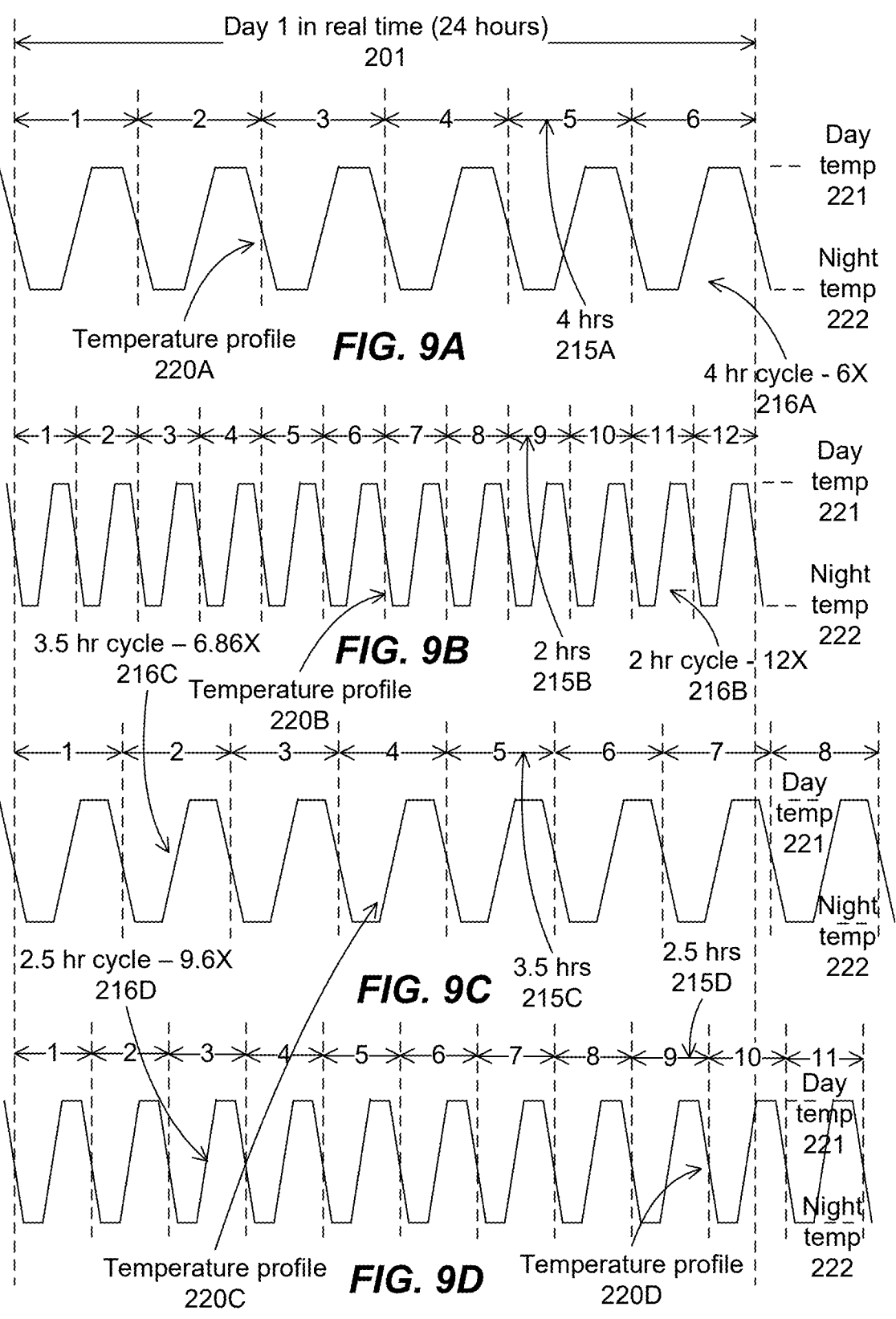
FIGS. 9A-9D illustrate configurations of time acceleration in saffron cultivating according to some embodiments.

FIGS. 9A-9D illustrate configurations of time acceleration in saffron cultivating according to some embodiments. FIG. 9A shows an accelerated temperature profile 220A with a time period 215A of 4 hours, e.g., a 4 hour cycle with a 6× acceleration 216A. FIG. 9B shows an accelerated temperature profile 220B with a time period 215B of 2 hours, e.g., a 2 hour cycle with a 12× acceleration 216B.

FIGS. 9C and 9D show accelerated temperature profiles with time periods not being an integer fraction of 24 hours. For example, FIG. 9C shows an accelerated temperature profile 220C with a time period 215C of 3.5 hours, e.g., a 3.5 hour cycle with a 6.86× acceleration 216C. FIG. 9D shows an accelerated temperature profile 220D with a time period 215D of 2.5 hours, e.g., a 2.5 hour cycle with a 9.6× acceleration 216D. Other periodicity can also be used.

Control Modules

FIGS. 10A-10D illustrate modules of temperature, humidity, light, and $CO_2$ for an indoor saffron cultivation system according to some embodiments. The cultivation system can have modules configured to control elements of the climate conditions, such as temperature module, humidity module, lighting module, and $CO_2$ module. The modules can include separate sources and control, or can have integrated source and control.

Figures 10A, 10B, 10C, 10D:
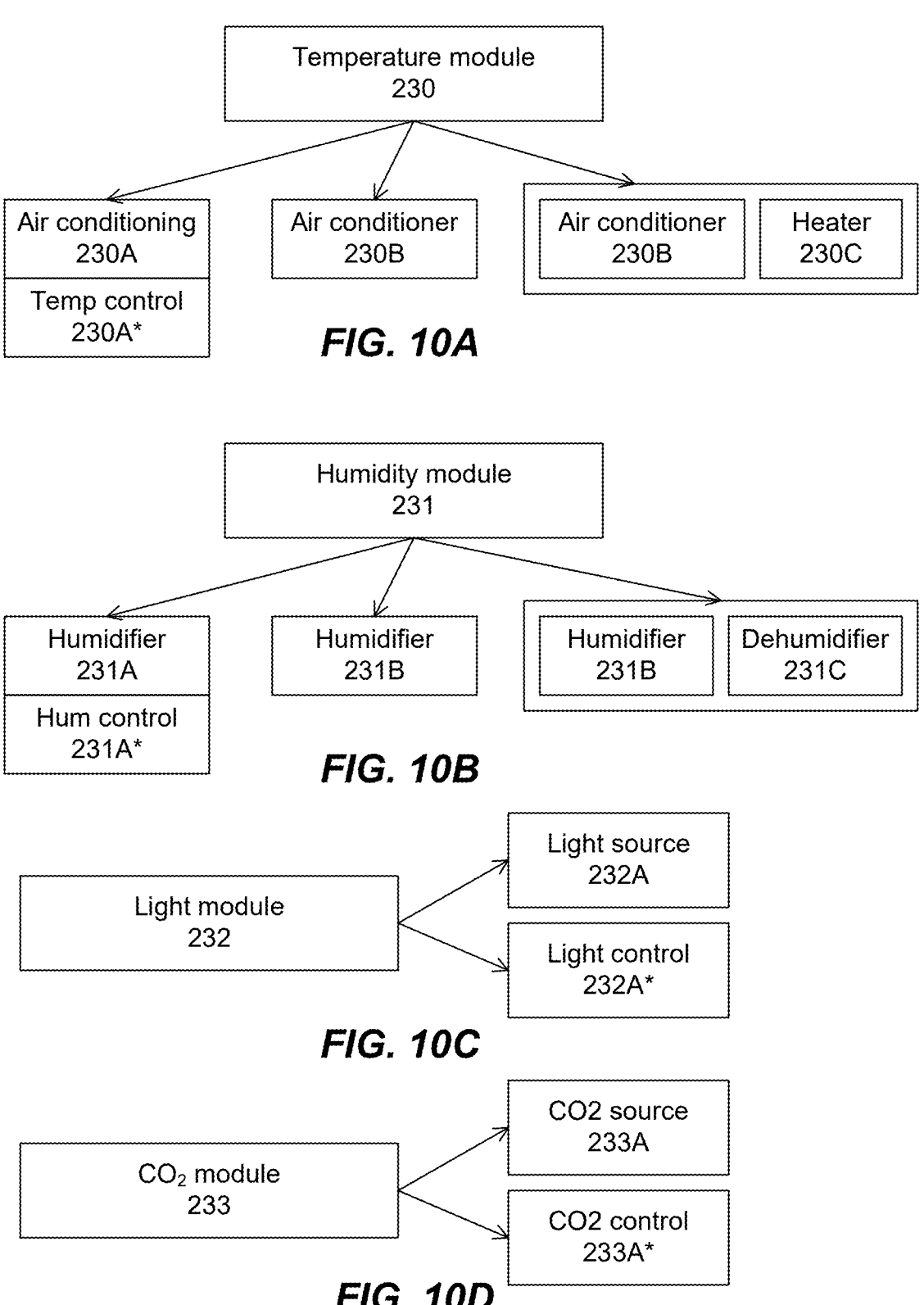
FIGS. 10A-10D illustrate modules of temperature, humidity, light, and $CO_2$ for an indoor saffron cultivation system according to some embodiments.

FIG. 10A shows a temperature module 230. The temperature module can include an air conditioning system 230A, which is an equipment configured to condition ambient air in a room, and a separate control system 230A*. For example, the air conditioning system can include a compressor configured to generate cool air, e.g., air cooler than room temperature air. The air conditioning system can include a heater, such as a gas heater, or a resistive heater, which is configured to generate hot air to the room. The temperature module can include a temperature control system, which is coupled to the air conditioning system. In operation, the temperature control system can regulate the air conditioning system based on inputs from a temperature sensor, such as to turn on or off, increase or decrease the flow of the air conditioning system when the temperature does not meet a set temperature.

The temperature module can include an integrated temperature system 230B, such as an air conditioner. The air conditioner can include a system for generating cool air, together with a control system to regulate the cool air generation. The temperature module can include separate system for cooling and for heating, such as an air conditioner 230B for cooling and a heater 230C for heating.

The temperature module can have a separate control system, such as switches configured to turn on or off the temperature sources. Alternatively, the temperature module can have an integrated system, having a temperature sensor to turn on the temperature sources when the measured temperature is below a set temperature, or any other sensor to control the temperature sources. The temperature control system can be an on-off control, or can be a gradual control, such as having a constant rate of change of temperature or a predetermined rate of change of temperature.

FIG. 10B shows a humidity module 231. The humidity module can include an air moisturizing system 231A, which is an equipment configured to provide or remove humidity in ambient air in a room, and a separate control system 231A*. For example, the moisturizing system can include a water spray or a mist generator to supply humidity, e.g., moisture to the room. The moisturizing system can include a heater or an air conditioner, which is configured to remove moisture from the room. The humidity module can include a humidity control system, which is coupled to the moisturizing system. In operation, the humidity control system can regulate the moisturizing system based on inputs from a humidity sensor, such as to turn on or off, increase or decrease the flow of the moisturizing system when the humidity does not meet a set humidity.

The humidity module can include an integrated humidity system 231B, such as a regulated humidifier or a regulated dehumidifier. For example, the regulated humidifier can include a mist spray with an integrated control having a moisture sensor to regulate the mist spray output. The regulated dehumidifier can include a moisture condensation system, such as an air conditioner without the cooling capability. The humidity module can include separate system for humidifier and dehumidifier, such as a regulated mist spray 231B and a regulated dehumidifier 231C for providing or removing moisture according to a humidity setpoint.

The humidity module can have a separate control system, such as switches configured to turn on or off the humidity sources. Alternatively, the humidity module can have an integrated system, having a humidity sensor to turn on the humidity sources when the measured humidity is below a set humidity, or any other sensor to control the humidity sources. The humidity control system can be an on-off control, or can be a gradual control, such as having a constant rate of change of humidity or a predetermined rate of change of humidity.

FIG. 10C shows a light module 232. The light module can include one or more light sources 232A and a control system 232A*. The light sources can be indirectly light sources, e.g., light sources installed on the ceiling or on a wall, to provide light to the room, without specifically designed to provide light to the plants. The light sources can be directly light sources, e.g., light sources installed right on top or sides of the plants to provide light directly to the plants. For example, the light sources can be installed on the bottom sides of top shelves of a shelf cart, with the plants placed in containers or trays on bottom shelves.

The light control system can be a separate control system, such as switches configured to turn on or off the light sources. Alternatively, the light control system can be an integrated system, having a light sensor to turn on the light sources when the measured light is below a set lux value, or a temperature sensor to turn on the light sources when the temperature is above a set temperature. The light control system can be an on-off control, or can be a gradual control, such as having a constant rate of change of light or a predetermined rate of change of light.

FIG. 10D shows a $CO_2$ module 233. The $CO_2$ module can include one or more $CO_2$ sources 233A and a control system 233A*. The $CO_2$ control system can be a separate control system, such as switches configured to turn on or off the $CO_2$ sources. Alternatively, the $CO_2$ control system can be an integrated system, having a $CO_2$ sensor to turn on the $CO_2$ sources when the measured $CO_2$ is below a set value, or any kind of sensors to control the $CO_2$ sources. The $CO_2$ control system can be an on-off control, or can be a gradual control, such as having a constant rate of change of $CO_2$ or a predetermined rate of change of $CO_2$.

As described herein, the term "separate control" also includes manual control, e.g., requiring the operation of an operator. The term "integrated control" also includes automatic control, the operation of the equipment is based on sensor inputs, without the need for an operator.

Growing Compartment

Figure 11:
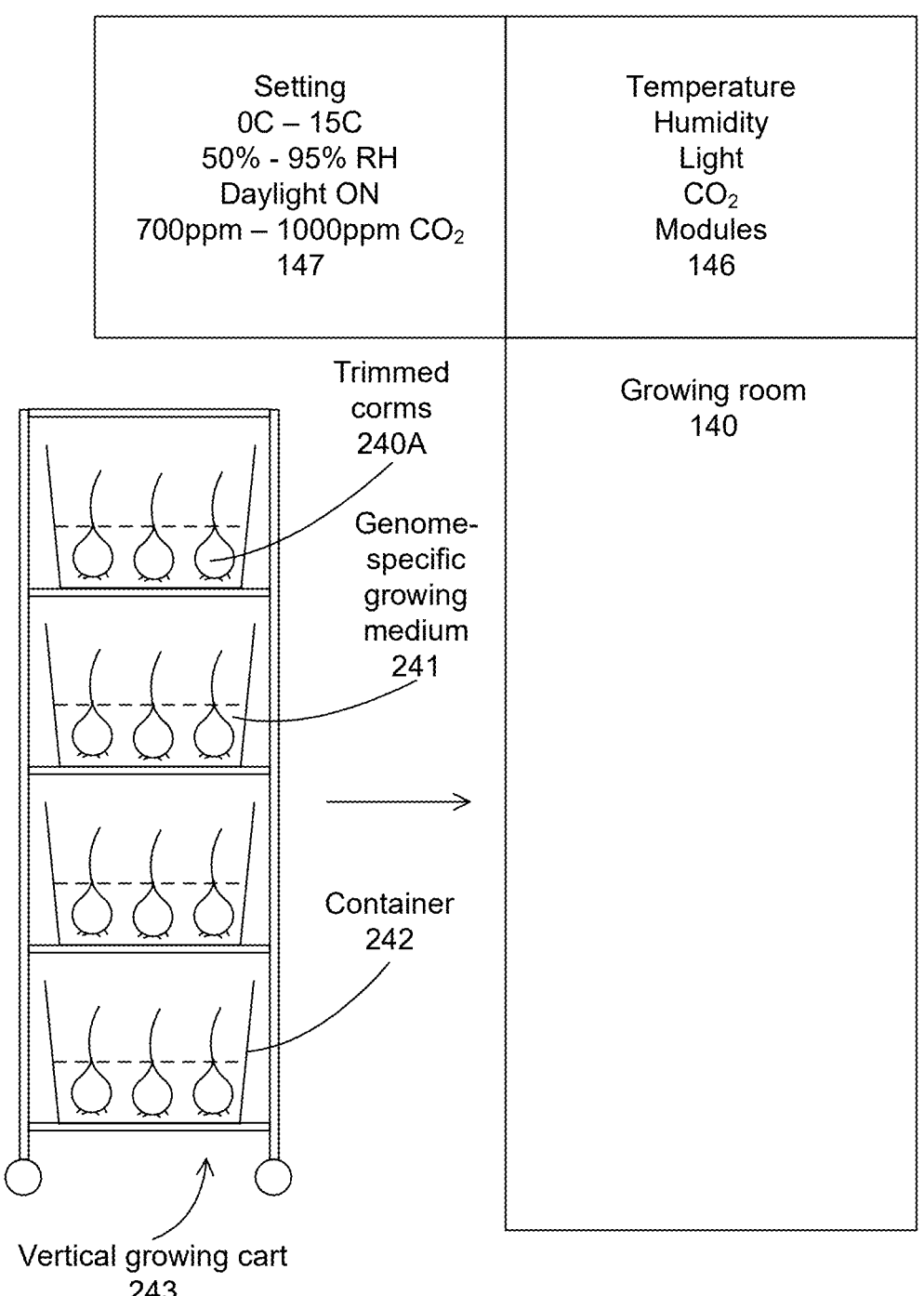
FIG. 11 illustrates a compartment configured for growing saffron corms in a saffron cultivation process according to some embodiments.

FIG. 11 illustrates a compartment configured for growing saffron corms in a saffron cultivation process according to some embodiments. The cultivation system can include multiple compartments, with each compartment configured with different ambient conditions suitable for different stages of the life of the plants. The cultivation system can include a growing compartment or room 140, configured for plant growth. The plants 240A, e.g., the corms, after being trimmed, can be planted in a growing medium 241 in containers 242. The containers can be placed on shelf carts 243, which can have wheels for ease of moving between compartments, and which can have multiple vertical shelves for vertically growing of the plants, e.g., for space saving.

The growing compartment 140 can include modules 146 for temperature, humidity, lighting, and $CO_2$ configured to provide optimum setting 147 for growing saffron plants. For example, the temperature module can include a temperature regulating system, such as air conditioners and/or heaters, together with a control system to provide cycles of temperature sequences between 0 and 15 C, such as sequences of a low temperature duration between 0 and 4 C, followed by a high temperature duration between 10-15 C, with transition time interval between the low and high temperature durations. The period of the sequences can be less than 4 hours, such as about 2 hours.

The humidity module can include a humidity regulating system, such as mist spraying and/or moisture removal systems, together with a control system to provide cycles of humidity sequences between 50 and 95% RH, such as sequences of a low humidity duration between 50 and 70% RH, followed by a high humidity duration between 85-95% RH, with transition time interval between the low and high humidity durations. The period of the sequences can be less than 4 hours, such as about 2 hours, synchronized with the temperature sequences.

The lighting module can include a lighting regulating system, such as light sources, together with a control system to provide cycles of lighting sequences between dark and bright light, such as sequences of a dark duration, characterized by the light sources turned off, followed by a bright light duration between 3500 and 5500 lux. The transition time can be instantaneous, e.g., the light can be switched on from dark to bright light, and can be switched off from bright light to dark. The transition can be based on temperature, such as the light sources turn on when the temperature is above a temperature setpoint, such as between 6 and 10 C, or about 8 C. Alternatively, the transition can be gradual, with a transition time interval between the dark and bright light durations. The period of the sequences can be less than 4 hours, such as about 2 hours, synchronized with the temperature sequences.

The $CO_2$ module can include a $CO_2$ regulating system, such as $CO_2$ cylinders of compressed $CO_2$ gas, together with a control system to provide a flow of $CO_2$ to the room. The flow of $CO_2$ can be constant, such as between 700 and 1000 ppm $CO_2$, such as between 800 and 900 ppm, or about 825 ppm. Alternatively, the flow of $CO_2$ can follow cyclic sequences between low $CO_2$ flow and high $CO_2$ flow.

Figure 12:
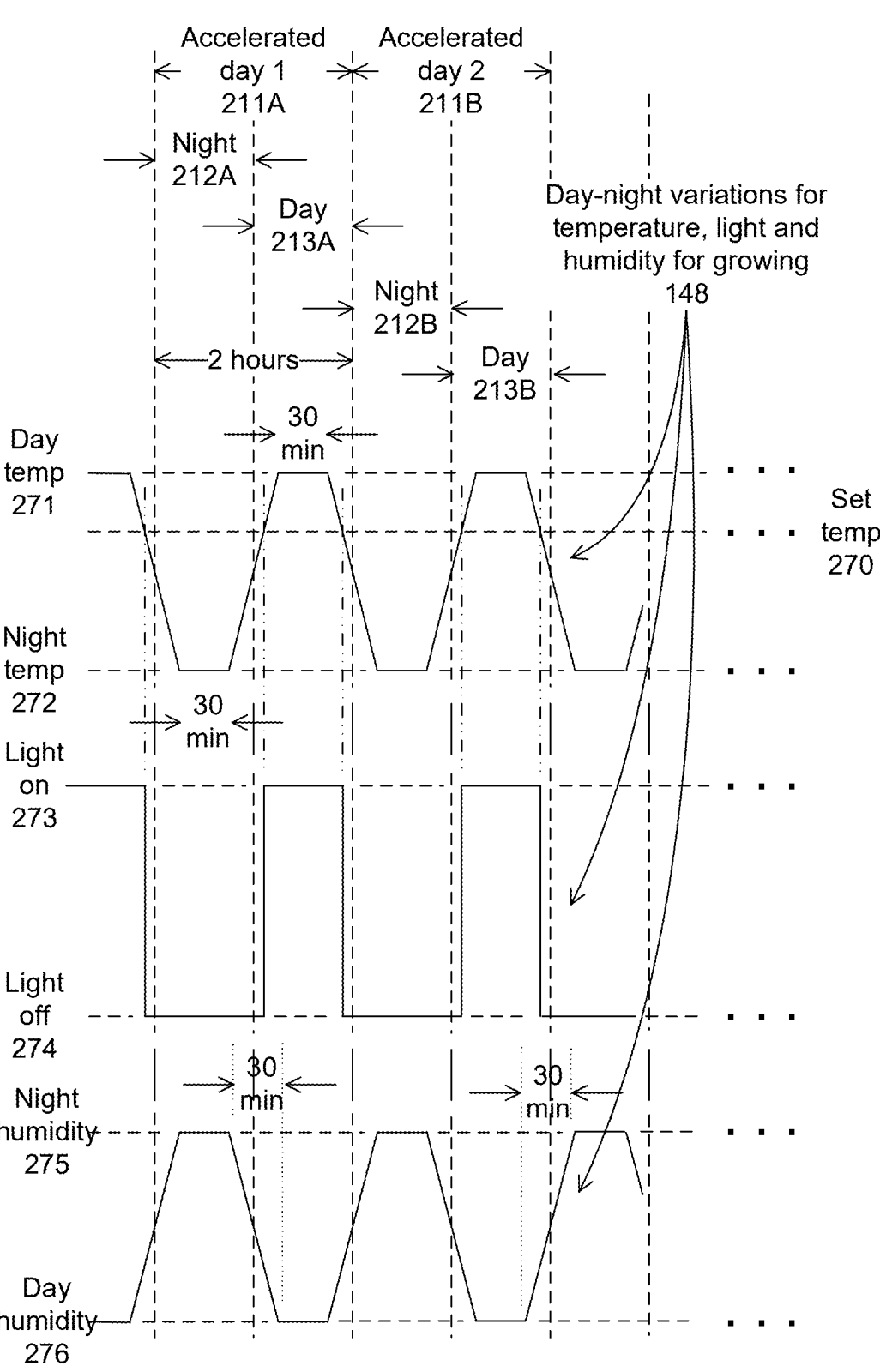
FIG. 12 illustrates ambient conditions for a growth compartment according to some embodiments.

FIG. 12 illustrates ambient conditions for a growth compartment according to some embodiments. The ambient conditions include cyclic sequences of temperature, humidity, and light, showing day-night variations 148 of temperature, light and humidity for the growing compartment. The cyclic sequences show 2 accelerated days 211A and 211B, with each day including night time 212A, 212B and day time 213A, 213B.

The temperature profile includes repeated sequences of day temperature 271 and night temperature 272, with durations of about 30 minutes for each day and night with a constant temperature. The profile also includes transition time between the constant day and night temperatures, with each transition time being about 30 minutes. The cycle period of the temperature is about 2 hours.

The lighting profile includes repeated sequences of light on 273 and light off 274. The light can be on when the temperature is above a set temperature 270, such as about one third to one half of the difference between day and night temperatures from the day temperature. Thus, the light on duration can be between 1 hour and 40 minutes. The lighting transition, as shown, is abrupt, characterized by a switch turning on or off the light sources.

The humidity profile includes repeated sequences of day humidity 276 and night humidity 275, with durations of about 30 minutes for each day and night with a constant humidity. The profile also includes transition time between the constant day and night humidities, with each transition time being about 30 minutes. The cycle period of the temperature is about 2 hours, similar to that of the temperature.

Sprouting Compartment

Figure 13:
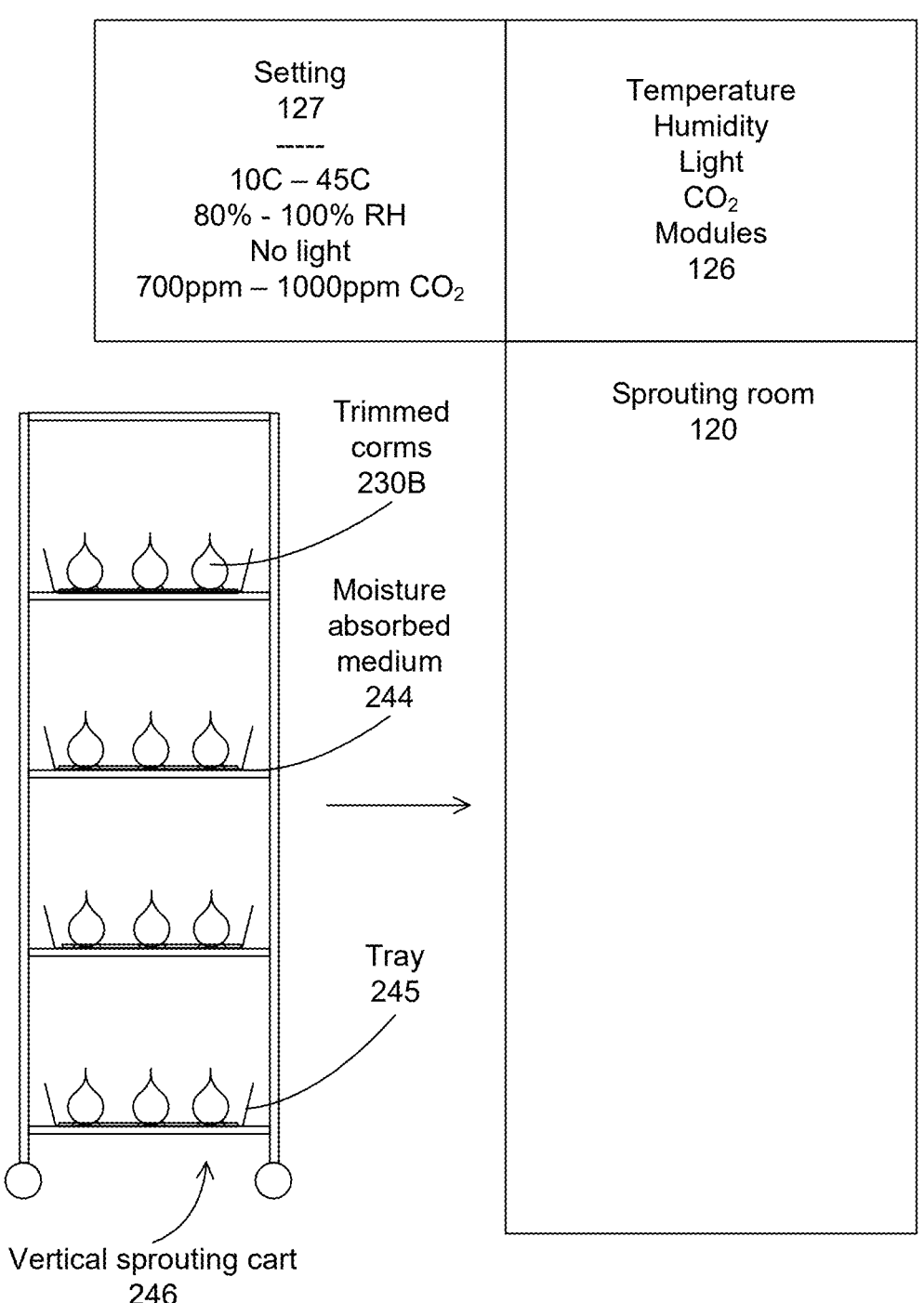
FIG. 13 illustrates a compartment configured for sprouting saffron plants in a saffron cultivation process according to some embodiments.

FIG. 13 illustrates a compartment configured for sprouting saffron plants in a saffron cultivation process according to some embodiments. The cultivation system can include a sprouting compartment or room 120, configured for shoot emergence and growth. The plants 230B, after being trimmed, can be placed on absorbance pads 244 on trays 245. The trays can be placed on shelf carts 246, which can have wheels for ease of moving between compartments, and which can have multiple vertical shelves for space saving.

The sprouting compartment 120 can include modules 126 for temperature, humidity, and $CO_2$ configured to provide optimum setting 127 for growing saffron plants. For example, the temperature module can include a temperature regulating system to provide cycles of temperature sequences between 10 and 45 C, such as sequences of a low temperature duration between 12 and 16 C, followed by a high temperature duration between 36-40 C, with transition time interval between the low and high temperature durations. The period of the sequences can be less than 4 hours, such as about 2 hours.

The humidity module can include a humidity regulating system to provide cycles of humidity sequences between 80 and 100% RH, such as sequences of a low humidity duration between 80 and 90% RH, followed by a high humidity duration between 95-100% RH, with transition time interval between the low and high humidity durations. The period of the sequences can be less than 4 hours, such as about 2 hours, synchronized with the temperature sequences.

The $CO_2$ module can include a $CO_2$ regulating system, such as $CO_2$ cylinders of compressed $CO_2$ gas, together with a control system to provide a flow of $CO_2$ to the room. The flow of $CO_2$ can be constant, such as between 700 and 1000 ppm $CO_2$, such as between 800 and 900 ppm, or about 825 ppm. Alternatively, the flow of $CO_2$ can follow cyclic sequences between low $CO_2$ flow and high $CO_2$ flow.

The sprouting process does not need light, so there can be no lighting system, except perhaps lighting system for workers to work in the sprouting room.

Figure 14:
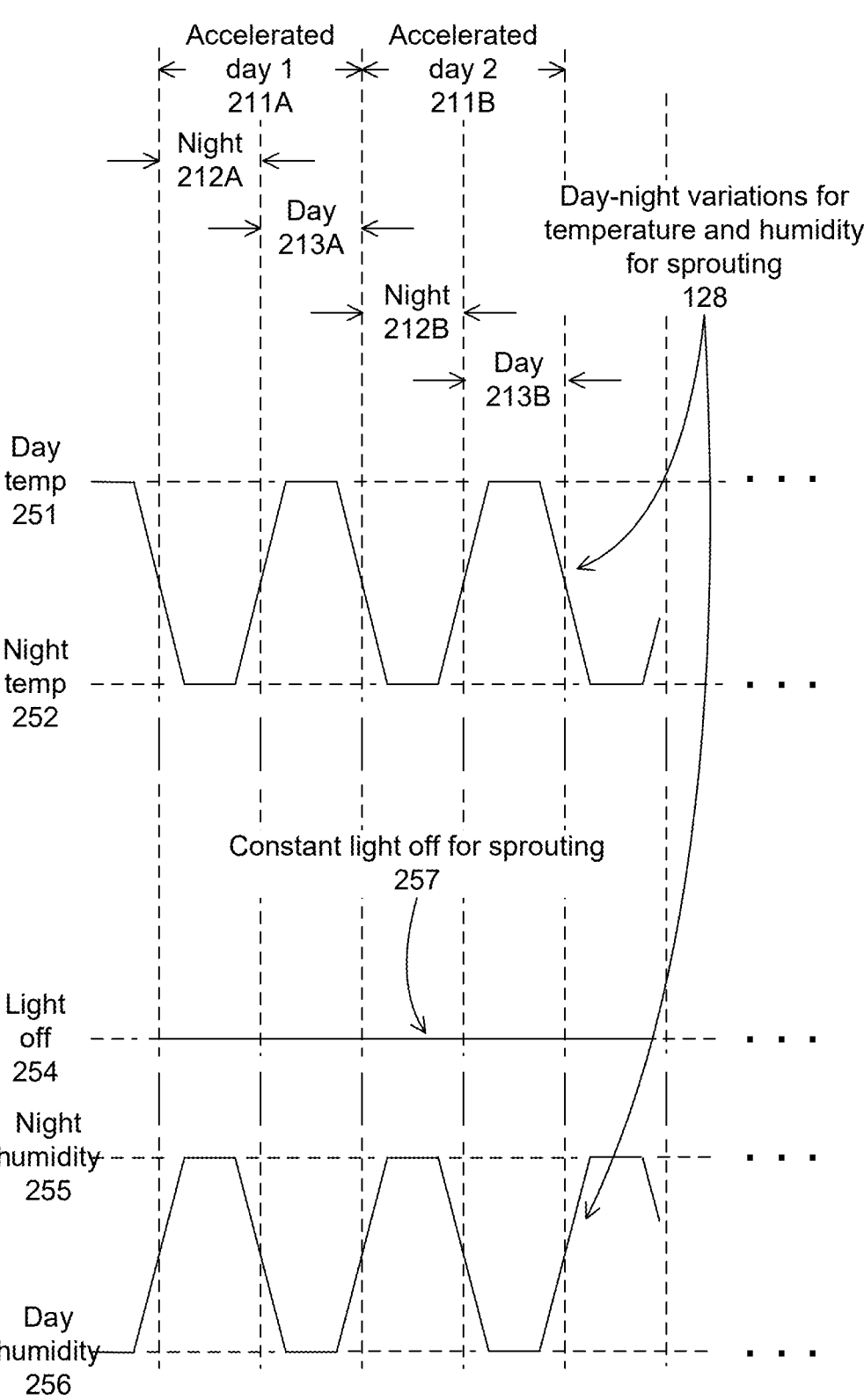
FIG. 14 illustrates ambient conditions for a sprouting compartment according to some embodiments.

FIG. 14 illustrates ambient conditions for a sprouting compartment according to some embodiments. The ambient conditions include cyclic sequences of temperature and humidity, with an absence of light, showing day-night variations 128 of temperature and humidity for the sprouting compartment.

The temperature profile includes repeated sequences of day temperature 251 and night temperature 252, with durations of about 30 minutes for each day and night with a constant temperature. The profile also includes transition time between the constant day and night temperatures, with each transition time being about 30 minutes. The cycle period of the temperature is about 2 hours.

The humidity profile includes repeated sequences of day humidity 256 and night humidity 255, with durations of about 30 minutes for each day and night with a constant humidity. The profile also includes transition time between the constant day and night humidities, with each transition time being about 30 minutes. The cycle period of the temperature is about 2 hours, similar to that of the temperature.

The lighting profile includes dark ambient 254, e.g., constant light off 257 for sprouting.

Flowering Compartment

Figure 15:
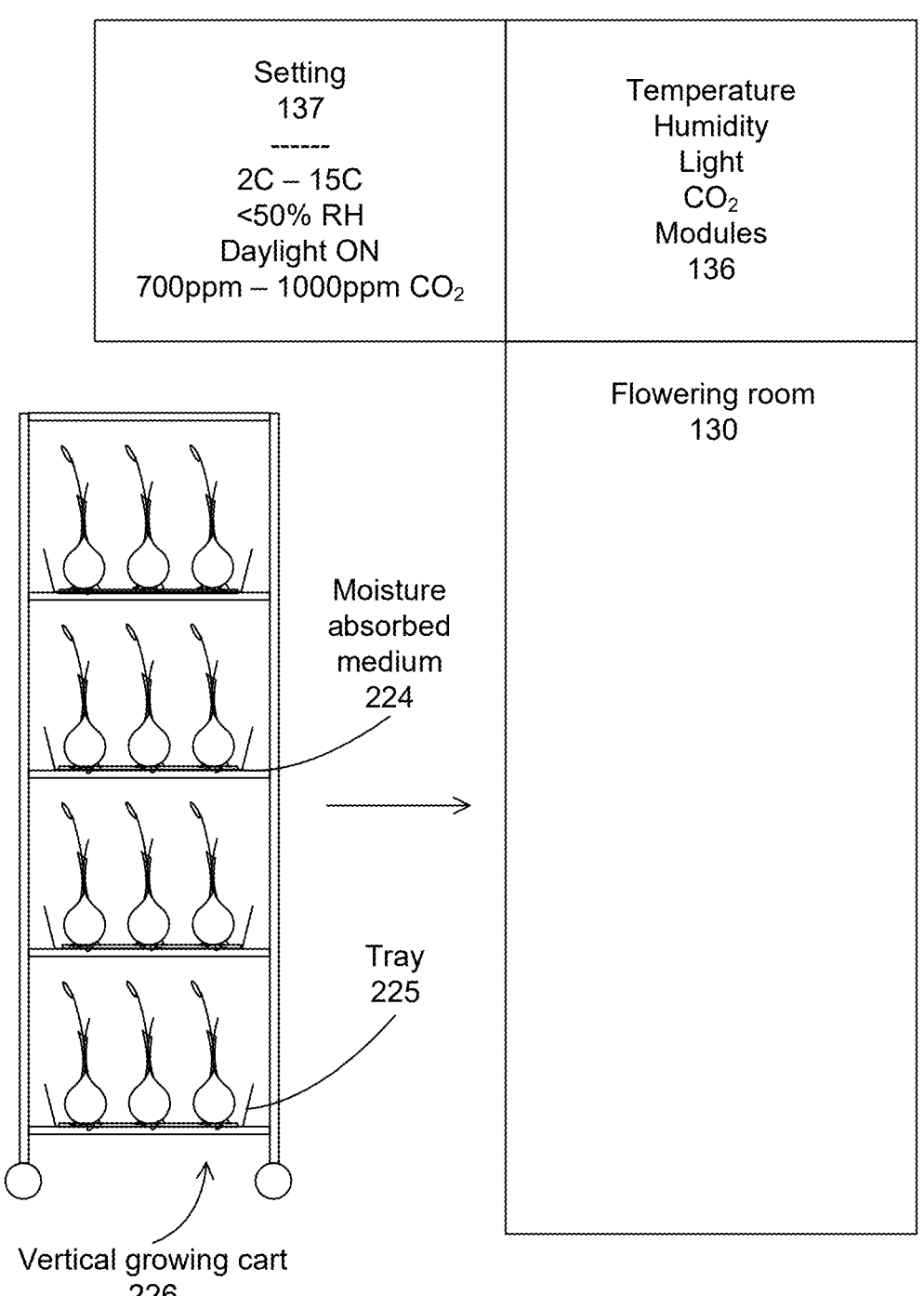
FIG. 15 illustrates a compartment configured for flowering saffron plants in a saffron cultivation process according to some embodiments.

FIG. 15 illustrates a compartment configured for flowering saffron plants in a saffron cultivation process according to some embodiments. The cultivation system can include a flowering compartment or room 130, configured for flower blooming. The plants can be placed on absorbance pads 224 on trays 225. The trays can be placed on shelf carts 226, which can have wheels for ease of moving between compartments, and which can have multiple vertical shelves for space saving.

The flowering compartment 130 can include modules 136 for temperature, humidity, lighting, and $CO_2$ configured to provide optimum setting 137 for the saffron plants to flower and for the flowers to bloom. For example, the temperature module can include a temperature regulating system, such as air conditioners and/or heaters, together with a control system to provide cycles of temperature sequences between 2 and 15 C, such as sequences of a low temperature duration between 2 and 6 C, followed by a high temperature duration between 10-15 C, with transition time interval between the low and high temperature durations. The period of the sequences can be less than 4 hours, such as about 2 hours.

The lighting module can include a lighting regulating system, such as light sources, together with a control system to provide cycles of lighting sequences between dark and bright light, such as sequences of a dark duration, characterized by the light sources turned off, followed by a bright light duration between 3500 and 5500 lux. The transition time can be instantaneous, e.g., the light can be switched on from dark to bright light, and can be switched off from bright light to dark. The transition can be based on temperature, such as the light sources turn on when the temperature is above a temperature setpoint, such as between 6 and 10 C, or about 8 C. Alternatively, the transition can be gradual, with a transition time interval between the dark and bright light durations. The period of the sequences can be less than 4 hours, such as about 2 hours, synchronized with the temperature sequences.

The $CO_2$ module can include a $CO_2$ regulating system, such as $CO_2$ cylinders of compressed $CO_2$ gas, together with a control system to provide a flow of $CO_2$ to the room. The flow of $CO_2$ can be constant, such as between 700 and 1000 ppm $CO_2$, such as between 800 and 900 ppm, or about 825 ppm. Alternatively, the flow of $CO_2$ can follow cyclic sequences between low $CO_2$ flow and high $CO_2$ flow.

The humidity module can include a humidity regulating system, such as moisture removal systems, together with a control system to provide low levels humidity lower or equal to 50% RH, such as lower or equal to 45% RH, or lower or equal to 40% RH.

Figure 16:
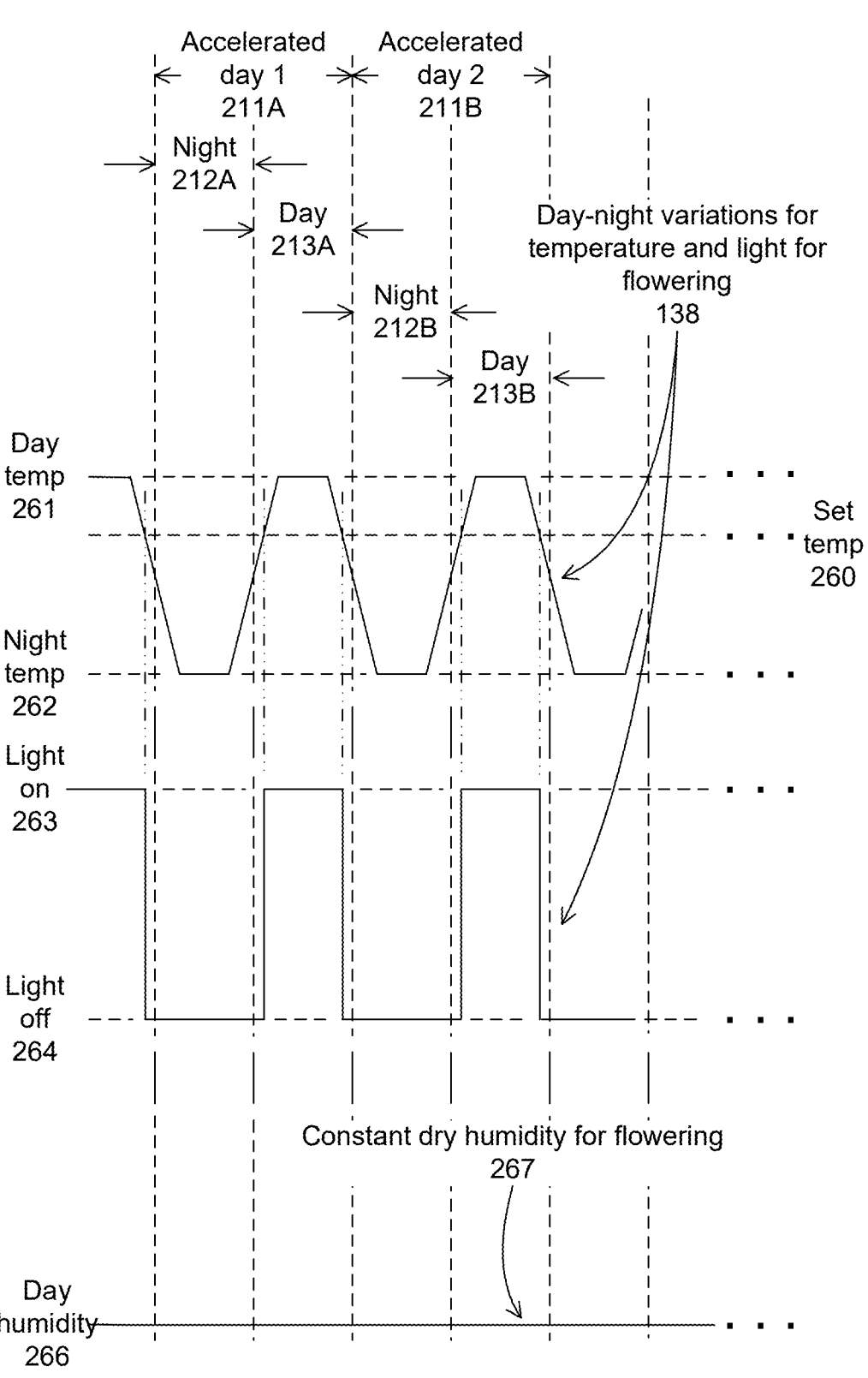
FIG. 16 illustrates ambient conditions for a flowering compartment according to some embodiments.

FIG. 16 illustrates ambient conditions for a flowering compartment according to some embodiments. The ambient conditions include cyclic sequences of temperature and light, with a constant low humidity level. The cyclic sequences show day-night variations 148 of temperature and light for the flowering compartment.

The temperature profile includes repeated sequences of day temperature 261 and night temperature 262, with durations of about 30 minutes for each day and night with a constant temperature. The profile also includes transition time between the constant day and night temperatures, with each transition time being about 30 minutes. The cycle period of the temperature is about 2 hours.

The lighting profile includes repeated sequences of light on 263 and light off 264. The light can be on when the temperature is above a set temperature 260, such as about one third to one half of the difference between day and night temperatures from the day temperature. Thus, the light on duration can be between 1 hour and 40 minutes. The lighting transition, as shown, is abrupt, characterized by a switch turning on or off the light sources.

The humidity profile includes a constant dry humidity level 266 of less than or equal to 50, or 40% RH.

Drying Compartment

Figure 17:
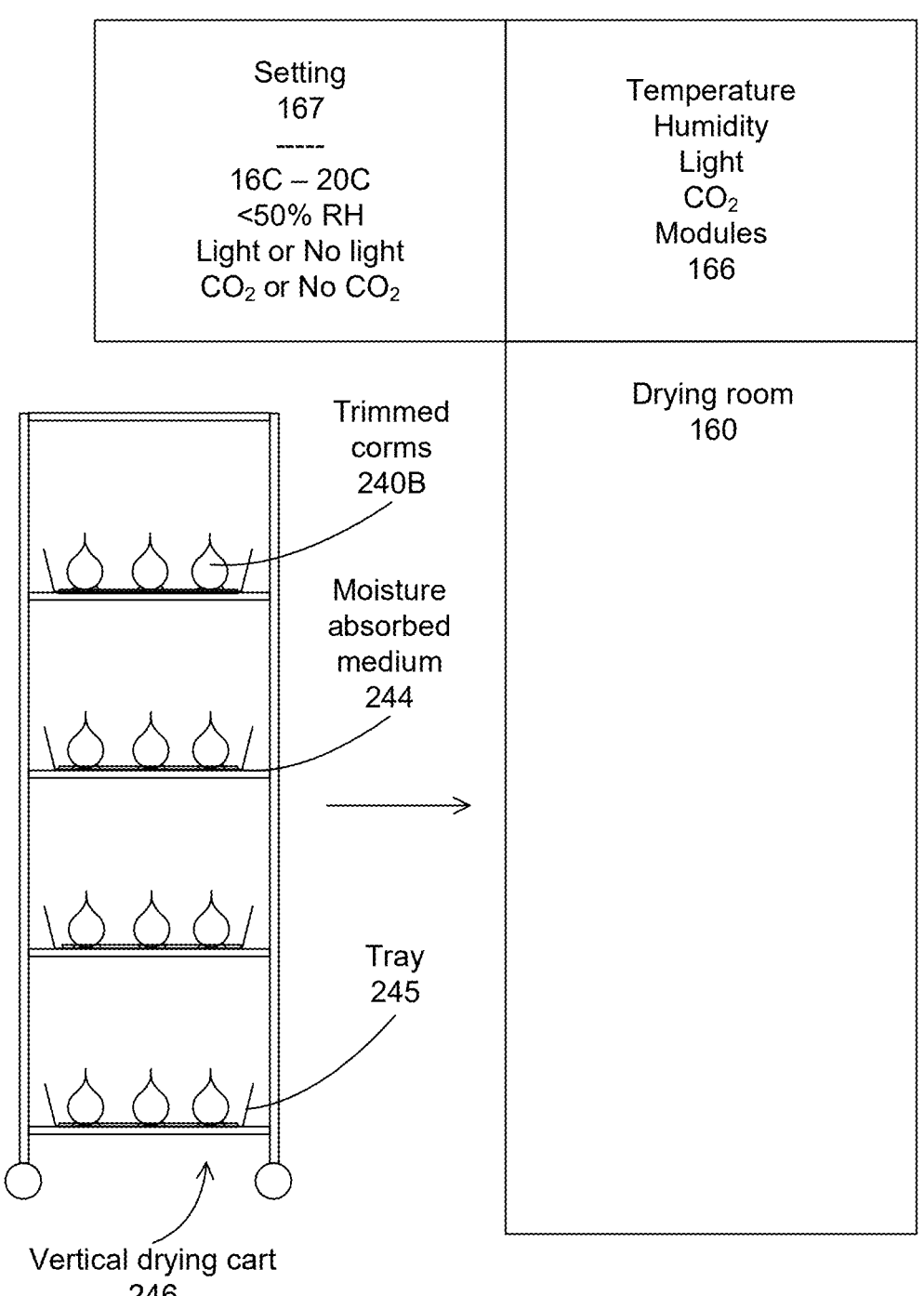
FIG. 17 illustrates a compartment configured for drying saffron corms in a saffron cultivation process according to some embodiments.

FIG. 17 illustrates a compartment configured for drying saffron corms in a saffron cultivation process according to some embodiments. The cultivation system can include an optional drying compartment or room 160, configured for drying the plants, e.g., the corms of the plants, after being digged up from the soil in the containers in the growing room. The corms 240B, after being trimmed, can be placed on absorbance pads 244 on trays 245. The trays can be placed on shelf carts 246, which can have wheels for ease of moving between compartments, and which can have multiple vertical shelves for space saving.

The drying compartment 160 can include modules 166 for temperature and humidity, configured to provide optimum setting 167 for the saffron plants to dry. For example, the temperature module can include a temperature regulating system, such as air conditioners and/or heaters, together with a control system to provide a temperature between 16 and 20 C, such as a constant temperature of 18 C.

The humidity module can include a humidity regulating system, such as moisture removal systems, together with a control system to provide low levels humidity lower or equal to 60% RH, such as lower or equal to 55% RH, or lower or equal to 50% RH.

The ambient conditions for the drying room do not require lighting or $CO_2$.

Figure 18:
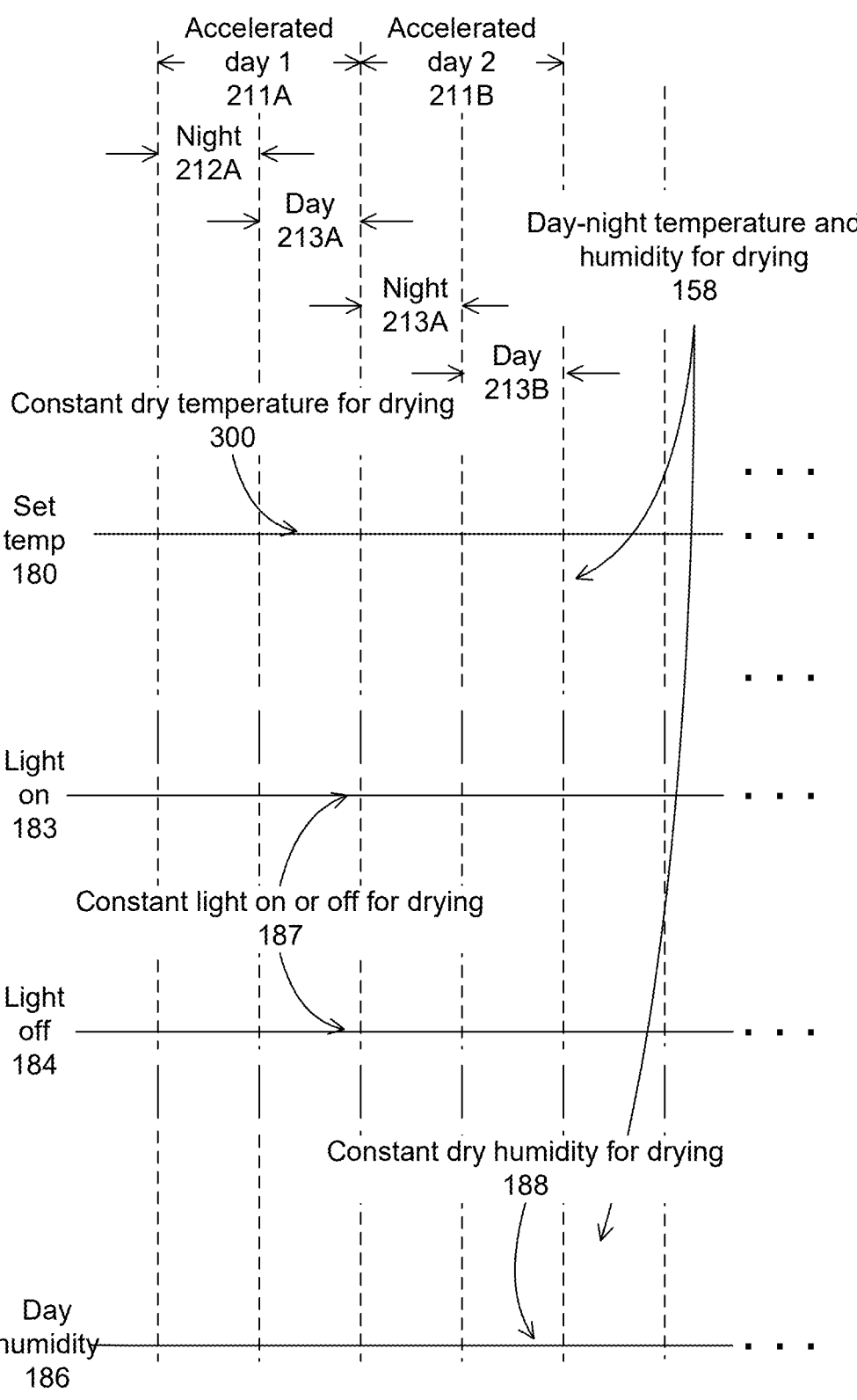
FIG. 18 illustrates ambient conditions for a drying compartment according to some embodiments.

FIG. 18 illustrates ambient conditions for a drying compartment according to some embodiments. The ambient conditions show day-night profiles 158 of temperature and humidity for the drying compartment. The ambient conditions include constant warm temperature 300 and dry humidity 188. The temperature 187 can be on or off.

Fertilization

Fertilization improved saffron corm growth and propagation, such as improving nitrogen and magnesium concentrations. Based on genome analysis, the fertilizer can include sweet components, such as sugar, syrup, or honey.

Figure 19A:
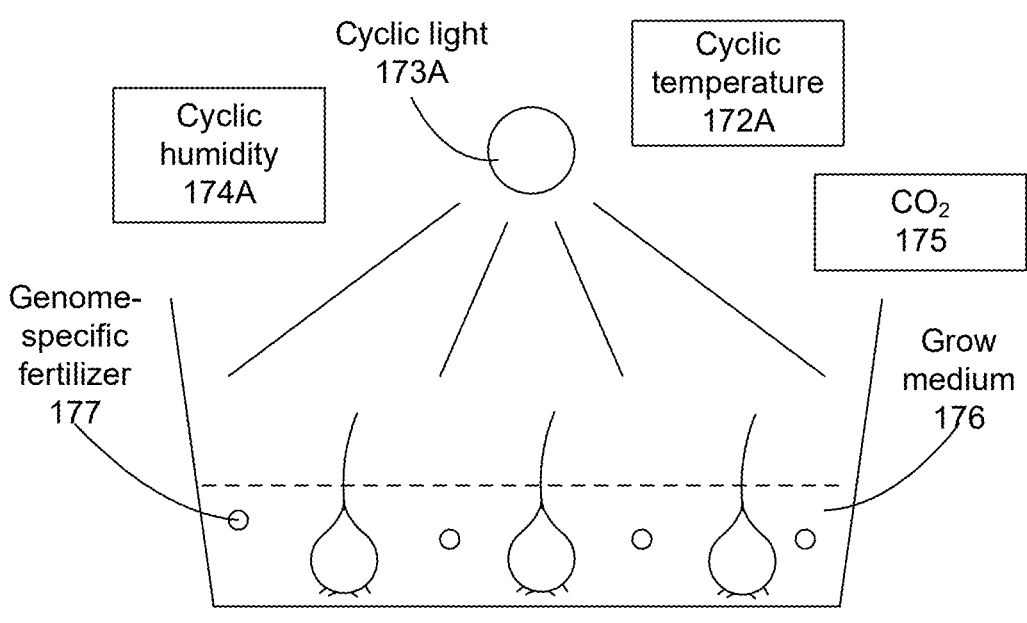
FIGS. 19A-19B illustrate optimal media for growing and for sprouting and flowering saffron plants according to some embodiments.
Figure 19B:
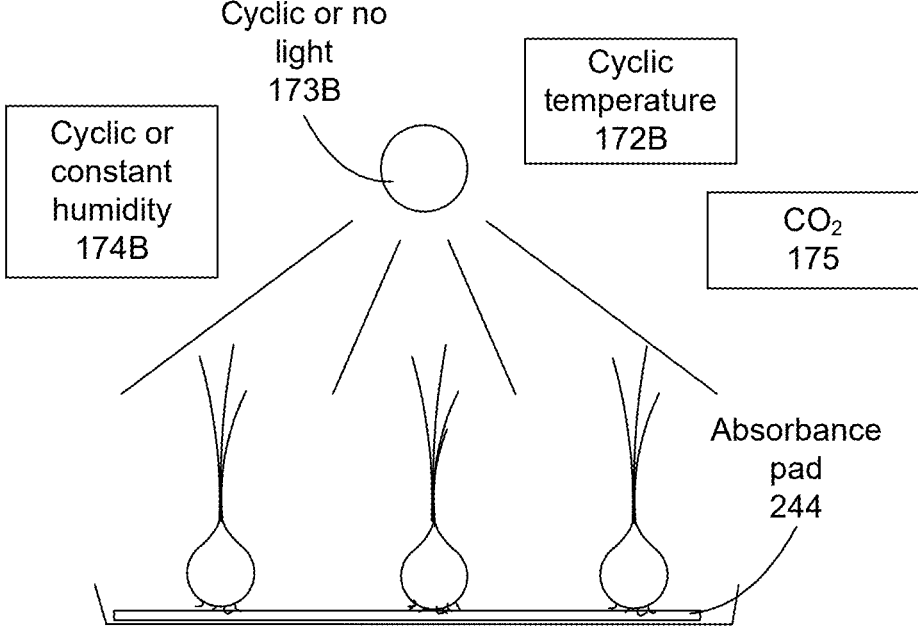

FIGS. 19A-19B illustrate optimal media for growing and for sprouting and flowering saffron plants according to some embodiments. FIG. 19A shows a container having a growing medium 176 such as soil. The grow medium can include genome-specific fertilizer 177, configured to encourage growing of the corms of the saffron plants. The corms can be planted in the soil in the container, and subjected to optimum ambient conditions for corm growth, which include a cyclic temperature 172A, a cyclic light 173A, and a cyclic humidity 174A, together with a constant concentration of $CO_2$ 175.

FIG. 19B shows a tray having an absorbance pad 244 such as a paper towel. The corms of the plants can be placed on the absorbance pad, which is configured to soak any liquid condensation to prevent liquid droplets from adhering to the corms. The plants can be placed on the absorbance pad, and subjected to optimum ambient conditions for corm sprouting and/or flowering, which include a cyclic temperature 172B, a cyclic light or no light 173B, and a cyclic humidity or a constant dry humidity 174B, together with a constant concentration of $CO_2$ 175.

Configurations for Saffron Cultivation System

The cultivation system can include multiple rooms with each room equipped with a climate module configured to deliver specific climate conditions for different stages of the plant growth. In the multiple room cultivation system, the plants can be placed in containers or on trays on shelves of wheel carts having multiple shelves. The wheel carts then can be rolled from rooms to room to simulate the different climate conditions.

Alternatively, the cultivation system can include one or more rooms with each room equipped with one or more climate modules, and with each climate module controlled by one or more control systems. In this case, a room can provide climate conditions for one stage of the plant growth or can provide multiple climate conditions for multiple stages of the plant growth in sequence. Multiple climate conditions in one room can be provided by a climate module with the control system configured to let the climate module providing the multiple climate conditions in sequence. Multiple climate conditions in one room can be provided by multiple climate modules with each climate module controlled by a control system to provide each climate conditions one after the other.

The climate module can include at least two of a temperature module, a humidity module, a lighting module, or a CO2 module.

FIGS. 20A-20B illustrate a saffron cultivation system with one compartment according to some embodiments. FIG. 20A shows different configurations for a cultivation system having one compartment, including a cultivation system 300-1, a cultivation system 300-2, and a cultivation system 300-3.

The cultivation system 300-1 has a cultivation room 300 equipped with a climate module 301A, and with a control system 301A\* configured to control the climate module. The cultivation system 300-2 has a cultivation room 300 equipped with two climate modules 301A1, 301A2, and with one control system 301A\* configured to control the two climate modules. The cultivation system 300-3 has a cultivation room 300 equipped with two climate modules 301A1, 301A2, and with two control systems **301A\*1, 301A\*2** configured to control the two climate modules. Other configurations can be used, such as a cultivation room equipped with multiple climate modules, and with one or more control systems configured to control the multiple climate modules.

FIG. 20B shows a sequence of 4 stages of the plant growth to be performed in the cultivation room 300. The climate module can include a temperature module, a humidity module, a lighting module, and a $CO^2$ module.

There can be 4 stages of plant growth, which means there can be 4 different climate conditions, with first climate conditions for plant sprouting 305, second climate conditions for plant flowering 306, third climate conditions for plant growing 307, and fourth climate conditions for plant drying 308. There are other operations, such as flower harvesting 340 after the flowering stage, and plant trimming 341 before plant growing and/or plant drying.

The cultivation system can include one climate module 301A, with the climate module 301A controlled by a control system 301A\*. The control system can control the climate module to provide a sequence of multiple climate conditions, such as a sequence of cyclic temperature 302, cyclic humidity 303, and cyclic lighting 304 as shown. The flow of $CO_2$ is not shown, which can be cyclic or can be constant.

The sequence of multiple climate conditions include climate conditions for sprouting, climate conditions for flowering, climate conditions for growing, and climate conditions for drying.

The climate conditions for sprouting include a repeated temperature sequence between 10-18 C and 34-42 C, a repeated humidity sequence between above 95% and 80-90% relative humidity corresponded to the temperature sequence, respectively, and an absence of light.

The climate conditions for flowering include a repeated temperature sequence between 2-6 C and 10-14 C, a repeated lighting sequence between dark and bright light of 3500 to 5500 lux corresponded to the temperature sequence, respectively, and a constant dry humidity of less than or equal to 40% RH.

The climate conditions for growing include a repeated temperature sequence between 0-4 C and 10-14 C, a repeated humidity sequence between 85-95% and 65-55% relative humidity, and a repeated lighting sequence between dark and bright light of 3500 to 5500 lux corresponded to the temperature sequence, respectively.

The climate conditions for drying include a constant temperature between 16-20 C, a dry humidity of less than equal to 40% relative humidity, and with or without light.

In operation, the control system can control the climate module to provide the multiple climate conditions of different plant stages in sequence, with an optional break between stages for transition times and for preparing the plants. For example, the plants, after the corms of the plants pass the size requirement, can be placed on absorbance pads on trays on shelf carts to be moved to the cultivation room. The control system can control the climate module to provide the first climate conditions of sprouting to the cultivation room.

After a predetermined period, such as 1-3 weeks or about 2 weeks, the control system can control the climate module to provide the second climate conditions of flowering to the cultivation room.

After a predetermined period, such as 1-3 weeks or about 2 weeks, the control system can control the climate module to prepare the cultivation room for the third stage of growing. In the mean time, the shelf carts can be moved out of the cultivation room to an outside harvesting and conditioning room, for harvesting the flowers and for trimming the corms. After being trimmed, the corms can be planted in soil in containers, and placed on the shelf carts (or different shelf carts). The control system can control the climate module to provide the third climate conditions of growing to the cultivation room. The shelf carts with the plants planted in the containers can be moved to the cultivation room.

After a predetermined period, such as 3-5 weeks or about 4 weeks, the control system can control the climate module to prepare the cultivation room for the fourth stage of drying. In the mean time, the shelf carts can be moved out of the cultivation room to the outside harvesting and conditioning room, for digging and for trimming the corms. After being trimmed, the corms can be placed on absorbance pads on trays, and placed on the shelf carts (or different shelf carts). The control system can control the climate module to provide the fourth climate conditions of drying to the cultivation room. The shelf carts with the plants placed on trays can be moved to the cultivation room.

After a predetermined period, such as 1-3 weeks or about 2 weeks, the corms can be dried, and the operation repeated by subjecting the corms to the first stage. For example, the control system can control the climate module to provide the first climate conditions of sprouting to the cultivation room. The dried corms then can stay in the cultivation room for sprouting.

Alternatively, the cultivation system 300 can include multiple climate modules 301A1 and 301A2, with a single control system 301A* controlling the multiple climate modules. The control system can control a climate module, such as climate module 301A1 to provide a sequence of two or more of the multiple climate conditions (such as a sequence of first, second, and third climate conditions), or a climate module, such as climate module 301A2, to individually provide only one of the multiple climate conditions (such as the fourth climate conditions).

Alternatively, the cultivation system 300 can include multiple climate modules 301A1 and 301A2, with multiple control systems 301A*1 and 301A*2, each controlling a climate module of the multiple climate modules. Control system, such as 301A*1, can control a climate module, such as climate module 301A1 to provide a sequence of two or more of the multiple climate conditions (such as a sequence of first, second, and third climate conditions). Control system, such as 301A*2, can control a climate module, such as climate module 301A2, to individually provide only one of the multiple climate conditions (such as the fourth climate conditions).

Figures 21A, 21B:
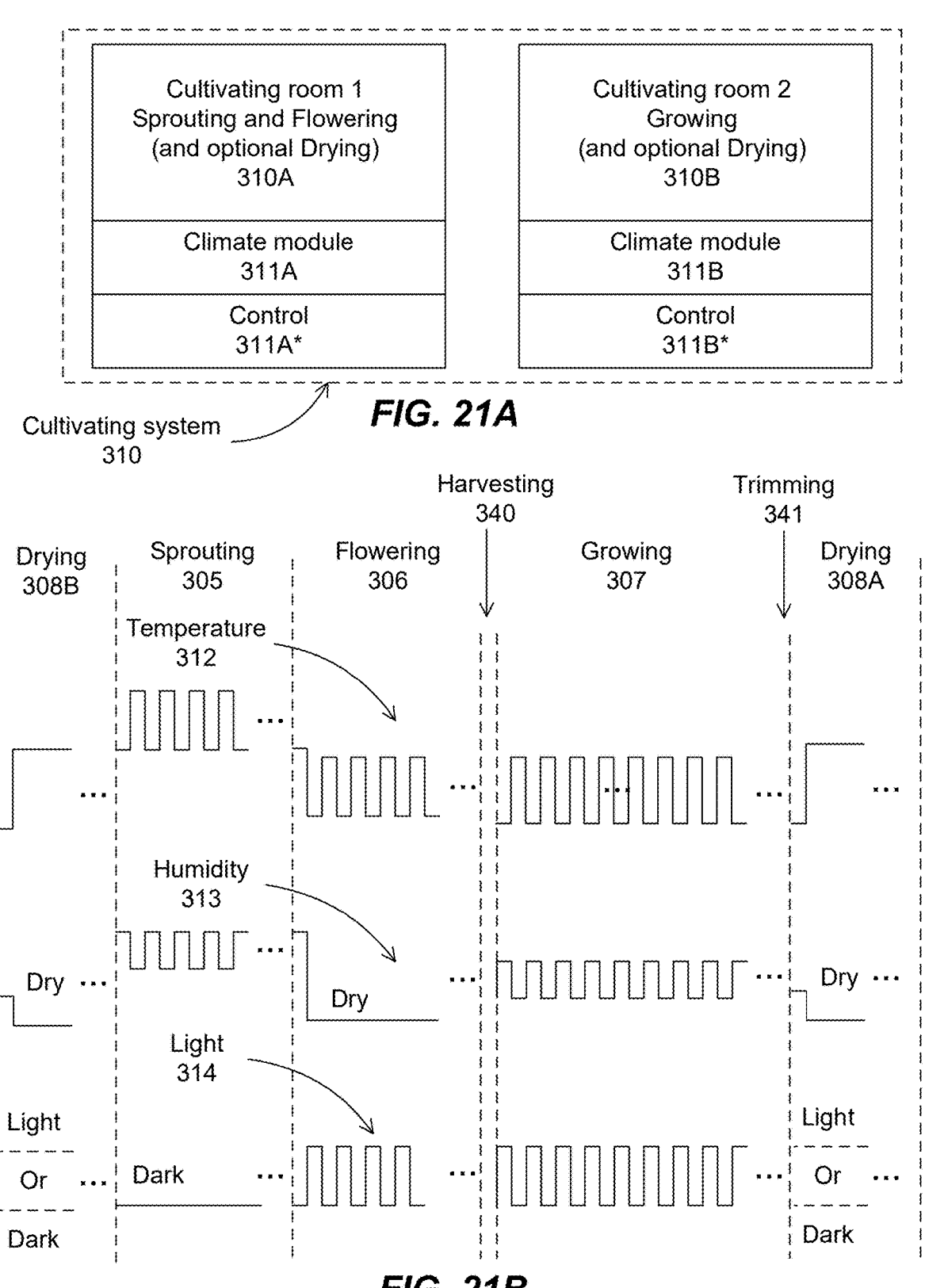
FIGS. 21A-21B illustrate a saffron cultivation system with two compartments according to some embodiments.

FIGS. 21A-21B illustrate a saffron cultivation system with two compartments according to some embodiments. FIG. 21A shows a configuration for a cultivation system 310 having two compartments of 310A and 310B, with the compartment 310A configured for Sprouting and Flowering with optional Drying, and the compartment 310B configured for Growing with optional Drying. This configuration is an example, with other possible arrangements based on different combinations of the two compartments, such as compartment 310A configured for Flowering and Growing, and compartment 310B configured for Drying and Sprouting, or compartment 310A configured for Flowering and Growing and Drying, and compartment 310B configured for Sprouting.

The compartment 310A has a climate module 311A with a control system 311A* configured to control the climate module. The compartment 310B has a climate module 311B with a control system 311B* configured to control the climate module. Other configurations can be used, such as a compartment equipped with one or more climate modules and one or more control systems configured to control the one or more climate modules, similar to the different configurations for cultivation systems 300-1, 300-2, 300-3 discussed above.

FIG. 21B shows a sequence of 4 stages of the plant growth to be performed in the cultivation system 310 having a first cultivation room 310A and a second cultivation room 310B. Each cultivation room 310A or 310B can include a climate module 311A or 311B, with each climate module 311A or 311B controlled by a control system 311A* or 311B*. Each control system can control the corresponded climate module to provide a sequence of one or more climate conditions. For example, the first cultivation room 310A can be configured for first and second stages 305 and 306 of sprouting and flowering, and the second cultivation room 310B can be configured for third and fourth stages 307 and 308A of growing and drying. Other configurations can be used, such as the first cultivation room 310A can be configured for fourth, first and second stages 308B, 305 and 306 of drying, sprouting and flowering, and the second cultivation room 310B can be configured for third stage 307 of growing.

In operation, the first and second control systems 311A* and 311B* can control the first and second climate modules 311A and 311B to provide the one or more climate conditions of different plant stages in sequence, with an optional break between stages for transition times and for preparing the plants.

For example, the plants, after the corms of the plants pass the size requirement, can be placed on absorbance pads on trays on shelf carts to be moved to the first cultivation room. The first control system can control the first climate module to provide the first climate conditions of sprouting to the first cultivation room. Alternatively, the fourth climate conditions of drying can be provided in the first cultivation room if the plants are not dried after the growing stage.

After a predetermined period, such as 1-3 weeks or about 2 weeks, the first control system can control the first climate module to provide the second climate conditions of flowering to the first cultivation room.

After a predetermined period, such as 1-3 weeks or about 2 weeks, the second control system can control the second climate module to prepare the second cultivation room for the third stage of growing. In the mean time, the shelf carts can be moved out of the first cultivation room to an outside harvesting and conditioning room, for harvesting the flowers and for trimming the corms. After being trimmed, the corms can be planted in soil in containers, and placed on the shelf carts (or different shelf carts). The second control system can control the second climate module to provide the third climate conditions of growing to the second cultivation room. The shelf carts with the plants planted in the containers can be moved to the second cultivation room.

After a predetermined period, such as 3-5 weeks or about 4 weeks, the second control system can control the second climate module to prepare the second cultivation room for the fourth stage of drying. In the mean time, the shelf carts can be moved out of the second cultivation room to the outside harvesting and conditioning room, for digging and for trimming the corms. After being trimmed, the corms can be placed on absorbance pads on trays, and placed on the shelf carts (or different shelf carts). The second control system can control the second climate module to provide the fourth climate conditions of drying to the second cultivation room. The shelf carts with the plants placed on trays can be moved to the second cultivation room.

After a predetermined period, such as 1-3 weeks or about 2 weeks, the corms can be dried, and the operation repeated by subjecting the corms to the first stage. For example, the first control system can control the first climate module to provide the first climate conditions of sprouting to the first cultivation room. The dried corms then can stay in the first cultivation room for sprouting.

Alternatively, a cultivation room 310A or 310B can include multiple climate modules 311A1 and 311A2, with a single control system 311A* controlling the multiple climate modules. The cultivation room 310A or 310B can include multiple climate modules 311A1 and 311A2, with multiple control systems **311A*1 and 311A*2**, each controlling a climate module of the multiple climate modules.

Figures 22A, 22B:
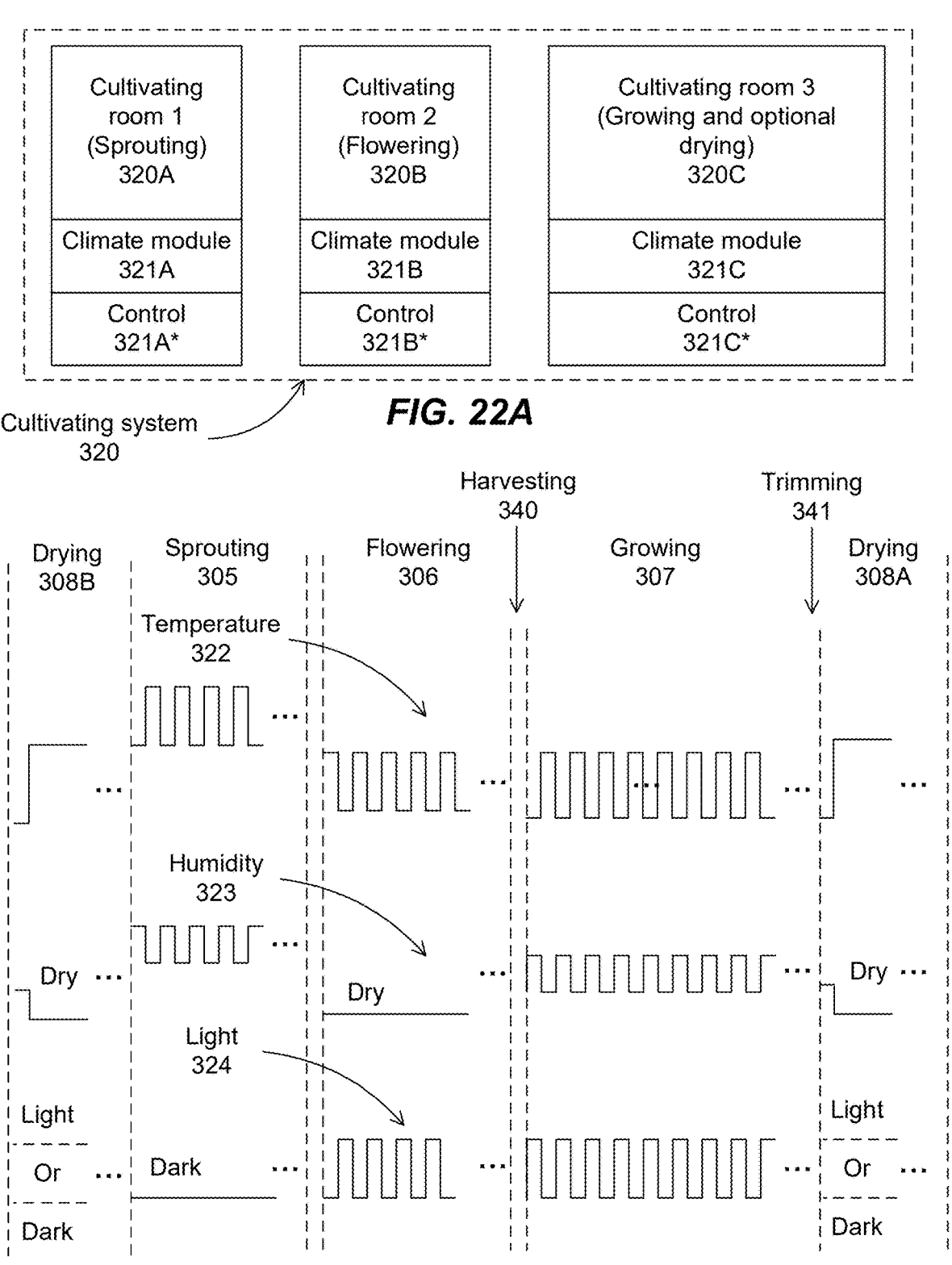
FIGS. 22A-22B illustrate a saffron cultivation system with three compartments according to some embodiments.

FIGS. 22A-22B illustrate a saffron cultivation system with three compartments according to some embodiments. FIG. 22A shows a configuration for a cultivation system 320 having three compartments of 320A, 320B, and 320C, with the compartment 320A configured for Sprouting with optional Drying, the compartment 320B configured for Flowering, and the compartment 320C configured for Growing with optional Drying. This configuration is an example, with other possible arrangements based on different combinations of the three compartments, such as compartment 320A configured for Drying and Sprouting, compartment 320B configured for Flowering, and compartment 320C configured for Growing.

The compartment 320A has a climate module 321A with a control system 321A* configured to control the climate module. The compartment 320B has a climate module 321B with a control system 321B* configured to control the climate module. The compartment 320C has a climate module 321C with a control system 321C* configured to control the climate module. Other configurations can be used, such as a compartment equipped with one or more climate modules and one or more control systems configured to control the one or more climate modules, similar to the different configurations for cultivation systems 300-1, 300-2, 300-3 discussed above.

FIG. 22B shows a sequence of 4 stages of the plant growth to be performed in the cultivation system 320 having a first cultivation room 320A, a second cultivation room 320B, and a third cultivation room 320C. Each cultivation room 320A or 320B or 320C can include a climate module 321A or 321B or 321C, with each climate module 321A or 321B or 321C controlled by a control system 321A* or 321B* or 321C*. Each control system can control the corresponded climate module to provide a sequence of one or more climate conditions. For example, the first cultivation room 320A can be configured for first stage 305 of sprouting, the second cultivation room 320B can be configured for second stage 306 of flowering, and the third cultivation room 320C can be configured for third and fourth stages 307 and 308A of growing and drying. Other configurations can be used, such as the first cultivation room 320A can be configured for fourth and first stages 308B and 305 of drying and sprouting, the second cultivation room 320B can be configured for second stage 306 of flowering, and the third cultivation room 320C can be configured for third stage 307 of growing.

In operation, the first, second, and third control systems 321A*, 321B*, and 321C* can control the first, second, and third climate modules 321A, 321B, and 321C to provide the one or more climate conditions of different plant stages in sequence, with an optional break between stages for transition times and for preparing the plants.

For example, the plants, after the corms of the plants pass the size requirement, can be placed on absorbance pads on trays on shelf carts to be moved to the first cultivation room. The first control system can control the first climate module to provide the first climate conditions of sprouting to the first cultivation room. Alternatively, the fourth climate conditions of drying can be provided in the first cultivation room if the plants are not dried after the growing stage.

After a predetermined period, such as 1-3 weeks or about 2 weeks, the second control system can control the second climate module to provide the second climate conditions of flowering to the second cultivation room. The shelf carts can be moved to the second cultivation room.

After a predetermined period, such as 1-3 weeks or about 2 weeks, the third control system can control the third climate module to prepare the third cultivation room for the third stage of growing. In the mean time, the shelf carts can be moved out of the second cultivation room to an outside harvesting and conditioning room, for harvesting the flowers and for trimming the corms. After being trimmed, the corms can be planted in soil in containers, and placed on the shelf carts (or different shelf carts). The third control system can control the third climate module to provide the third climate conditions of growing to the third cultivation room. The shelf carts with the plants planted in the containers can be moved to the third cultivation room.

After a predetermined period, such as 3-5 weeks or about 4 weeks, the third control system can control the third climate module to prepare the third cultivation room for the fourth stage of drying. In the mean time, the shelf carts can be moved out of the third cultivation room to the outside harvesting and conditioning room, for digging and for trimming the corms. After being trimmed, the corms can be placed on absorbance pads on trays, and placed on the shelf carts (or different shelf carts). The third control system can control the third climate module to provide the fourth climate conditions of drying to the third cultivation room. The shelf carts with the plants placed on trays can be moved to the third cultivation room.

After a predetermined period, such as 1-3 weeks or about 2 weeks, the corms can be dried, and the operation repeated by subjecting the corms to the first stage. For example, the first control system can control the first climate module to provide the first climate conditions of sprouting to the first cultivation room. The dried corms then can stay in the first cultivation room for sprouting.

Alternatively, a cultivation room 320A or 320B or 320C can include multiple climate modules 321A1 and 321A2, with a single control system 321A* controlling the multiple climate modules. The cultivation room 320A or 320B or 320C can include multiple climate modules 321A1 and 321A2, with multiple control systems **321A*1 and 321A*2**, each controlling a climate module of the multiple climate modules.

Figures 23A, 23B:
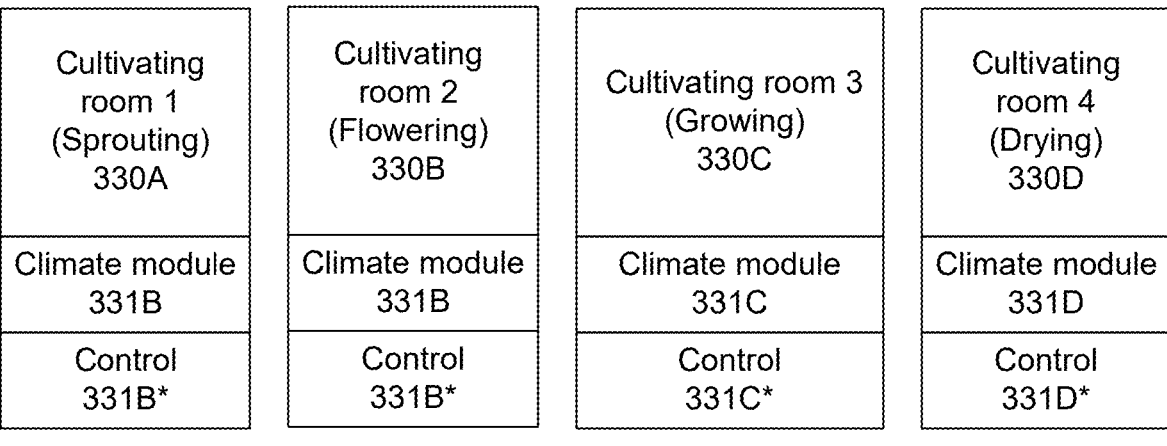
FIGS. 23A-23B illustrate a saffron cultivation system with four compartments according to some embodiments.

FIGS. 23A-23B illustrate a saffron cultivation system with four compartments according to some embodiments. FIG. 23A shows a configuration for a cultivation system 330 having four compartments of 330A, 330B, 330C, and 330D with the compartment 330A configured for Sprouting, the compartment 330B configured for Flowering, the compartment 330C configured for Growing, and compartment 330D configured for Drying.

The compartment 330A has a climate module 331A with a control system 331A* configured to control the climate module. The compartment 330B has a climate module 331B with a control system 331B* configured to control the climate module. The compartment 330C has a climate module 331C with a control system 331C* configured to control the climate module. The compartment 330D has a climate module 331D with a control system 331D* config- ured to control the climate module. Other configurations can be used, such as a compartment equipped with one or more climate modules and one or more control systems configured to control the one or more climate modules, similar to the different configurations for cultivation systems 300-1, 300-2, 300-3 discussed above.

FIG. 23B shows a sequence of 4 stages of the plant growth to be performed in the cultivation system 330 having a first cultivation room 330A, a second cultivation room 330B, a third cultivation room 330C, and a fourth cultivation room 330D. Each cultivation room 330A or 330B or 330C or 330D can include a climate module 331A or 331B or 331C or 331D, with each climate module controlled by a control system 331A* or 331B* or 331C* or 331D*. Each control system can control the corresponded climate module to provide a sequence of one or more climate conditions. For example, the first cultivation room 330A can be configured for first stage 305 of sprouting, the second cultivation room 330B can be configured for second stage 306 of flowering, the third cultivation room 330C can be configured for third stage 307 of growing, and the fourth cultivation room 330D can be configured for fourth stage 308 of drying.

In operation, the first, second, third, and fourth control systems 330A*, 3310B*, 330C*, and 330D* can control the first, second, third, and fourth climate modules 331A, 331B, 331C, and 331D to provide the one or more climate condi- tions of different plant stages in sequence, with an optional break between stages for transition times and for preparing the plants.

For example, the plants, after the corms of the plants pass the size requirement, can be placed on absorbance pads on trays on shelf carts to be moved to the first cultivation room. The first control system can control the first climate module to provide the first climate conditions of sprouting to the first cultivation room.

After a predetermined period, such as 1-3 weeks or about 2 weeks, the second control system can control the second climate module to provide the second climate conditions of flowering to the second cultivation room. The shelf carts can be moved to the second cultivation room.

After a predetermined period, such as 1-3 weeks or about 2 weeks, the third control system can control the third climate module to prepare the third cultivation room for the third stage of growing. In the mean time, the shelf carts can be moved out of the second cultivation room to an outside harvesting and conditioning room, for harvesting the flowers and for trimming the corms. After being trimmed, the corms can be planted in soil in containers, and placed on the shelf carts (or different shelf carts). The third control system can control the third climate module to provide the third climate conditions of growing to the third cultivation room. The shelf carts with the plants planted in the containers can be moved to the third cultivation room.

After a predetermined period, such as 3-5 weeks or about 4 weeks, the fourth control system can control the fourth climate module to prepare the fourth cultivation room for the fourth stage of drying. In the mean time, the shelf carts can be moved out of the third cultivation room to the outside harvesting and conditioning room, for digging and for trimming the corms. After being trimmed, the corms can be placed on absorbance pads on trays, and placed on the shelf carts (or different shelf carts). The fourth control system can control the fourth climate module to provide the fourth climate conditions of drying to the fourth cultivation room. The shelf carts with the plants placed on trays can be moved to the fourth cultivation room.

After a predetermined period, such as 1-3 weeks or about 2 weeks, the corms can be dried, and the operation repeated by subjecting the corms to the first stage. For example, the first control system can control the first climate module to provide the first climate conditions of sprouting to the first cultivation room. The dried corms then can stay in the first cultivation room for sprouting.

Alternatively, a cultivation room 330A or 330B or 330C or 330D can include multiple climate modules 331A1 and 331A2, with a single control system 331A* controlling the multiple climate modules. The cultivation room 330A or 330B or 330C or 330D can include multiple climate mod- ules 331A1 and 331A2, with multiple control systems 331A*1 and 331A*2, each controlling a climate module of the multiple climate modules.

FIG. 24 illustrates a flow chart for a cultivation system for cultivating saffron in different cultivation systems according to some embodiments. Operation 925 forms a cultivation system. The cultivation system can have one or more rooms configured for multiple life stages of a plant, one or more climate systems coupled to the one or more rooms, one or more control systems coupled to the one or more climate systems.

A climate system of the one or more climate systems is coupled to at least a room of the one or more rooms. Each climate system includes at least two of a temperature system configured to change or maintain a temperature of the at least a room, a humidity system configured to change or maintain a moisture level of the at least a room, a lighting system configured to change or maintain a light level of the at least a room, or a $CO_2$ system configured to change or maintain a $CO_2$ level of the at least a room.

The one or more control systems configured to control the one or more climate systems to provide to a room with first climate conditions for a first life stage, second climate conditions for a second life stage, third climate conditions for a third life stage, fourth climate conditions for a fourth life stage, a sequence of the first and the second climate conditions in any order, a sequence of the first and the third climate conditions in any order, a sequence of the first and the fourth climate conditions in any order, a sequence of the second and the third climate conditions in any order, a sequence of the second and the fourth climate conditions in any order, a sequence of the third and the fourth climate conditions in any order, a sequence of the first, the second, and the third climate conditions in any order, a sequence of the first, the second, and the fourth climate conditions in any order, a sequence of the second, the third, and the fourth climate conditions in any order, or a sequence of the first, the second, the third, and the fourth climate conditions in any order.

Each climate conditions include at least two of a cyclic sequence of temperature, a cyclic sequence of humidity, a cyclic sequence of lighting, or a level of CO2.

The first climate conditions includes a first repeated temperature sequence between 0-4 C and 10-14 C, a first repeated humidity sequence between 85-95% and 65-55% relative humidity corresponded to the first temperature sequence, respectively, and a first repeated lighting sequence between dark and bright corresponded to the first tempera- ture sequence, respectively.

The second climate conditions include a second repeated temperature sequence between 10-18 C and 34-42 C, and a second repeated humidity sequence between above 95% and 80-90% relative humidity corresponded to the first temperature sequence, respectively.

The third climate conditions include a third repeated temperature sequence between 2-6 C and 10-14 C, a first humidity level of less than 40% relative humidity, and a second repeated lighting sequence between dark and bright corresponded to the second temperature sequence, respectively, The first, second, and third repeated temperature sequences, the first and second repeated humidity sequences, and the first and second repeated lighting sequences comprise a same periodicity.

The fourth climate conditions include a first temperature value between 16 and 20 C, and a second humidity level of less than 50% relative humidity.

Figure 25:
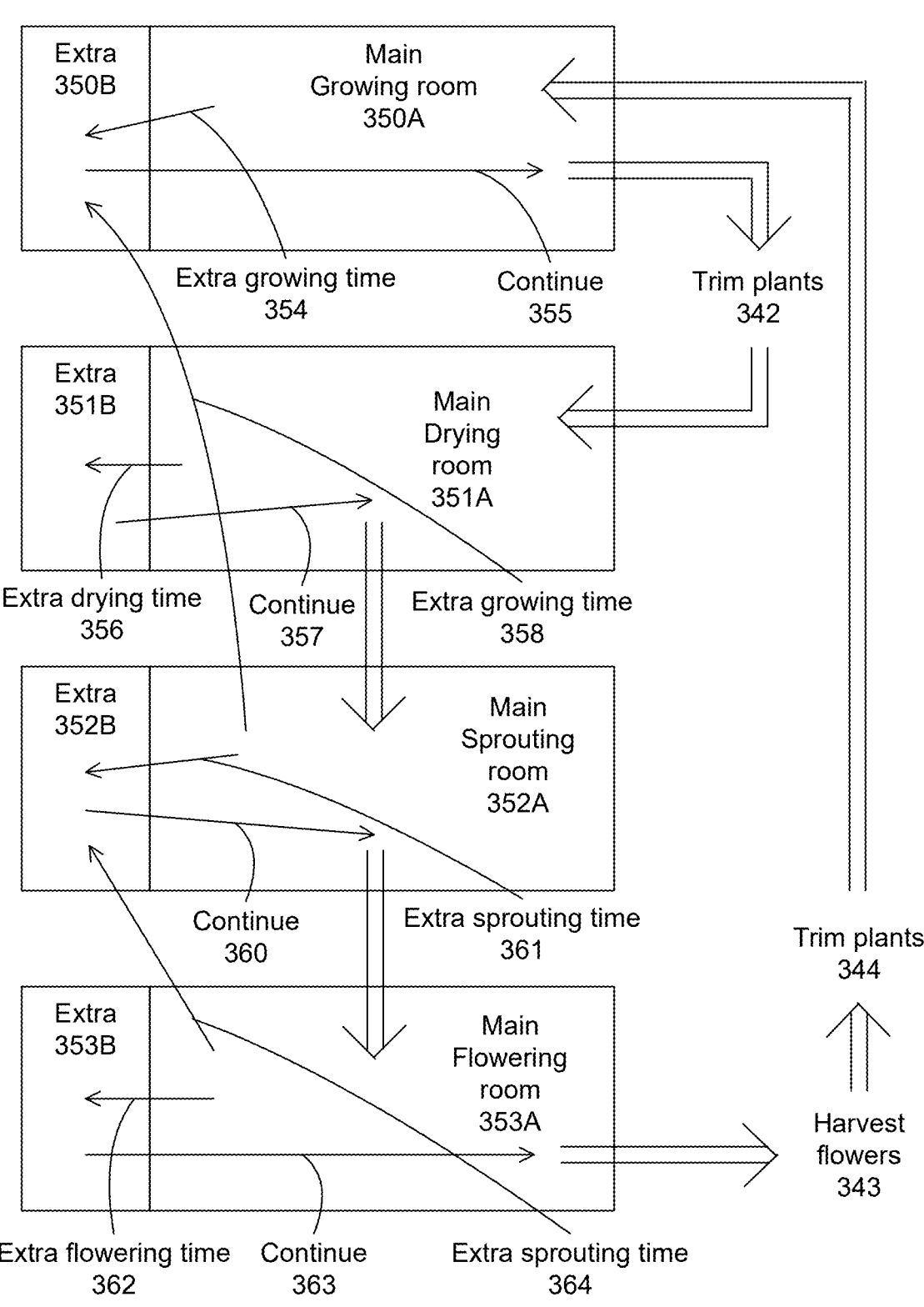
FIG. 25 illustrates a saffron cultivation system with extra rooms in compartments according to some embodiments.

FIG. 25 illustrates a saffron cultivation system with extra rooms in compartments according to some embodiments. The cultivation system can include a main growing room 350A with an extra growing room 350B, a maim drying room 351A with an extra drying room 351B, a main sprouting room 352A with an extra sprouting room 352B, and a main flowering room 353A with an extra flowering room 353B.

In operation, a cultivation process can start with depleted corms of plants, such as saffron plants. The corms can be brought to the growing room 350A to grow the corms. Alternatively, the cultivation process can start with ready-to-sprout corms. In this case, the corms can be brought to the sprouting room 352A for sprouting, skipping the growing room and the drying room.

After a fixed time, such as 4 weeks in the growing room, the corms can be sorted. The corms having sizes greater than a minimum limit can be trimmed 342, and then brought to the drying room 351A for drying. The corms that do not meet the size limitation can be brought 354 to the extra growing room 350B for extra time for growing.

After a fixed time such as 1 week or 2 weeks in the drying room, the dried corms can be brought to the sprouting room 352A. The corms that do not meet the dried requirement, e.g., still not adequately dried, can be brought to the extra drying room 351B to continue the drying process.

After a fixed time such as 2 weeks in the sprouting room, the sprouted corms can be brought to the flowering room 353A. The corms that do not sprout, for example, being too small or slow to sprout, can be brought back 358 to the growing room, or can move to the extra sprouting room 352B to continue the sprouting process.

After a fixed time such as 2 weeks in the flowering room, the flowered corms can be brought to the harvest room 343 for harvesting the flowers. After being trimmed 344, the trimmed corms can be brought back to the growing room for a new cycle of plant growth. The corms that do not flower can be brought back 364 to the sprouting room, or can move 362 to the extra flowering room 353B to continue to flower.

Monitoring Plant Growth with Sensors

Figures 26A, 26B:
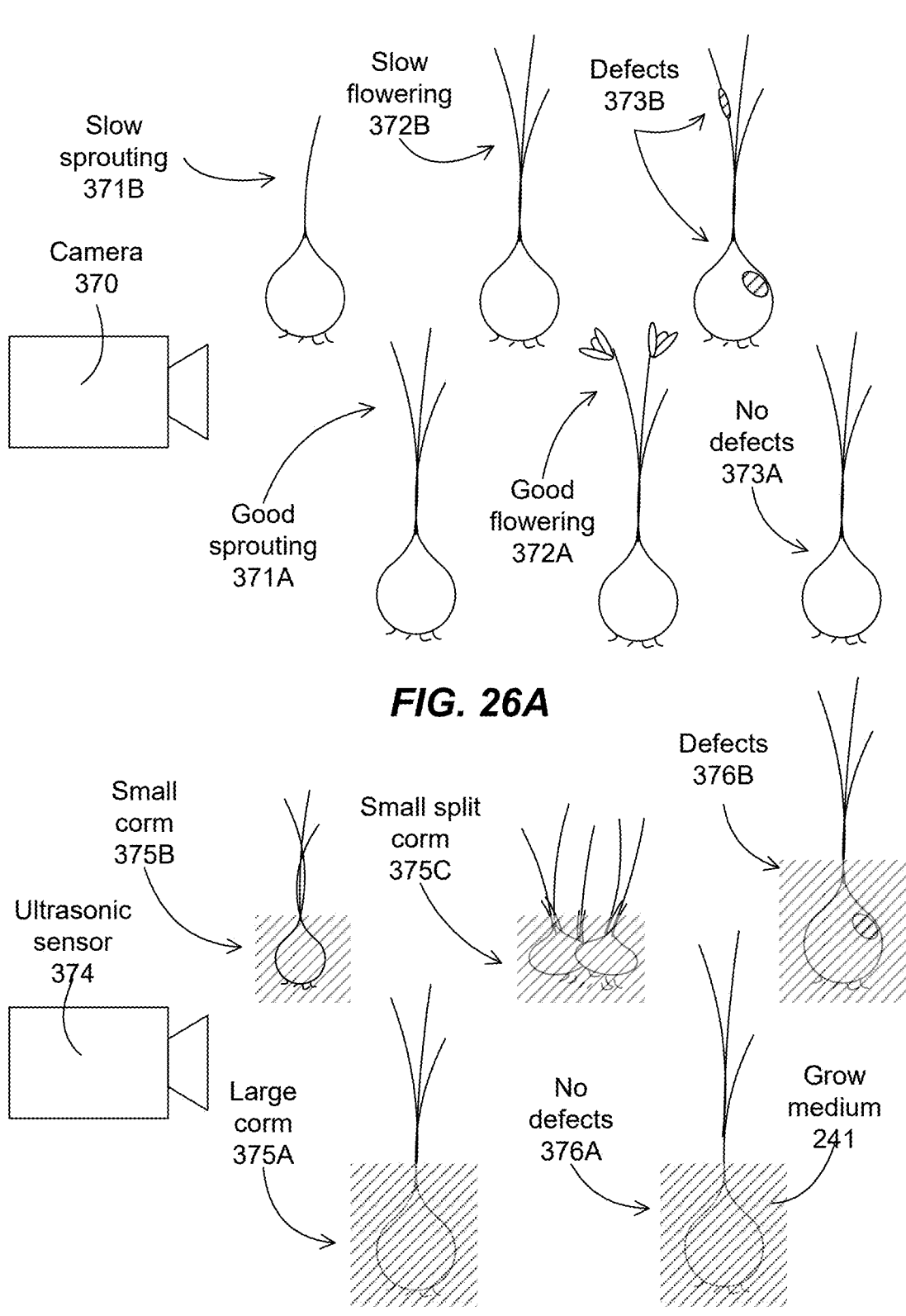
FIGS. 26A-26B illustrate monitoring conditions for saffron plants according to some embodiments.

FIGS. 26A-26B illustrate monitoring conditions for saffron plants according to some embodiments. The cultivation process can include moving the plants from stage to stage based on a fixed time scheme, with the plants not meeting the requirements for moving can be merged with a next batch. The fixed time scheme can provide a fixed time window for harvesting the flowers, e.g., the flowers can be harvested after 8 weeks without the drying process or 9 or 10 weeks with the drying process.

Alternatively, the plants can move to a next stage based on the conditions of the plants, determined by one or more sensors. For example, a camera can determine the growth status or the rate of growth of the plants. An ultrasonic camera can determine the growth status or the rate of growth of the corms buried in the soil.

FIG. 26A shows a camera 370 configured for monitoring a sprouting process, such as identifying good sprouting 371A or slow sprouting 371B. The camera 370 can be configured for monitoring a flowering process, such as identifying good flowering 372A or slow flowering 372B. The camera 370 can be configured for monitoring defects in the plants, such as identifying no defects, good plants 373A or defected plants 373B.

FIG. 26B shows an ultrasonic camera 374 configured for monitoring corms of a plant under the soil 241 in containers. The ultrasonic camera can use ultrasound to obtain images of the corms underground. The ultrasonic camera 374 can be configured for monitoring sizes of the corms, such as identifying large corms 375A, small corms 375B, or split corms 375C. The small corms can stay in the containers for a longer period until reaching the size limit. The split corms can also stay longer until the daughter corms reach the size limit. The ultrasonic camera 374 can be configured for monitoring defects in the underground corms, such as identifying no defects, good corms 376A or defected corms 376B.

Lot Management of Saffron Cultivation System

There can be different times for different cultivation rooms in a cultivation system. For example, the growing room can require 4 weeks, while the sprouting room and the flowering room can require only 2 weeks. As such, the sprouting and the flowering rooms can be empty when the plants are growing in the growing room. In addition, the cultivation systems can allow a flower harvesting time after every 8-10 weeks, depending on whether there is a need for drying the corms before sprouting. Further, some flowers can be harvested during the 2 weeks of the plants in the flowering room, since the flowers can bloom at any time in the flowering room. A lot management process can be performed to maximize the use of the cultivation system, such as not letting the cultivation room empty, or the harvest work idled.

Figures 27A, 27B:
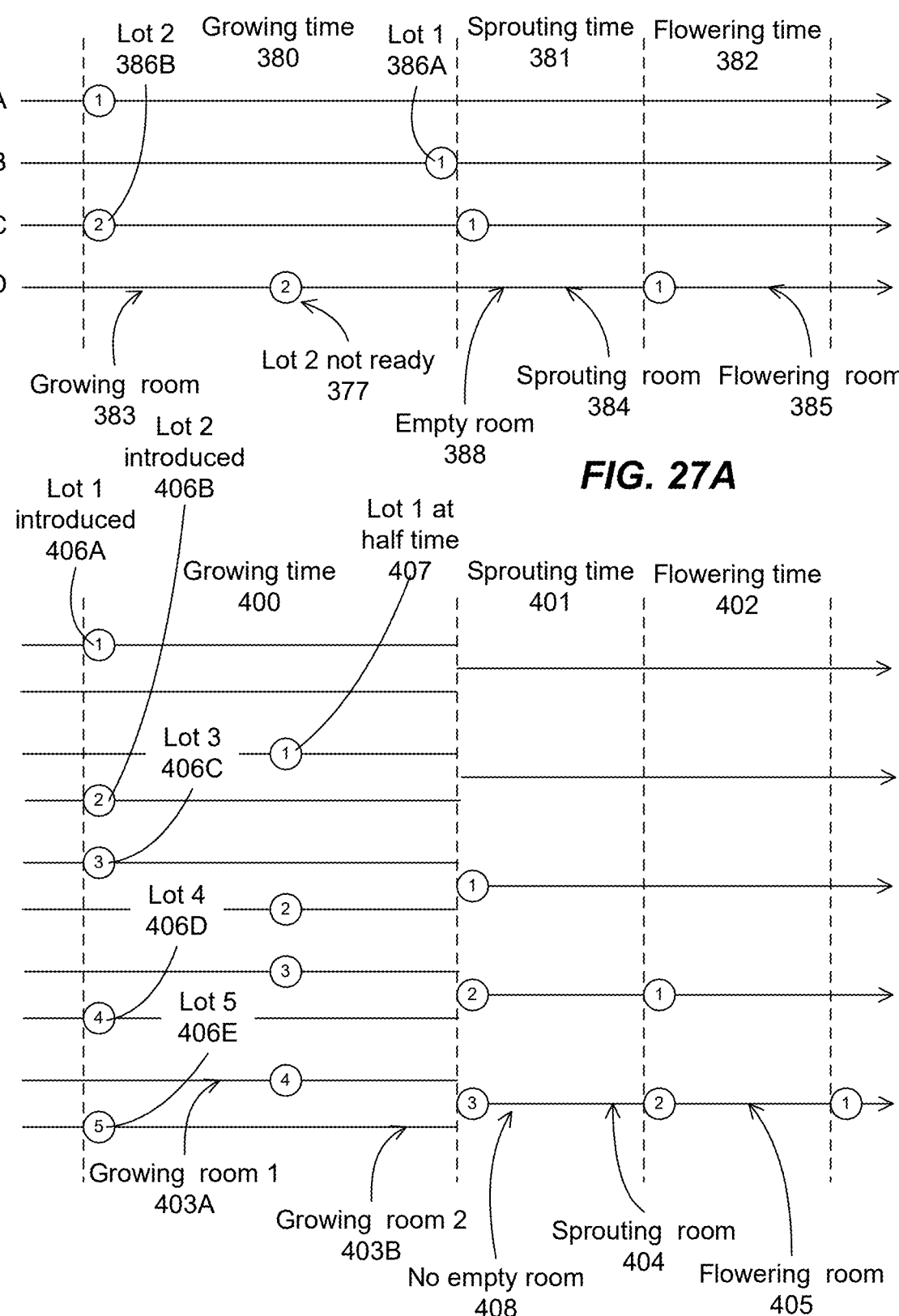
FIGS. 27A-27C illustrate lot management configurations for saffron cultivation systems according to some embodiments.
Figure 27C:
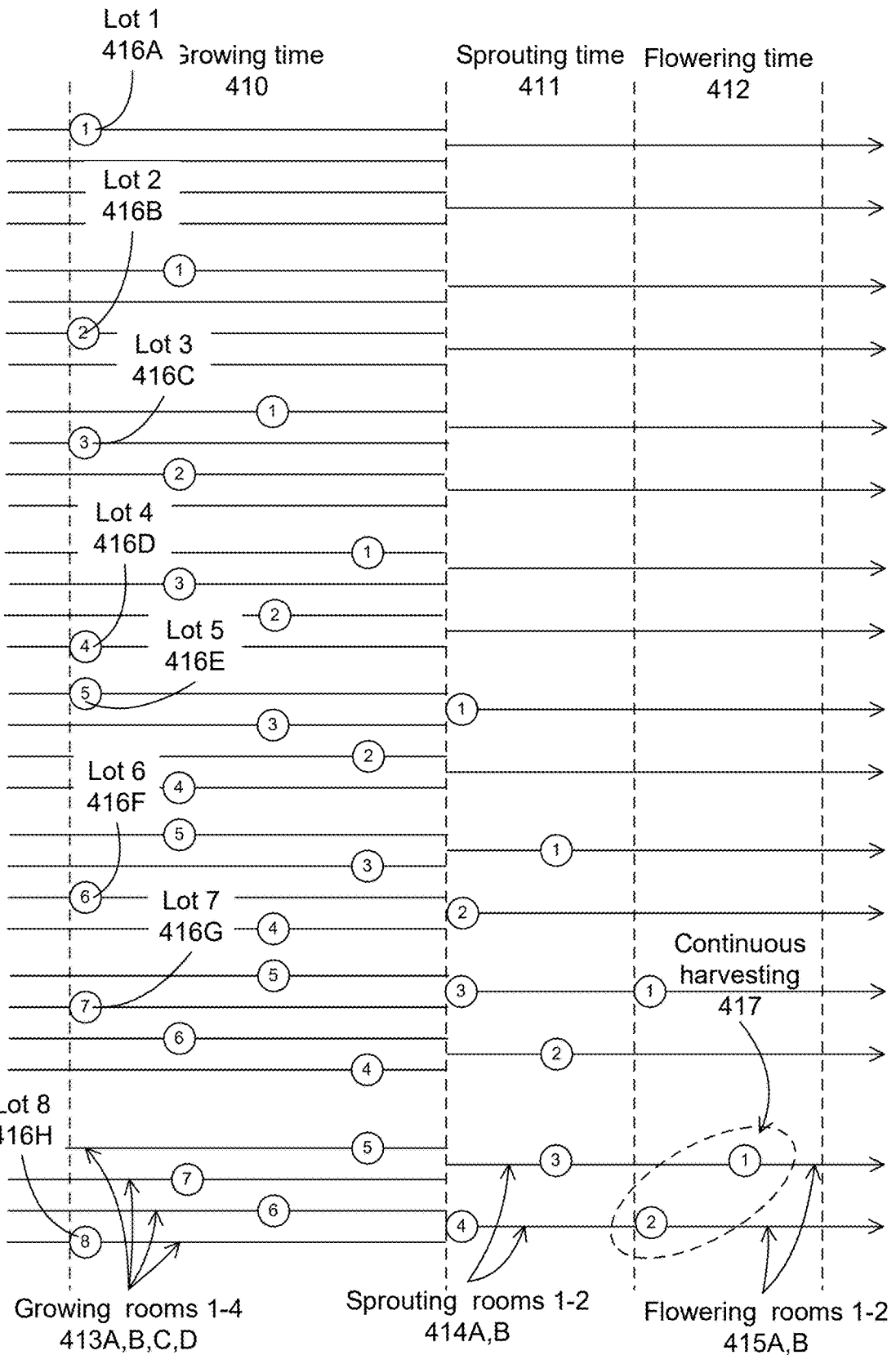

FIGS. 27A-27C illustrate lot management configurations for saffron cultivation systems according to some embodiments. FIG. 27A shows a time graph for a cultivation system having one growing room 383, one sprouting room 384, and one flowering room 385. The growing room can require a growing time 380 of 4 weeks, which can be twice the sprouting time 381 in the sprouting room or the flowering time 382 in the flowering room.

As shown, at time A, lot 1 386A of plants is introduced into the growing room. At time B, after 4 weeks, lot 1 is ready. At time C, lot 1 exits the growing room and enters the sprouting room. In the mean time, lot 2 386B is introduced to the growing room. At time D, lot 1 enters the flowering room, while lot 2 is half way through the growing time in the growing room. As such, lot 2 is not ready 377 to enter the sprouting room, leaving the sprouting room empty 388 for weeks. The emptiness of the sprouting room can cause inefficiency in the cultivation process.

FIG. 27B shows a cultivation system with improved efficiency. There are 2 growing rooms 1 and 2 403A and 403B for each sprouting room 404 and flowering room 405. In operation, plant lots can be introduced to the growing rooms every 2 weeks, such as lot 1 406A introduced to growing room 1 403A at time 0, and lot 2 406B introduced to growing room 2 403B 2 weeks later. Afterward, a lot, such as lot 3 406C, lot 4 406D, lot 5 406E are introduced to the growing rooms every 2 weeks.

As such, when lot 1 exits the growing room 1 to enter the sprouting room, lot 2 can be 2 weeks from ready. When lot 1 finishes sprouting in sprouting room and transfers to flowering room, lot 2 also finishes with the growing room and transfers to the sprouting room. Thus, there is no empty room, and the usage efficiency of the cultivation rooms is improved.

In general, the number of rooms for each stage of the plants is proportional to the length of time of the plants in the rooms, if the number of plants in each stage is the same. Thus, for improved efficiency, the number of rooms for multiple stages is related to the greatest common divisor (common factor) of the times in the stages. For example, a time sequence of 4 weeks (in growing room), 2 weeks (in sprouting room), and 2 weeks (in flowering room) can have the greater common divisor or factor of 2 weeks, which can translated into a sequence of 4 weeks/2 weeks-2 weeks/2 weeks-2 weeks/2 weeks or 2-1-1. As such, there can be 2 growing rooms for each one of sprouting room and flowering room.

For different time sequences, such as a time sequence of 5 weeks (in growing room), 3 weeks (in sprouting room), and 2 weeks (in flowering room), the greater common divisor or factor can be 1 week, which translated to a sequence of 5-3-2, or 5 growing rooms for 3 sprouting rooms for 2 flowering rooms.

FIG. 27C shows a cultivation system with a continuous harvesting 417 scheme for flowers. The cultivation system can be designed so that the flowers can be ready to be harvest in every few days, such as in every 2 days, 4 days, or a week, for example, by selecting a number of flower rooms and setting the flower rooms to bloom in sequence.

For example, the cultivation system can be designed to have the flowers ready in every week. With the flowering stage lasting about 2 weeks, there are 2 flowering rooms, with the plant lots separated by one week. There can be 4 growing rooms 413A-D, 2 sprouting rooms 414A-B, and 2 flowering rooms 415A-B. In operation, plant lots can be introduced to the growing rooms every week, such as lot 1 416A introduced to growing room 1 413A at time 0, and lot 2 416B introduced to growing room 2 413B 1 week later. Afterward, a lot, such as lot 3 416C, lot 4 416D, lot 5 416E, lot 6 416F, lot 7 416G, lot 8 416H are introduced to the growing rooms every week. With a lot introduced every week to the different growing rooms, one lot is ready to leave the growing rooms every week, after the initial 4 weeks.

With the sprouting time is 2 weeks in the sprouting rooms, the 2 sprouting rooms are configured to handle a lot every week, e.g., 2 lots for each of the sprouting room. Similarly, with 2 week flowering time in the flowering rooms, each lot can be introduced to the flowering room in one week, and one lot is ready to harvest every week in or form the flowering rooms.

What is claimed is:

1. A cultivation system for saffron plants, the cultivation system comprising
    a first room configured for a first stage of the plants, comprising
        a first repeated temperature sequence between 2 C and 12 C,
        a first repeated humidity sequence between 89% and 60% relative humidity corresponded to the first temperature sequence, respectively, a first repeated lighting sequence between dark and bright ambients corresponded to the first temperature sequence, respectively,
        wherein the dark or bright ambient is characterized by a turned-off or a turned-on light source of the first room, respectively,
    a second room configured for a second stage of the plants comprising
        a second repeated temperature sequence between 14 C and 38 C,
        a second repeated humidity sequence between 99% and 85% relative humidity corresponded to the second temperature sequence, respectively,
    a third room configured for a third stage of the plants, comprising
        a third repeated temperature sequence between 4 C and 12 C,
        a first humidity level of less than 50% relative humidity,
        a second repeated lighting sequence between dark and bright ambients corresponded to the second temperature sequence, respectively,
        wherein the dark or bright ambients are characterized by a turned-off or a turned-on light source of the third room, respectively,
        wherein the first, second, and third repeated temperature sequences, the first and second repeated humidity sequences, and the first and second repeated lighting sequences comprise a same periodicity of at least 5 times less than 24 hours.

2. A cultivation system as in claim 1, wherein the periodicity of the first, second, and third repeated temperature sequences, the first and second repeated humidity sequences, and the first and second repeated lighting sequences are less than or equal to 3 hours.

3. A cultivation system as in claim 1, wherein the periodicity for the first, second, or third repeated temperature sequence comprises less than 1 hour at a high temperature, less than 1 hour at a low temperature, less than 1 hour at a transition from the high temperature to the low temperature, and less than 1 hour at a transition from the low temperature to the high temperature.

4. A cultivation system as in claim 1, the first or second repeated lighting sequence comprises a light source turned on when the room temperature is above a temperature between 6 and 10 C.

5. A cultivation system as in claim 1, wherein the second room comprises a dark ambient.

6. A cultivation system as in claim 1, further comprising a fourth room configured for a fourth stage of the plants comprising
    a first temperature between 16 C and 20 C,
    a second humidity level of less than 60% relative humidity.

7. A cultivation system as in claim 1, a fifth room configured for harvesting or for trimming the plants.

8. A cultivation system as in claim 1, wherein the first room is configured to grow corms of the plants,
wherein the second room is configured to allow the corms to sprout after grown in the first room,
wherein the third room is configured to allow the sprouted corms to flower after being in the second room.

9. A cultivation system comprising one or more rooms configured for multiple life stages of a plant, one or more climate system coupled to the one or more room, wherein a climate system of the one or more climate system is coupled to at least a room of the one or more rooms, wherein the climate system comprises at least two of a temperature system configured to change or maintain a temperature of the at least a room, a humidity system configured to change or maintain a moisture level of the at least a room, a lighting system configured to change or maintain a light level of the at least a room, or a $CO_2$ system configured to change or maintain a $CO_2$ level of the at least a room, one or more control systems coupled to the one or more climate systems to provide to at least a room of the one or more rooms one of a first climate condition, a second climate condition, a third climate condition, a sequence of the first and second climate conditions in any order, a sequence of the first and third climate conditions in any order, a sequence of the second and third climate conditions in any order, or a sequence of the first, second, and third climate conditions in any order, wherein the first climate condition comprises a first repeated temperature sequence between 0-4 C and 10-14 C, a first repeated humidity sequence between 85-95% and 65-55% relative humidity corresponded to the first temperature sequence, respectively, and a first repeated lighting sequence between dark and bright ambients corresponded to the first temperature sequence, respectively, wherein the dark or bright ambient is characterized by the lighting system turning off or on, respectively, wherein the second climate condition comprises a second repeated temperature sequence between 10-18 C and 34-42 C, a second repeated humidity sequence between above 95% and 80-90% relative humidity corresponded to the first temperature sequence, respectively, wherein the third climate condition comprises a third repeated temperature sequence between 2-6 C and 10-14 C, and a first humidity level of less than 50% relative humidity, a second repeated lighting sequence between the dark and bright ambients corresponded to the second temperature sequence, respectively, wherein the first, second, and third repeated temperature sequences, the first and second repeated humidity sequences, and the first and second repeated lighting sequences comprise a same periodicity.

10. A cultivation system as in claim 9, wherein the one or more rooms comprise one room, wherein the one or more control systems is configured to provide to the one room a sequence of the first, second, and third climate conditions, in any order.

11. A cultivation system as in claim 9, wherein the one or more rooms comprise two rooms, wherein the one or more climate systems comprise one climate system coupled to the two rooms or comprise two climate systems with each climate system coupled to a room of the two rooms, wherein the one or more control systems is configured to provide one of a sequence of the first and second climate conditions in any order to a first room of the two rooms, and the third climate condition to a second room of the two rooms, a sequence of the first and third climate conditions in any order to the first room of the two rooms, and the second climate condition to the second room of the two rooms, or a sequence of the second and third climate conditions in any order to the first room of the two rooms, and the first climate condition to the second room of the two rooms.

12. A cultivation system as in claim 9, wherein the one or more rooms comprise three rooms, wherein the one or more climate systems comprise one climate system coupled to the three rooms, comprise two climate systems with each climate system coupled to at least a room of the three rooms, or comprise three climate systems with each climate system coupled to a room of the three rooms, wherein the one or more control systems is configured to provide the first climate condition to a first room of the three rooms, the second climate condition to a second room of the three rooms, and the third climate condition to a third room of the three rooms.

13. A cultivation system as in claim 9, wherein the one or more control systems are further configured to provide a fourth climate condition, a sequence of the first and fourth climate conditions in any order, a sequence of the second and fourth climate conditions in any order, a sequence of the third and fourth climate conditions in any order, a sequence of the first, second, and fourth climate conditions in any order, a sequence of the first, third, and fourth climate conditions in any order, a sequence of the second, third, and fourth climate conditions in any order, or a sequence of the first, second, third, and fourth climate conditions in any order, wherein the fourth climate condition comprises a first temperature between 16 C and 20 C, and a second humidity level of less than 60% relative humidity.

14. A cultivation system as in claim 13, wherein the one or more rooms comprise one room, wherein the one or more control systems is configured to provide a sequence of the first, second, third, and fourth climate conditions, in any order, to the one room; or wherein the one or more rooms comprise two rooms, wherein the one or more climate systems comprise one climate system coupled to the two rooms or comprise two climate systems with each climate system coupled to a room of the two rooms, wherein the one or more control systems is configured to provide one of a sequence of the first and second climate conditions in any order to a first room of the two rooms, and a sequence of the third and fourth climate conditions in any order to a second room of the two rooms, a sequence of the first and third climate conditions to the first room of the two rooms, and the second and fourth climate conditions in any order to the second room of the two rooms, a sequence of the first and fourth climate conditions to the first room of the two rooms, and the second and third climate conditions in any order to the second room of the two rooms, a sequence of the second and third climate conditions in any order to the first room of the two rooms, and the first and fourth climate conditions, in any order, to the second room of the two rooms, a sequence of the second and fourth climate conditions in any order to the first room of the two rooms, and the first and third climate conditions, in any order, to the second room of the two rooms; or wherein the one or more rooms comprise three rooms, wherein the one or more climate systems comprise one climate system coupled to the three rooms, comprise two climate systems with each climate system coupled to at least a room of the three rooms, or comprise three climate systems with each climate system coupled to a room of the three rooms, wherein the one or more control systems is configured to provide one of the first climate condition to a first room of the three rooms, the second climate condition to a second room of the three rooms, and a sequence of the third and fourth climate conditions in any order to a third room of the three rooms, the first climate condition to the first room of the three rooms, the third climate condition to the second room of the three rooms, a sequence of the second and fourth climate conditions in any order to the third room of the three rooms, the first climate condition to the first room of the three rooms, the fourth climate condition to the second room of the three rooms, a sequence of the second and third climate conditions in any order to the third room of the three rooms, the second climate condition to the first room of the three rooms, the third climate condition to the second room of the three rooms, a sequence of the first and fourth climate conditions in any order to the third room of the three rooms, the second climate condition to the first room of the three rooms, the fourth climate condition to the second room of the three rooms, a sequence of the first and third climate conditions in any order to the third room of the three rooms, or the third climate condition to the first room of the three rooms, the fourth climate condition to the second room of the three rooms, a sequence of the first and second climate conditions in any order to the third room of the three rooms; or wherein the one or more rooms comprise four rooms, wherein the one or more climate systems comprise one climate system coupled to the four rooms, comprise two climate systems with each climate system coupled to at least a room of the four rooms, comprise three climate systems with each climate system coupled to at least a room of the four rooms, or comprise four climate systems with each climate system coupled to a room of the four rooms, wherein the one or more control systems is configured to provide the first climate condition to a first room of the four rooms, the second climate condition to a second room of the four rooms, the third climate condition to a third room of the four rooms, and the fourth climate condition to a fourth room of the four rooms.

15. A method for cultivating plants, the method comprising exposing the plants to a first ambient comprising a first repeated temperature sequence between 14 C and 38 C, a first repeated humidity sequence between 99% and 85% relative humidity corresponded to the first temperature sequence, respectively, exposing the plants to a second ambient comprising a second repeated temperature sequence between 4 C and 12 C, a first repeated lighting sequence between first dark and bright ambients corresponded to the second temperature sequence, respectively, wherein the first dark or bright ambient is characterized by a first lighting system in the second ambient turning off or on, respectively, exposing the plants to a third ambient comprising a third repeated temperature sequence between 2 C and 12 C, a second repeated humidity sequence between 89% and 60% relative humidity corresponded to the third temperature sequence, respectively, a second repeated lighting sequence between second dark and bright ambients corresponded to the third temperature sequence, respectively, wherein the second dark or bright ambient is characterized by a second lighting system in the third ambient turning off or on, respectively, wherein the first, second, and third repeated temperature sequences, the first and second repeated humidity sequences, and the first and second repeated lighting sequences comprise a same periodicity.

16. A method as in claim 15, further comprising planting the plants in soil mixed with a fertilizer before exposing the plants to the first ambient, placing the plants on absorbance pads on trays before exposing the plants to the second or third ambient.

17. A method as in claim 15, further comprising trimming the plants before exposing the plants to the first or second ambient.

18. A method as in claim 15, further comprising removing side buds of the plants before exposing the plants to the first ambient.

19. A method as in claim 15, further comprising keeping side buds of the plants when exposing the plants to the first ambient.

20. A method as in claim 15, further comprising leaving corms of the plants in the first ambient if not reaching a size limit, returning sprouted corms of the plants to the second ambient if not flowering.

\* \* \* \* \*